US012794671B2

(12) United States Patent
Feola et al.

(10) Patent No.: US 12,794,671 B2
(45) **Date of Patent: *Nov. 10, 2026**

(54) BLOCKCHAIN SECURITY MANAGEMENT SYSTEM AND PROCESS

(71) Applicant: PrivacyChain, LLC, Dallas, TX (US)

(72) Inventors: Christopher J. Feola, Dallas, TX (US); Geoffrey M. Hayden, Dallas, TX (US)

(73) Assignee: PrivacyChain, LLC, Dallas, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/999,457

(22) Filed: Dec. 23, 2024

(65) Prior Publication Data

US 2025/0132898 A1 Apr. 24, 2025

Related U.S. Application Data

(63) Continuation of application No. 17/492,357, filed on Oct. 1, 2021, now Pat. No. 12,184,758.

(Continued)

(51) Int. Cl.
*H04L 29/06* (2006.01)
*G06F 9/54* (2006.01)
(Continued)

(52) U.S. Cl.
CPC ............ *H04L 9/0819* (2013.01); *G06F 9/547* (2013.01); *G06F 16/27* (2019.01); *G06Q 20/123* (2013.01); *G06Q 20/223* (2013.01); *G06Q 20/389* (2013.01); *H04L 9/0894* (2013.01); *H04L 9/14* (2013.01); *H04L 63/0236* (2013.01); *H04L 63/0272* (2013.01); *H04L 67/1093* (2013.01)

(58) Field of Classification Search
CPC ....... H04L 9/0819; H04L 9/0894; H04L 9/14; H04L 63/0236; H04L 63/0272; H04L 67/1093; H04L 9/50; H04L 67/12; G06F 9/547; G06F 16/27; G06Q 20/123; G06Q 20/223; G06Q 20/389; G06Q 2220/00; G06Q 20/02; G06Q 20/12
See application file for complete search history.

(56) References Cited

U.S. PATENT DOCUMENTS 11,538,029 B2 * 12/2022 Young ................ G06F 18/2431
2002/0184310 A1 12/2002 Traversat et al.
(Continued)

OTHER PUBLICATIONS

PCT International Patent Appl. No. PCT PCT/US2021/053218, International Search Report and Written Opinion, dated Feb. 8, 2022, 16 pgs.

*Primary Examiner* — Mahfuzur Rahman
(74) *Attorney, Agent, or Firm* — Foley & Lardner LLP

(57) ABSTRACT

A process for managing security of a blockchain may include receiving a message from a P2P distributed application requesting access to a block on a blockchain for a user. In response to receiving the message, identity of the user requesting access to the block may be validated. In response to validating the identity of the user, the requested access to the block may be performed by (i) requesting a key associated with the identified user to be used to unlock the block, and (ii) in response to receiving a key associated with the user, unlocking the block to access content data stored in a data object contained in the block. A distributed data management system (DDMS) may be configured to perform the process.

28 Claims, 28 Drawing Sheets

Related U.S. Application Data

(60) Provisional application No. 63/086,422, filed on Oct. 1, 2020.

(51) Int. Cl.

| | |
|---|---|
| ***G06F 16/27*** | (2019.01) |
| ***G06Q 20/12*** | (2012.01) |
| ***G06Q 20/22*** | (2012.01) |
| ***G06Q 20/38*** | (2012.01) |
| ***H04L 9/08*** | (2006.01) |
| ***H04L 9/14*** | (2006.01) |
| ***H04L 9/40*** | (2022.01) |
| ***H04L 67/1087*** | (2022.01) |

(56) References Cited

U.S. PATENT DOCUMENTS

| | | | | |
|---|---|---|---|---|
| 2004/0168174 | A1* | 8/2004 | Baker | H04L 67/10 719/310 |
| 2005/0044411 | A1 | 2/2005 | Somin et al. | |
| 2008/0243855 | A1 | 10/2008 | Prahlad et al. | |
| 2012/0233455 | A1 | 9/2012 | Kahler et al. | |
| 2016/0028552 | A1 | 1/2016 | Spanos et al. | |
| 2016/0321434 | A1 | 11/2016 | McCoy et al. | |
| 2016/0337484 | A1* | 11/2016 | Tola | H04L 12/6418 |
| 2017/0103167 | A1 | 4/2017 | Shah | |
| 2017/0124535 | A1 | 5/2017 | Juels et al. | |
| 2017/0177898 | A1 | 6/2017 | Dillenberger | |
| 2017/0347283 | A1* | 11/2017 | Kodaypak | H04W 24/08 |
| 2018/0343238 | A1* | 11/2018 | Tola | H04L 63/0421 |
| 2019/0109713 | A1* | 4/2019 | Clark | G06F 16/182 |
| 2020/0250174 | A1 | 8/2020 | Padmanabhan et al. | |
| 2021/0192075 | A1 | 6/2021 | Sweeney et al. | |
| 2021/0314143 | A1* | 10/2021 | Conner | H04L 9/3239 |
| 2022/0067714 | A1* | 3/2022 | Young | G06N 20/00 |
| 2022/0067717 | A1* | 3/2022 | Yun | H04L 9/30 |
| 2022/0109562 | A1* | 4/2022 | Feola | G06Q 20/389 |
| 2022/0390622 | A1* | 12/2022 | Seth | G01C 21/165 |

* cited by examiner

600

700b

Conventional Blockchain

DDMS-Implemented Blockchain

1500b

Create User Profile

Name *

First Last

Email *

Email confirmation *

Cell Phone *

*

Are you an:

- ○ EvergreenNFT creator
- ○ EvergreenNFT buyer
- ○ Both

Interests: check all that interest you!

- ☐ Music
- ☐ Digital Arts
- ☐ Books
- ☐ Videos
- ☐ Limited Editions
- ☐ Unique Products

[Submit]

FIG. 15A

BLOCKCHAIN SECURITY MANAGEMENT SYSTEM AND PROCESS

RELATED APPLICATIONS

This Application is a continuation application of co-pending U.S. patent application Ser. No. 17/492,357 filed on Oct. 1, 2021, which claims priority to U.S. Provisional Patent Application having Ser. No. 63/086,422 filed on Oct. 1, 2020; the contents of which are hereby incorporated by reference in their entirety.

BACKGROUND

Data warehouses, such as those constructed on centralized database systems (e.g., Hadoop, Oracle, etc.), introduce as many problems as are solved. One problem that exists is that centralizing data synchronization creates multiple processes that need to be kept synchronized, thereby requiring more processes until the entire data warehouse becomes increasingly complex and ultimately loses synchronicity, becomes slow, and/or fails to perform required basic functions in a commercially satisfactory manner to the ultimate detriment of the users.

Master Data Management is a technology that attempts to keep data correctly in sync by building hierarchies that resolve data conflicts during concatenation. Maintaining context across disparate systems and rule sets requires writing new procedures and rule sets, including:

(i) Coordinating Data Ownership across disparate systems and rule sets;

(ii) Maintaining synchronization across asynchronous use by uncoordinated users; and (iii) Using Distributed Data solves synchronization problems, but greatly increases development time.

Centralized Data Architectures originated in main frame systems where all the data and processing were centrally located. As the number of devices creating and processing data increased exponentially year after year, these architectures have been overwhelmed by the concurrent doubling and redoubling of data.

Centralizing data has inherent synchronization problems that have been exacerbated by a data "tsunami" given the proliferation of computers and electronic devices. Data is generally centralized using an extract, transform, and load (ETL) process; the problem is inherent in the name: Extract, transform, load. ETL processing—migrating data from multiple point solutions, such as ECRM and ERP—into a centralized data mart or lake creates problems that require multibillion-dollar solutions.

Enterprises are spending $12.24 billion annually on ETL processing. Master Data Management, which is required to attempt to keep data correctly in sync, is an $11.3 billion annual market. Data Quality—tools to ensure data is accurate and up-to-date—is a $1.3 billion annual market. These processes are used for just part of a ledger. Attempts to maintain context across disparate systems and rule sets are overwhelmed by the proliferation of systems, devices, data and asynchronous use by uncoordinated users.

Distributed ledgers, such as Ethereum, which is a cryptocurrency-based blockchain, are not designed for a rapid application development. In creating distributed ledgers to support the specific distributed applications being created, developers must write code for low-level data handling in addition to the P2P distributed application being created. Such low-level coding is quite often very time consuming as creating and managing distributed ledgers is technically complex. And, conventional distributed ledgers are merely used to record transactions.

Blockchains are data structures that operate to store and secure transaction data, and verify its accuracy in a trustless environment. Transaction data is written to each block permanently, and cannot be altered. Updates to the transactions are written to separate blocks, and chained to the original block, thereby forming a blockchain. Each blockchain is cloned for performance and security. The blockchains (i.e., the original blockchain and blockchain clones) are thereafter used by a blockchain management system to verify each other to ensure no tampering has occurred. Each blockchain is encrypted separately.

Blockchains that use cryptocurrencies for security use cryptocurrency coin "mining," as understood in the art, to prove that transactions occurred. Mining introduces tremendous overhead with a large environmental impact due to the vast amounts of energy mining servers consume to solve the mining problems.

Non-fungible tokens may be stored on blockchains and are typically meant to be identifiers formed of data that prove ownership of data of physical goods and enable other functions based on the token to be created generally for transactional purposes. Each of these conventional data structures (i.e., blockchains and NFTs) that are currently in use have shortcomings from a security and reliability standpoint.

SUMMARY

To overcome the shortcomings of both existing centralized data systems and new distributed ledgers, a P2P distributed data management system (DDMS) may be created to operate as an operating system that peer-to-peer distributed applications utilize to manage data on distributed ledgers, such as blockchains. The DDMS utilizes a peer-to-peer distributed application architecture that partitions tasks, workloads, and data between peer devices, using some portion of their resources, such as processing power, memory storage, and/or network bandwidth, without central coordination by servers or stable hosts. Peers are both suppliers and consumers of resources, in contrast to the traditional data warehouses in which resources are centralized. The DDMS may enable fast development of secure and scalable enterprise P2P distributed applications that support permanent control of every piece of data on a distributed ledger, including synchronization, normalization, and encryption of the data. Security of the data in the distributed ledger means that even if someone hacks into the distributed ledger, access is only gained to one block of data (e.g., single email) and not all blocks of data (e.g., entire email account).

The DDMS offers fast development by abstracting blockchain data storage, thereby rendering the data storage polymorphic. That is, the DDMS is configured to operate as an operating system that enables a P2P distributed application to communicate with a distributed ledger such that a developer need not write low-level code to create or interact directly with the distributed ledger as the DDMS provides those functions. As such, developers may write lightweight, focused code in high-level languages. In an embodiment, the DDMS is capable of supporting a variety of different programming languages, including PHP, Java and Javascript. Any number of programming languages may be supported simply by adding programming libraries to the DDMS.

In using distributed ledgers, a distributed data architecture enables secure storage and peer-to-peer data synchronization. As such, by definition, no data centralization is used, so no Master Data Management, data ownership synchronization, or the other "patches" are developed to solve the problems created by central synchronization.

The blockchain standard, which is one type of distributed ledger, inherently asynchronously synchronizes data across all users. The DDMS may be configured to manage and maintain the data, handle location of memory in which data is being stored, encrypt the data in the memory, and use/classification (e.g., role, profile, etc.) of the data.

The DDMS may use a proprietary blockchain for storage, or any standard or publicly available blockchain. The DDMS may further use any type of encryption. In an embodiment, every block is encrypted individually, and a complete breach is limited to exposing data only in that breached block (e.g., a single document, such as an email or edit version of a document, work (e.g., song), etc.), on a single blockchain. Each block and blockchain is encrypted separately for each user. In an embodiment, keys to the distributed ledgers (e.g., blockchains) and individual data records or blocks are distributed for access to the data by each P2P distributed application. Keys may be kept in a logical construct, which is described herein as a vault, which may also be configured with a firewall and security. For security purposes, the vault may be configured to not accept direct requests for keys. Keys, however, may be provided in an unknown manner to a P2P distributed application for access to the data stored in the distributed ledger. By maintaining key access in an unknown manner, a significantly higher level of security is provided by the DDMS.

In an embodiment, keys may be issued for users, and roles, profiles, location, equipment, etc., may be associated with the keys. Data may be transferred between users via a safe that is indirectly in communication with the vault. As an example, upon request from a first user (e.g., user 1), an encrypted document is communicated to the safe, unencrypted, then encrypted with a key of a second user (e.g., user 2) before the data is transferred to user 2. Once encrypted with the key of the second user, the second user may access the data using the key of the second user. The second user may also establish the classification (e.g., permissions, rights, etc.) to the documents on the distributed ledger. By enabling users of the DDMS to create and use non-cryptocurrency blockchains, governmental regulations of cryptocurrency blockchains may be avoided.

An embodiment of a P2P distributed data management system may include a set of command functions for P2P distributed applications to selectively use to access and control data stored in a distributed ledger, the command functions, in response to receiving a call from a P2P distributed application, being configured to cause a processor to perform a function on the distributed ledger, the command functions including storing, encrypting, decrypting, and accessing the data stored on the distributed ledger.

An embodiment of a method of managing a distributed ledger including, in response to receiving, by a processor, a call from a P2P distributed application to write data to or access data stored on a distributed ledger, a location of the distributed ledger and operation to be performed on the distributed ledger may be identified from parameters of the call. The distributed ledger may be accessed at the location thereof. The operation may be performed with the data on the distributed ledger.

A P2P distributed data management system may include a set of data locks in selective communication with a distributed ledger, and configured to provide command functions for P2P distributed applications to use to access and control data stored in the distributed ledger. The set of data locks, in receiving a command selected from the command functions from a P2P distributed application, may further be configured to enable data of the P2P distributed application to be stored on the distributed ledger and to be accessible to the P2P distributed application when stored on the distributed ledger.

A process for managing security of a blockchain may include receiving a message from a P2P distributed application requesting access to a block on a blockchain for a user. In response to receiving the message, identity of the user requesting access to the block may be validated. In response to validating the identity of the user, the requested access to the block may be performed by (i) requesting a key associated with the identified user to be used to unlock the block, and (ii) in response to receiving a key associated with the user, unlocking the block to access content data stored in a data object contained in the block.

One embodiment of a method for enforcing one or more smart contracts on a blockchain, including, in response to a user request to perform a function to content data stored in a data object in a block on the blockchain, accessing a smart contract in the data object of the first block, the smart contract configured to control permissions for a user in performing functions to the content data. Available functions to which the user has access may be limited as controlled by the smart contract.

One embodiment of a controller may include a non-transitory memory configured to store data. An input/output (I/O) electronics may be configured to receive data into the controller and output data from the controller. A processor may be in communication with the memory and I/O electronics, where the memory stores instructions that, when executed by the processor, causes the processor to store content data received from a device into a data object, to create metadata associated with the data, and to store the metadata into the data object with the content data. One or more control parameters may be stored in the data object, and the data object may include the content data, metadata, and one or more control parameters in a block. The block may be communicated via the I/O electronics via a network to be added to a blockchain.

A device may include a non-transitory memory configured to store data, input/output (I/O) electronics configured to receive data into and output data from the device, and a processor in communication with the memory and I/O electronics. The processor may be configured to store content data received from a device into a data object, create metadata associated with the data, store the metadata into the data object with the content data, and store one or more control parameters in the data object. The data object including the content data, metadata, and one or more control parameters may be stored in a block. The block may be communicated via the I/O electronics via a network to be added to a blockchain.

A process may include storing content data created by a content owner into a block of a blockchain, and restricting access to the block as a function of ownership of the block. Access to the block may be shared with a recipient user by providing access rights to the block for that other user. The content owner may be enabled to alter access to the block of the recipient user.

BRIEF DESCRIPTION OF THE DRAWINGS

Illustrative embodiments of the present invention are described in detail below with reference to the attached drawing figures, which are incorporated by reference herein and wherein:

FIGS. 15A and 15B are illustrations of illustrative user interfaces for enabling a user to purchase an NFT to be associated with data and transact the NFT and associated data;

DETAILED DESCRIPTION OF THE DRAWINGS

Overview

Figure 1:
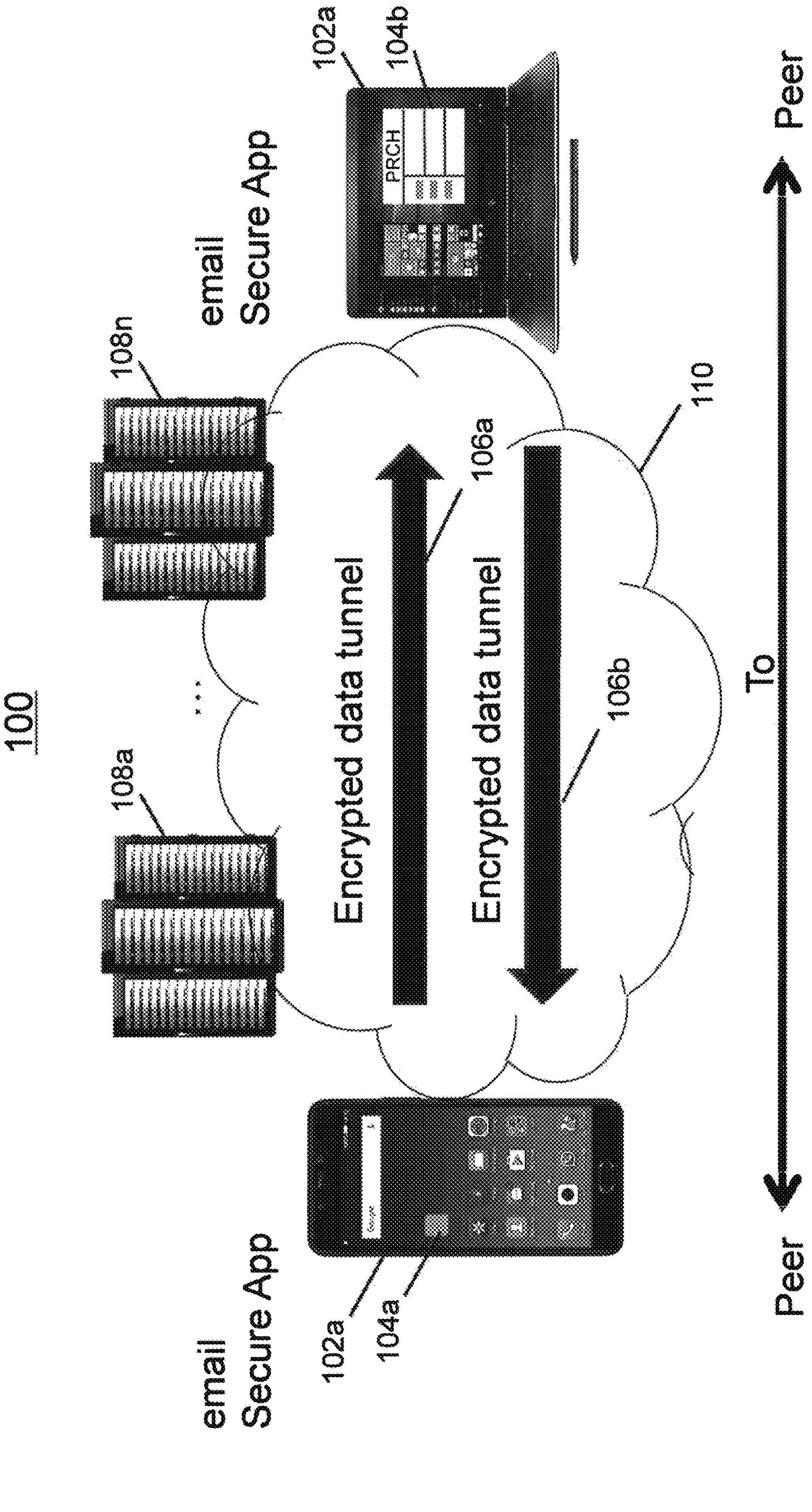
FIG. 1 is an illustration of an illustrative network environment in which a distributed database management system (DDMS) is provided to support peer-to-peer communications.

In a P2P distributed data management system (DDMS) in accordance with the principles described herein, data objects are "self-aware" and respond directly to calls or queries from DDMS-implemented P2P distributed applications or DDMS-implemented Internet-of-Things (IoT) devices. The DDMS is a highly granular, loosely coupled data architecture that utilizes late binding structures. The DDMS' self-aware data objects may be considered digital data building blocks (e.g., analogous to Lego® pieces) that are assembled dynamically or "on the fly" into structures in response to queries. Each query, therefore, imposes its own structure unhindered by any previous structure, thereby creating an anti-fragile system. Late binding removes the requirement for upfront hard-wiring of data relationships and hierarchies inherent to data warehouses. As such, the DDMS provides highly dynamic and flexible distributed data management capabilities with increased speed and reduced overhead. The DDMS utilizes a peer-to-peer (P2P) distributed application architecture that partitions tasks, workloads and data between peer devices, using some portion of their resources, such as processing power, disk storage or network bandwidth, without central coordination by servers or stable hosts. Peers are both suppliers and consumers of resources, in contrast to the traditional data warehouses in which resources are centralized.

Moreover, the DDMS is configured to ensure data is available, in real-time, to respond to any call or query (subject to defined security and access protocols). Data associations and context are specific to the query and are defined at the time the query is generated. The DDMS includes self-aware data objects that may contain all of the content data and metadata associated with that content data, but without the technical structure or formatting from originating hardware or software. Rather, a library of separate presentation objects may contain the necessary technical structure and formatting for all relevant hardware and software. Because each source/destination uses presentation and rules objects between themselves and the DDMS, the integration of many different data sources and destinations is simplified. Once connected to the DDMS, a new system has access (subject to defined security and access protocols) to the data stored within the DDMS. For example, each DDMS-implemented P2P distributed application of an enterprise may have access to all of the data of that P2P distributed application, which may be limited by rules, roles, or other restrictions on a user or group within the enterprise.

The configuration of the DDMS enables the DDMS to operate as an operating system that manages data on distributed ledgers, such as blockchains. In using distributed ledgers, a distributed data architecture enables secure storage and peer-to-peer data synchronization. As such, by definition, no data centralization is used, so there is no need for master data management, data ownership synchronization, or the other "patches" that were developed to solve the problems created by centralization and synchronization. At the same time, any P2P distributed application may request a file from the DDMS without any knowledge of the storage media or method. Likewise, users or target systems may request data from the DDMS without any knowledge of the blockchain, the rules, or the hardware, all of which is managed by the DDMS.

The DDMS, therefore, may be used to assemble data from various systems into whatever structures are required without regard to the origin of the content, originating system hardware or software, or structure. That data may therefore be assembled into any structure utilized by the query without any prior planning or setup.

DDMS System Operating on the Cloud

With regard to FIG. 1, an illustration of an illustrative network environment 100 in which a distributed database management system (DDMS) (see FIG. 3) is provided to support peer-to-peer communications is shown. The network environment 100 shows two devices 102*a* and 102*b* executing secure email apps 104*a* and 104*b* that operate on the devices 102*a* and 102*b* can communicate with each other and transfer data securely through encrypted data tunnels 106*a* and 106*b* without allowing interception at any point therebetween because the communications are peer-to-peer. Services 108*a*-108*n* are in communication with a network 110 through which the data tunnels 106*a* and 106*b* operate.

Figure 2:
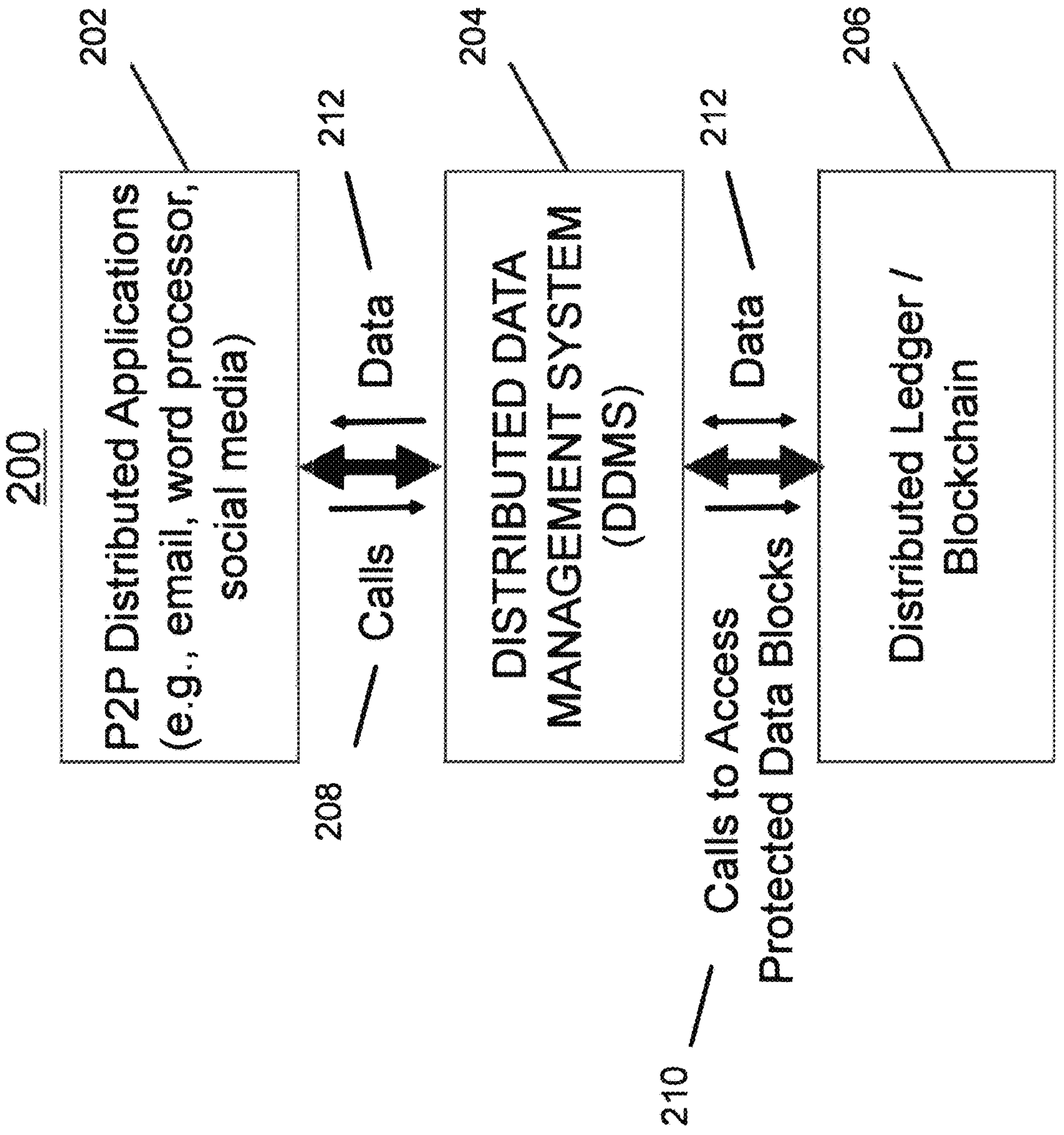
FIG. 2 is an illustration of an illustrative platform structure in which P2P distributed applications are built on a P2P distributed data management system that operates in an operating system-like manner to support and control access to data stored in a distributed ledger, such as one or more blockchains.

With regard to FIG. 2, an illustration of an illustrative platform structure 200 in which peer-to-peer (P2P) distributed applications 202 on an application layer are built on a P2P distributed data management system (DDMS) 204 or DDMS layer that operates in an operating system-like manner to support and control access to data stored in a distributed ledger 206 on a foundation layer, such as one or more blockchains, is shown. The different layers are an illustrative technology stack that utilizes the DDMS 204. The foundation layer, in this case distributed ledger 206, such as blockchain, provides for data storage for the P2P distributed applications 202. The P2P distributed data management system 204 that rides on top of the distributed ledger 206 on the foundation layer, and then the P2P distributed applications 202 on the application layer are built on top of the DDMS 204 on the DDMS layer. Calls 208 from the P2P distributed applications 202 are communicated to the P2P distributed data management system 204, which identifies where the relevant data is located and what the use is for that data, causes calls 210 to be communicated to the distributed ledger 206 to access protected data blocks on the distributed ledger 206. The DDMS 204 may determine whether the request is "legal," for example, and then the data 212 is communicated from the distributed ledger 206 and back through the P2P distributed data management system 204 back to the P2P distributed applications 202, as needed. For the purposes of this description, the P2P distributed applications are considered to be peer-to-peer distributed applications.

In general, the P2P distributed data management system maintains and maps data wherever the data exists, and migrates data as needed to meet new requirements. Peer-to-peer distributed applications can simply request that the DDMS 204 save or retrieve data, and the DDMS 204 locates the relevant blockchain, checks roles and profiles to ensure security and rights settings are followed, then transfers the correct data. The DDMS 204 enables development of secure and scalable enterprise and global P2P distributed applications that support permanent control of every piece of data.

As a practical example, each piece of content data may be stored on a separate blockchain and individually encrypted. As a result of the individual encryption, even if someone hacks into the distributed ledger, access is only gained to one blockchain of data (e.g., a single email) rather than the entirety of an account, or even all accounts.

Moreover, content data may be tracked and utilized where the content data is created and processed. As a result, an enterprise may create a data architecture to use all available storage for both scaling and business continuity. For example, an employee may have a company smart phone, laptop, and desktop in the office. The system may be configured so each of these three devices has a complete set of all the data the employee needs plus an allocated portion of a corporate data set, which allows fast local processing and data handling.

Additionally, combinations of devices may have a complete set of corporate data. Corporations with thousands of devices may have hundreds of redundant data sets, thereby maintaining business continuity even through a loss of one or more entire offices.

DDMS System

Figure 3:
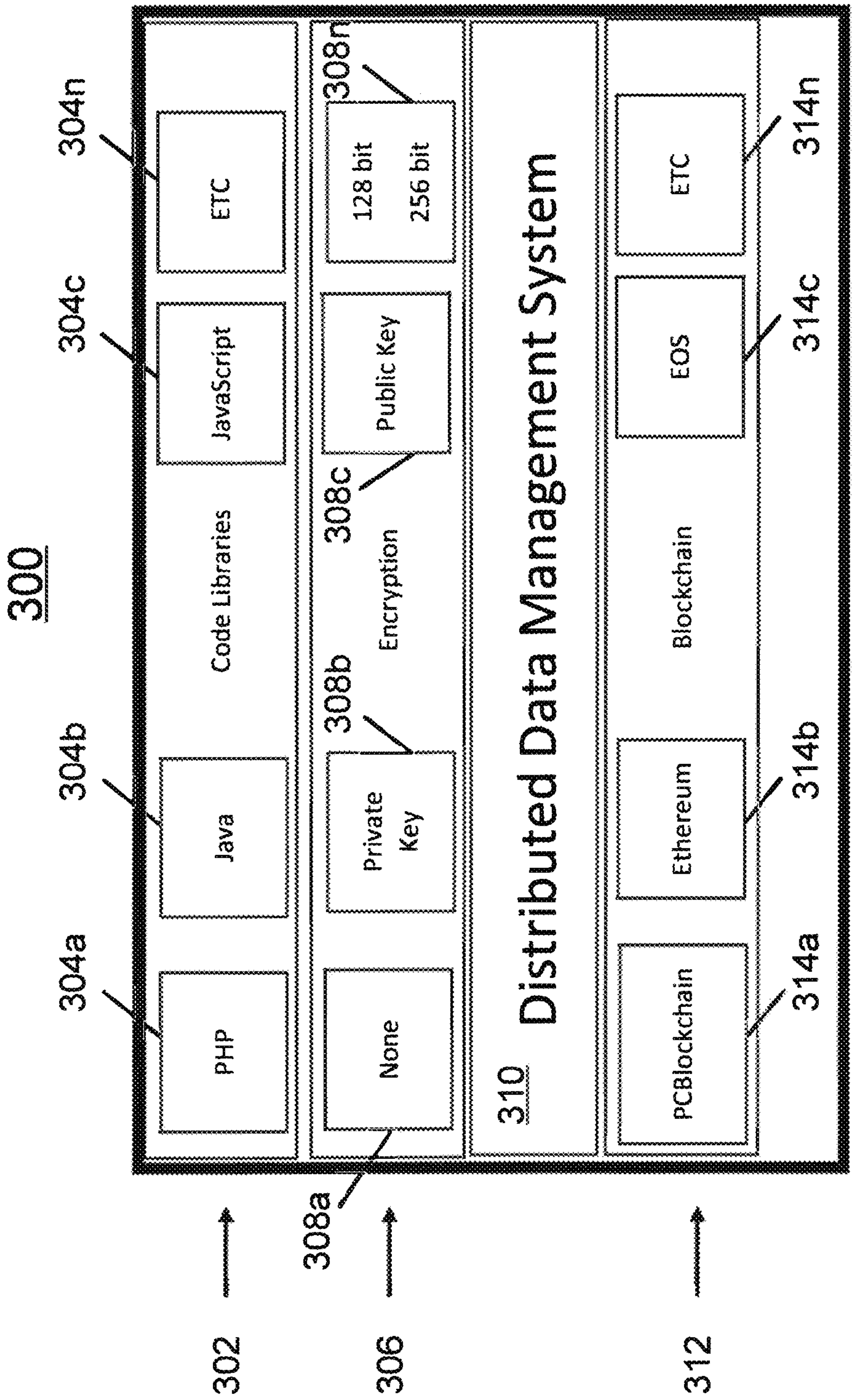
FIG. 3 is an illustration of a more detailed illustrative platform structure in which P2P distributed applications are built on a P2P distributed data management system (DDMS) that operates in an operating system-like manner to support and control access to data stored in a distributed ledger, such as one or more blockchains.

With regard to FIG. 3, a block diagram of an illustrative P2P distributed data management system layer structure 300 showing different layers of functionality is shown. That is, different layers of an illustrative technology stack that utilizes the DDMS of FIG. 2, are shown. At a top layer, a code library layer 302 including code libraries, such as PHP 304*a*, Java 304*b*, JavaScript 304*c*, etc. 304*n*, may be provided to support P2P distributed applications that are written in the different coding languages. In the event that a P2P distributed application with a new or different coding language than is currently available in the DDMS, other code libraries may be added. A next layer may be an encryption layer 306, which developers can choose to use no encryption 308*a*, private key encryption 308*b*, public key encryption 308*c*, 128 bit 308*n* A bit depth (e.g., 128 bit or 256 bit) may be selected by a user. A DDMS layer that includes a DDMS 310 (see FIG. 3B) is positioned below the encryption layer 306, and be configured to provide data management functionality as described herein. A foundation layer may be a data storage layer 312, and include a number of different data storage data structures for selection by a P2P distributed application via the DDMS 310. A valid blockchain may be used, including a proprietary blockchain 314*a*, Ethereum 314*b*, and EOS 314*c*, etc. 314*n*. It should be understood that alternative distributed ledgers or blockchains may be available, as well. In an embodiment, a data object (see FIG. 8B) includes content data, metadata, and control parameters. Typically, the DDMS 310 may be configured to encrypt the data object. However, in particularly secure environments, the DDMS 310 may be capable of individually encrypting the content data, metadata, and/or control parameters.

DDMS Architecture and Processing

The DDMS architecture is built on several categories of well-formed objects:

Data Objects: Data objects are the primary building blocks to which each incoming data element is written. The Data objects are further described herein, but the data itself is stored at a lowest level (i.e., data and metadata only without formatting). For example, a news story copy (i.e., text) that is published with an embedded picture is stored as two separate objects because the two data types may be requested and published separately Rules Objects: rules objects may encapsulate business logic used to process data. Rules objects may be built directly or may be created by ingesting the business logic of the source/target system, or a combination of both. Ingestion may absorb table definitions, stored procedures, triggers, program parameters and the like. Rules objects may also contain security rules, such as what roles and profiles are needed to access particular data.

Presentation Objects: presentation objects encapsulate technical logic used to access a target system, such as hardware specifications, protocols, and Application Programming Interfaces. The DDMS system architecture is designed from the ground up to not only support any hardware or software, but to be capable of supporting new hardware and software as released.

Abstraction Objects: abstraction objects contain abstracted data from the other objects for fast location and performance, and are used by the DDNS (see below) for being able to identify a block of a blockchain, for example. The abstraction objects may provide for a P2P distributed application to perform calls using a variety of different call parameters and the DDNS can locate a specific location of a block and/or blockchain at which the information being sought by the P2P distributed application is being stored.

Abstraction for High-Performance and Maximum Data Flow

The DDMS may also include a class of objects used to increase performance and facilitate the flow of data. These classes of object may include:

LookUp Objects: LookUp objects are a specialized type of abstraction objects (an abstraction of an abstraction) that provide location services for blockchains and specific data elements. As enterprises scale, LookUp objects scale through additional layers of abstraction. The LookUp objects work the same way Domain Name Services (DNS) work, where the higher-level LookUp objects know which lower-level LookUp objects cover which categories or domains and hold the specific locations of the data being sought. Because data objects are self-aware (i.e., the data objects hold all knowledge of themselves), the data objects may be listed in multiple LookUp objects for different or the same data. For example, a data object created by a weather radar simulation might be referenced by LookUp objects for weather, simulations, and model parameters.

Child Objects: child objects are clones synchronized to an original object, called the parent. Child objects inherit all aspects of the parent, including rules. So, if a parent data object requires users to be Security Level 2 or higher and the object spawns a child, the child inherits the rules of the parent and also require users to be Security Level 2 or higher.

The DDMS may operate as an operating system that manages data on distributed ledgers, such as blockchains. In using distributed ledgers, a distributed data architecture enables secure storage and peer-to-peer data synchronization. As such, by definition, no data centralization is used, so there is no need for Master Data Management, data ownership synchronization, or other "patches" typically used to solve the problems created by centralization and synchronization.

The DDMS manages data on the devices that use and create the data, using the processing power, storage, and bandwidth of the entire enterprise (e.g., a company, military, etc.). The DDMS may operate to support public blockchain or private blockchains. As such, the DDMS may perform much like an operating system, where any P2P distributed application can request a file from an operating system without any knowledge of the storage media or method. Likewise, users or target systems may request data from the DDMS without any knowledge of the blockchain, the rules or the hardware, all of which is managed by the DDMS.

For other conventional data management systems, distributed data storage may create performance and scaling problems, given network latency, the availability of individual devices, and similar problems. The DDMS addresses these issues using child objects simultaneously for performance and business continuity, spawning child objects and migrating the child objects around the enterprise. Data may therefore be retrieved from a nearest available object. In the case of demand surging, the system may forward cache to increase performance. Because the objects are encrypted and on a blockchain, integrity of the objects is checked and maintained so that parent and child objects are equally referential.

Self-Aware Data Objects as the Basis for Machine Learning

The DDMS assembles a foundation for machine learning by using the data recorded as a baseline, generating standard deviations, then measuring ongoing data against the standard deviations. For example, instead of traditional "If A, then B" programming, the DDMS may be set to react if any data element is, for example, +/−2-standard deviations. Therefore, input data may be evaluated against the historical use of that data to rapidly identify unusual occurrences that flag a major shift in the simulation environment. For example, if a radio call-sign is observed over time to occur on average once an hour and suddenly starts appearing 100 times in an hour, then the DDMS may identify a major shift in the use of that unit and adapt the forecast accordingly.

Because data objects contain 100 percent of the raw data, it is possible to generate metadata mathematically and use the metadata to predict change. For example, a temperature probe may record ambient temperature hourly: 1000 hours: 36; 1100 hours 37; 1200 hours 38; 1300 hours 38. As the data series grows, a rules object may calculate the mean, median, and standard deviation for the series.

Predictive models tend to fail because the models require preprogramming. For example, if A, then B. If the temperature increases by 10 degrees, then turn on the cooling system. This A then B preprogramming requires those setting up the model to know in advance all possible questions. With the DDMS, models may set and dynamically react to conditions. In effect, each data stream generates its own boundaries, and the DDMS may react if that data stream violates those boundaries. For example, a DDMS model tracking currencies might react to a five-percent move in the US Dollar because that would be a two standard deviation change. The same model might not react to a 50 percent move in a cryptocurrency, such as Dogecoin, because such a move would be less than a one standard deviation change.

Because the DDMS records 100 percent of the actual data and generates these mean, median, and standard deviations, the DDMS may be configured to dynamically build boundaries "on the fly" without human aid.

In an embodiment, the system may use machine learning through the use of rules objects that are Bayesian Sieves. Well-formed data objects are particularly adapted to use in Bayesian Sieves. Because all metadata is encapsulated and easily parsed via abstraction objects, Bayesian Sieves may group and sort data efficiently (RED=COLOR when adjacent to CAR; RED=TYPE when adjacent to WINE). Bayesian Sieves may therefore be used to automatically classify data, and impose dynamic tagging, thereby saving manpower in manual categorization of the data.

The DDMS may combine sensory data, historical data elements, and metadata into unified self-aware data objects. The data is self-aware in that each data object contains all the data and metadata used to present the data in context as information. Each time the data is called, the usage of the data is recorded as additional metadata, which is then written to new blocks that are added to the blockchain. For example, a P2P distributed application calls data to perform a function, which triggers a new block to be automatically formed to show the call within metadata of the new block.

Figure 4:
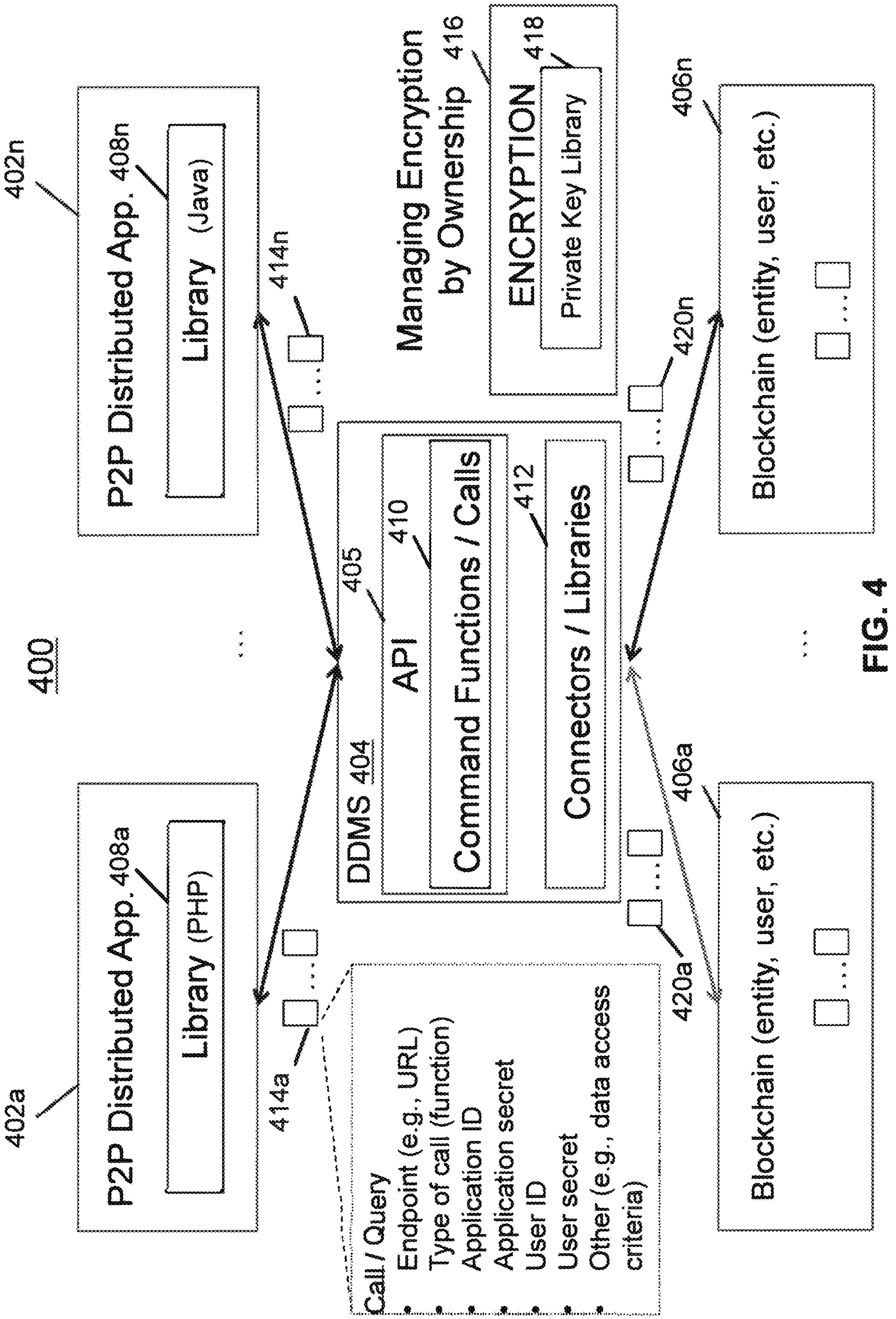
FIG. 4 is an illustration of a more detailed illustrative platform structure in which P2P distributed applications are built on a P2P distributed data management system that operates in an operating system-like manner to support and control access to data stored in a distributed ledger, such as one or more blockchains.

With regard to FIG. 4, an illustration of a more detailed illustrative platform structure or DDMS instance 400 in which P2P distributed applications 402*a*-402*n* (collectively 402) are built on a P2P distributed data management system 404, such as shown in FIG. 3, that operates in an operating system-like manner inclusive of an API 405, to support and control access to data stored in a distributed ledger, such as one or more blockchains 406*a*-406*n* (collectively 406) is shown. Application libraries 408*a*-408*n* (collectively 408) integrated into respective P2P distributed applications 402*a*-402*n* may be configured to make calls to the application programming interface (API) 405. The P2P distributed application 402*a* may utilize a PHP library 408*a*, while the P2P distributed application 402*n* may utilize a Java language library 408*n*. It should be understood that any language library may be utilized. The API 405 may include functions/calls 410 and connectors/libraries 412 to enable the P2P distributed applications 402 to communicate calls or queries (commands and data) 414*a*-414*n* (collectively 414) via the API 405 and with the blockchains 406. The calls or queries 414 may include a number of parameters, including an endpoint, type of call function, application ID, application secret, which identifies that application securely, user ID and user secret, which identifies users securely, and others, such as non-required elements (e.g., data access criteria). Encryption 418 may be selected by and managed by ownership of the data, meaning that a user of a P2P distributed application 402*a* may select a type of encryption 418 (e.g., private key library encryption 419) to be utilized to encrypt content data and metadata to be stored in blocks of a blockchain, such as blockchain 406*a*. Thus, functions and calls 410 may be pushed through the networks via connectors and libraries 412 and written into correct blocks, which are then added to the correct blockchain from amongst the blockchains 406 as determined by entity, user, etc. from parameters within the calls 414.

Figure 5:
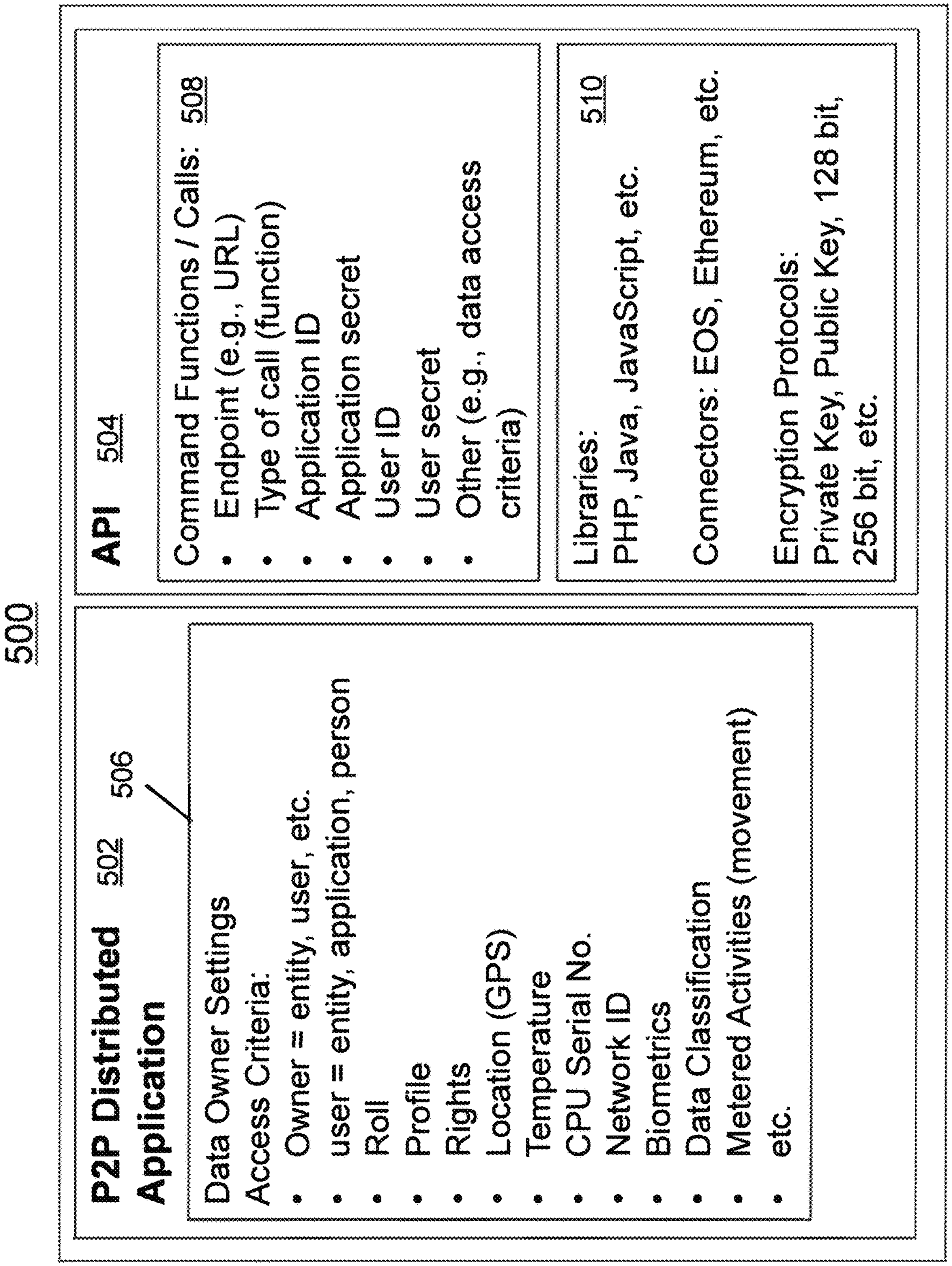
FIG. 5 is an illustration of illustrative control parameters of a P2P distributed application and API.

With regard to FIG. 5, an illustration of an illustrative data structure 500 of a DDMS in which a P2P distributed application 502 and API 504 is shown. The P2P distributed application 502 includes control parameters 506 and API 504 includes functions/calls 508, connectors, and encryption is shown. The control parameters 506 of the P2P distributed application 502 may include, but are not limited to, data owner settings, access criteria (e.g., owner=entity, user, etc., user=entity, application, person, role, profile, rights, location, etc.), and/or otherwise. It should be understood that a wide range of control parameters for P2P distributed applications may be provided. For example, if a blockchain is set up to manage non-fungible tokens (NFTs), then parameters for the NFTs may be utilized. The API 504 may include functions and calls 508, as previously described with regard to FIG. 4. In addition, libraries and connectors 510 may be provided. The libraries and connectors shown are illustrative, and it should be understood that others may be added, as needed, to support other programming languages, security types, and/or other connector protocols.

TABLE I

| Content Rights | | | | |
|---|---|---|---|---|
| Content Owner | U1 Grants All Rights | U1 Grants Reproduction Rights | User 1 Grants Editing Rights | User 1 Grants Read-Only Rights |
| User 1 | No downstream control | Can remove access to original data; cannot control clones | Can remove access to and control of original data and all edited versions | Can remove access to and control of original data; edited versions are prevented |
| User 2 | Full downstream control | Access to original data can be removed; becomes U1 with full downstream control for copies | Access to original data can be removed; Can remove access and control to edited versions of data | Access to original data can be removed or controlled by U1 |
| User 3 | Full downstream control | Access to original data can be removed by U1; access to copy of data can be removed by U2 | Access to original data can be removed by U1; access to edited data can be also be removed by U2 | Access to original data can be removed or controlled by U1 |

The control parameters 506 provide a content owner with the ability to control the content. A content owner is a user who creates original content or a user who is authorized by a content owner to edit content. As shown in TABLE I, four examples of control parameters 506 are shown.

All Rights: All rights gives complete control to subsequent users. As an example, User 1 is granted all rights, which means that User 1 has no downstream control if Users 2 and/or User 3 decide to republish, email, or otherwise utilize the data (e.g., word processing document, photograph, spreadsheet, or otherwise).

Reproduction Rights: Reproduction or copy rights allow a new and separate content object to be created. That is, the control parameters 506 may further provide the content owner with the ability to provide or not provide copy rights to other users to whom User 1 "sends" the data. As shown, User 1 can remove access to original data that User 1 creates, but cannot control copies of the original data. For User 2, User 1 can remove access to the original data (e.g., a block of data that User 1 "sends" to User 2). User 2 is also provided the same rights of User 1 for downstream data of User 2, including the ability to set control parameters 506 for downstream data from User 2, and once User 2 copies and "sends" the original content to others, User 1 is unable to remove access to or alter control of the content by User 2 or other users who thereafter receive the original content.

Editing Rights: Editing rights allow changes to be made to a content object as well as additional blocks in the same chain. The editing rights allow changes to be "rolled back" by the original user, and so that the user who created the original content is able to maintain control of the content as the content is "sent" or otherwise propagated downstream of the original user. As an example, User 1 may create, remove access to, and control original data and all edited versions of the data as User 1 "sends" the original content to User 2 and/or User 3. In the event that User 2 edits the original data or content, User 2 may communicate the edited content to User 3 (or any other user), and User 1 still has the ability to remove access to or otherwise control edited versions of the original content. If, for example, User 2 modifies the content in a manner not acceptable to User 1, then User 1 may delete or modify the modifications created by User 2. As another example, if a celebrity publishes a photograph or video and places the photograph or video on a network supported by the DDMS, then if the celebrity decides to "delete" the photograph from the DDMS-supported network, the celebrity simply removes access to the photograph or video, which may include removing access to everyone, certain groups (e.g., every other than a fan club), or certain individuals (e.g., everyone other than family members).

It should be understood that once original content is stored in a block, the content itself that is stored in that block cannot be deleted or edited. If access to the content is deleted and/or edited, then the deleted and/or edited content is stored in a next block on the blockchain, thereby preserving the original content in the original block. Access being removed simply means that rights associated with a key (e.g., key for User 2) are modified (e.g., access changed to no access), thereby preventing a DDMS-enabled P2P distributed application from accessing the data.

Read-Only Rights: Read-only writes only allows content in a content object to be viewed. As an example, User 1 may create contents and include in a block or object. User 1 may delete and control (e.g., edit) the original content. And because the content is read-only, User 1 cannot make edited versions of the content so that the content itself is limited to the original block, but additional blocks of a blockchain may include metadata based on rules that User 1 is granted, such as access to date and time stamps, content forwarding information, etc. Once the read-only content is "sent" to User 2, User 2 may only be able to read the read-only content, but not remove access to or otherwise edit the content. However, User 1 still has the ability to remove access to or control the content in a blockchain available to User 2 or downstream therefrom.

Extended Controls: The DDMS may provide for rights to the original owner to apply rights on an individual basis. For example, access rights may be turned ON or OFF on an individual basis (e.g., access to all users with the exception of User 37). As another example, rather than granting Editing or Read-Only rights, the original user can enable all of the content in a content object to be viewed or printed, but not be edited or copied. Depending on the original rights, rights may be fixed or altered after the original content is disseminated downstream. These and other rights may be controlled by "smart contracts," which are the rights that are embedded into the blockchain, as further described herein.

With further regard to FIG. 5, an illustration of an illustrative blockchain External Conditional Rules environment in which access criteria that are used by a distributed database platform supports conditional rules based on input from other systems that is only accessible when discrete profile conditions are met. That is, data objects may be opened and data unencrypted when certain conditions are met, such as:

- Geographic Locking: data can only be unencrypted at predetermined GPS coordinates;
- Device Locking: data can only be unencrypted when a device being used has a predetermined identifier, such as a CPU serial number, GPU identifier, or any other identifier or combination of identifiers of a device;
- Network locking: data can only be unencrypted when the device being used is connected to a predetermined network.

Connected system/sensor locking: data can be locked or its use governed by input from any connected system, including but not limited to: any chip or chip set in a device, any network or connected network device, any subsystem such as Global Positioning Systems or weather, any connected sensor that measures user biometrics, such as blood-alcohol level (collected by a breathalyzer or blood sensor), blood pressure, blood oxygen level, fingerprint (collected by a fingerprint sensor, smartphone with a fingerprint sensor), facial recognition (collected by an eye sensor or smartphone with facial recognition) and so forth, and connected activities meters that measure biometrics, such as heart rate, step counters, active minutes, and so forth, collected by devices configured to collect such activities.

Environmental locking: data can only be unencrypted under limited sensed environmental conditions, such as speed, vibration, orientation, temperature, elevation, etc. of a device, and determine whether or not to decrypt data stored in a block.

Classification locking: data may only be accessed based on data classification and whether a user classification (e.g., roll) and optionally need-to-know is authorized to access the data.

By combining the various access conditions (e.g., geographic locking, CPU locking, network locking, biometric locking, and classification locking, data access may be prevented from being accessed by someone who is not authorized to access the data or someone who is authorized to access the data, but only in the proper location (e.g., secured facility), and on a proper device (e.g., secured computer within a facility operating on a trusted network). It should be understood that additional and/or alternative locking conditions are contemplated. As described further herein with regard to FIGS. 10 and 11, a blockchain sequential smart contract module may be configured to limit data usage and access thereof based on one or more of the locking conditions.

DDMS-Implemented P2P Distributed Application

Figure 6:
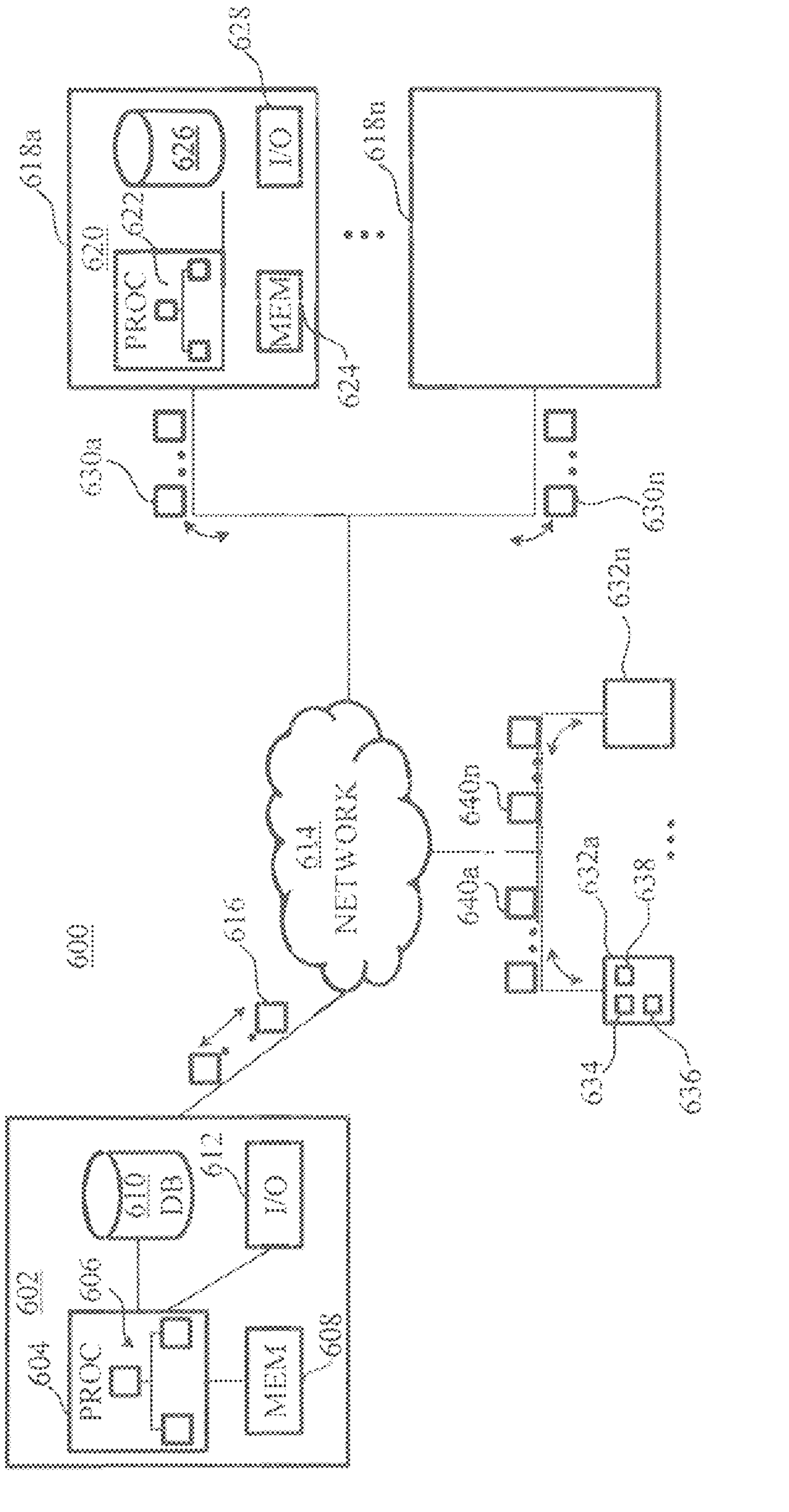
FIG. 6 is a block diagram is an illustration of an illustrative network in which DDMS-implemented P2P distributed applications are operating.

With regard to FIG. 6, a block diagram is an illustration of an illustrative network in which DDMS-implemented P2P distributed applications are operating is shown. The network 600 may include a computing system 602, such as a computer, on which a processor 604 executes software 606. The software 606 may include a DDMS platform that enables deployment of P2P distributed applications, DDMS, libraries, security, and blockchains, such as shown in FIGS. 3 and 4. The processor 604 may include a non-volatile memory 608 on which software and/or data may be stored. A database 610 may be in communication with the processor 604 and be configured to store data and/or software with which the processor 604 may interact. For example, the database 610 may include code libraries, encryption, API functions/calls and connectors/libraries (see FIG. 4), and/or other information for supporting the DDMS. Input/output electronics 612 may be utilized to communicate data via a communications network 614 in data packets 616, as understood in the art. The communications network 614 may be a local area network and/or wide area network Computing systems 618*a*-618*n* (collectively 618) may be located in the communications network 614, and enable P2P distributed applications integrated with the DDMS system to be distributed and executed thereby. As shown, the computing systems 618, which may be laptops and/or desktop computers, may include a processor 620 that executes software 622. The processors 620 may be in communication with a memory 624, database 626, and I/O electronics 628. Data from the computing systems 618 may be communicated via data packets 630*a*-630*n*. As understood in the art, the blockchains may be positioned on multiple computing systems 618 to provide for consensus. In operation, P2P distributed applications that are supported by the DDMS may communicate data to be stored on the blockchains that are stored on the computing systems 618.

As further shown, mobile devices 632*a*-632*m* (collectively 632) may be configured to execute P2P distributed applications supported by the DDMS that utilize blockchains. The mobile devices 632 may be mobile phones, laptop computers, smartphones, or any other mobile device. In an embodiment, the mobile devices 632 may be Internet-of-things (IoT) devices (see FIGS. 7A and 7B). The blockchains may be public or private blockchains, where the public blockchains enable anyone to view certain information of the public blockchains, whereas the private blockchains have limited access to the blockchains, such as to a private group (e.g., corporation, military, etc.). The mobile devices may include a processor 634 that communicates with memory 636 and input/output electronics 638 for communicating data in data packets 640*a*-640*m* (collectively 640). The data packets 640 may be communicated to any of the computing systems 618, mobile devices 632 and/or computing system 602.

In deploying a P2P distributed application that utilizes the DDMS, the computing system 602 may be used to configure the P2P distributed application with the DDMS and blockchain with which the P2P distributed application is to utilize in storing data into blocks of the blockchain. In an embodiment, a user may interface with the computing system 602 via any of the computing systems 618 or mobile devices 632 to initiate and download the P2P distributed application to the respective devices. Users of the P2P distributed applications on the computing systems 618.

DDMS-Implemented Internet-of-Things Examples

DDMS IoT: Controller Example

Figure 7A:
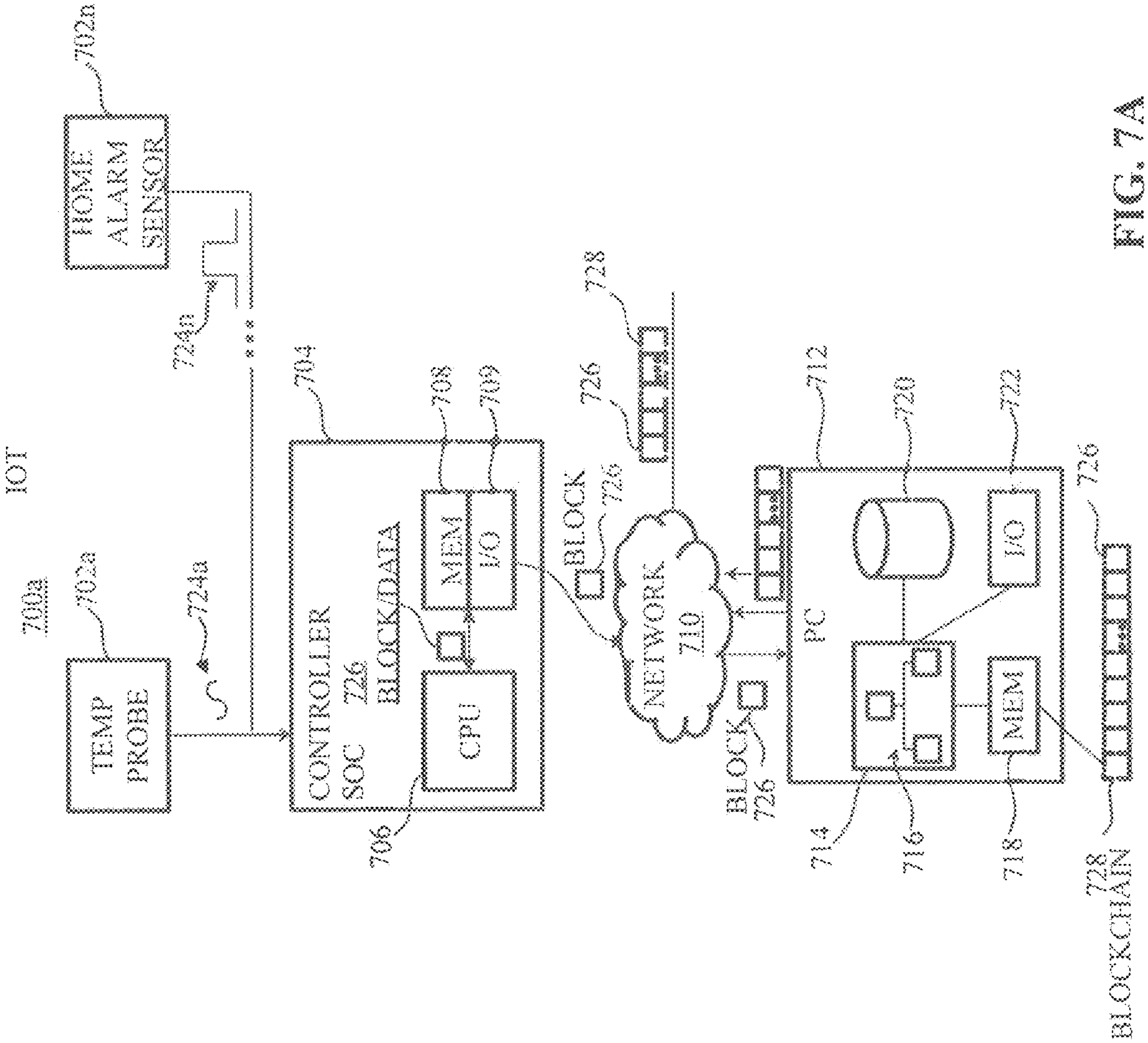
FIG. 7A is a block diagram of an instance of a P2P distributed application, in this case an Internet-of-things (IoT) P2P distributed application, that incorporates a DDMS-implemented P2P distributed application.

With regard to FIG. 7A, a block diagram of an instance of an IoT-enabled P2P distributed application 700, in this case an Internet-of-Things P2P distributed application, that incorporates a DDMS-implemented P2P distributed application is shown. The IoT-enabled P2P distributed application 700 may include a number of IoT devices 702*a*-702*n* (collectively 702), which may include a temperature probe 702, home alarm sensor 702*n*, and/or any other IoT device, as understood in the art. The IoT devices 702 may be in electrical communication, either via a wireline or wireless communication, with a controller 704. The controller, which may be a system on a chip (SoC), may include a central processing unit (CPU) 706 and memory 708 on which data may be stored. Input/output (I/O) electronics 709 may be configured to receive and communicate data from and to devices off of the controller 704. Because such controllers 704 that interface with IoT devices 702 (e.g., temperature probe) typically have low computing power capabilities (e.g., inexpensive processor), low-level software that is "light weight" may be integrated thereon. That is, a P2P distributed application or portion thereof may be executed by a processor on the IoT devices 702, and because the P2P distributed application or portion thereof is "light weight," the software has limited complexity and capable of being executed on a processor with limited bandwidth, processing capacity, and memory size.

The controller 704 may be in communication with a communications network 710 that may enable communications with a computing system 712, such as a personal computer, to occur. Other computing devices (not shown) may also be in communication with the communications network 710. The computing system 712 may include a processor 714 that executes software 716. The software 716 may include one or more DDMS-implemented P2P distributed applications, as previously described. The processor 714 may be in communication with a memory 718, storage unit 720, and I/O electronics 722.

In operation, the IoT devices 702 may be configured to sense or otherwise capture information, such as temperature, motion, or otherwise, and generate a signal, such as an analog signal 724*a* and/or digital signal 724*n* (collectively 724). Other signal types and/or protocols for communicating signals from the IoT devices 702 may be utilized. The controller 704 may include I/O electronics (not shown) that are configured to receive the signals 724, and the CPU may process the signals 724 and generate a block of data 726 ("block") for storage in the memory 708. The CPU 706 and/or memory 708 may execute low-level machine code for creating the block 726, thereby being fast and low overhead (i.e., utilizing minimal computing power). Rather than adding the block 726 being added to a blockchain at the controller 704, the block 726 may be communicated via the communications network 710 to the computing system 712 to be added to a blockchain 728 by the processor 714 and stored in the memory 718. Thereafter, the computing system 712 may communicate the blockchain 728 via the I/O electronics 722 back through the communications network 710 to other computing systems (not shown) for redundancy and consensus purposes, as understood with blockchain management.

Because the DDMS-implemented P2P distributed application utilizes the DDMS, the update of the blockchain 728 with the new block 726 on multiple computing systems may happen automatically across each of the computing systems being utilized to store the blockchain 726. And, as understood in the art, if an unauthorized change to the blockchain 728 on one of the computing system occurs, the change may be rejected as a result of the consensus being rejected by other computing systems. For example, if ten computing systems are storing the blockchain 728, then an unauthorized change to one would be overruled by the nine other computing systems.

DDMS IoT: Exoskeleton Example

Figure 7B:
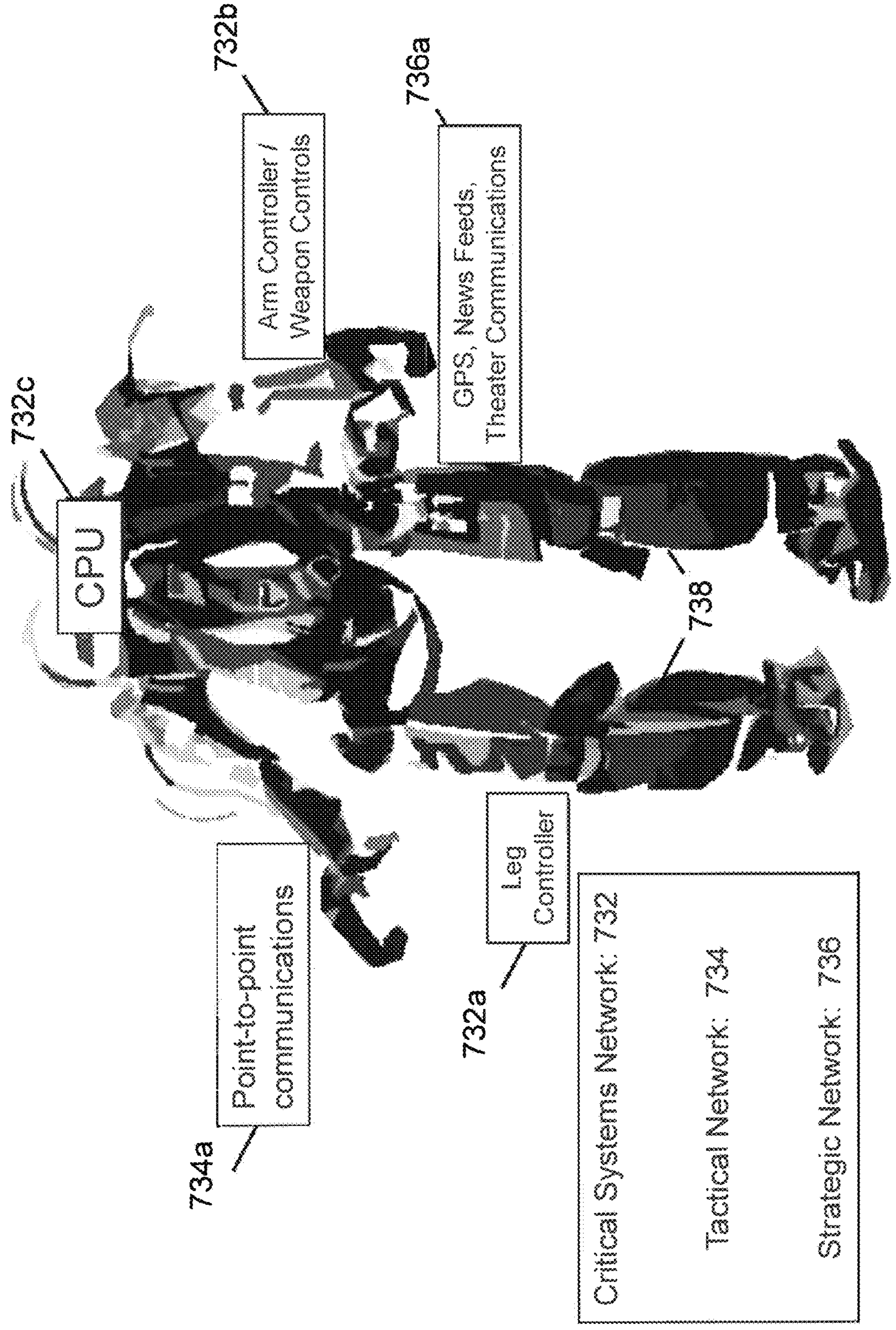
FIG. 7B is an illustration of a use case of an IoT system that includes an exoskeleton for use by a military.

With regard to FIG. 7B, an illustration of an illustrative Internet-of-Things environment 730 is shown in which a distributed database platform supports three networks 732, 734, and 736 on a military exoskeleton 700*b* with discrete security profiles, including:

(i) a Critical Systems Network 732 includes servicing or controlling devices of the exoskeleton, such as leg controller 732*a*, arm controller/weapon controller 732*b*, CPU 732*c*, and life support (not shown);

(ii) a Tactical Network 734 may provide for servicing or control of for company and sub-company level communications (e.g., point-to-point or line-of-sight communications); and (iii) a Strategic Network 736 may provide for servicing or control for area and theater level communications, such as GPS, news feeds, theater communications.

The Critical Systems Network 732 servicing the legs, arms, weapons and life support connects systems of an exoskeleton that must be protected "at all costs." In this environment, each data object may be locked to corresponding hardware through the use of an on-board processors' serial numbers, for example, as part of the decryption process, meaning that these systems can only take input from physical connections. This data object/hardware configuration may allow peer-to-peer communications only when the devices are physically attached by the exoskeleton. In this example, there is communication between two devices, the leg controller 732*a*, and the legs 738, which are two devices in the same exoskeleton (i.e., communications to devices on the critical systems network are not allowed from outside the exoskeleton itself). These data communications may be stored in blockchains in a secured manner for later review.

The Tactical Network 734 supports company, platoon, squad and fire-team level communications, such as maneuver orders, by locking allowable data objects to short-range communication systems, such as line-of-site laser relays. For example, devices, such as point-to-point communications device 734*a*, on a Tactical Sub-Network may be set up to use illegal Internet Protocol (IP) Address numbers (e.g., IP address 1.0.0.12) that cannot be routed, thereby limiting communications of the data objects among the IP addresses to the subnet. The relevant data objects controlling tactical devices, such as firing solutions, may be preloaded with the list of illegal Internet Protocol Address numbers and set to only accept input from those addresses, thereby allowing free or open communications within the subnet, while blocking all input from outside. By limiting communications to be within the subnet, hacking and other intrusions are prevented or otherwise filtered. The blockchain communications protocol used by the point-to-point communications device 734*a* allows peer-to-peer communications between two devices (not shown) of exoskeletons of different users, along with data communications that are stored in blockchains (not shown), in a secured manner. In this scenario, the blockchains may be clones of one another such that data stored in one blockchain are available at any of the cloned blockchains such that the devices (e.g., point-to-point communications device 734*a* and a corresponding communications device of another exoskeleton) may access the data within the blockchains based on rules (e.g., the sending Internet Protocol address is on the list of illegal Internet Protocol Address numbers from which to accept input). The cloned blockchains may be updated in real-time (e.g., fractions of a second), semi-real-time (e.g., one second to several seconds), or non-real-time (e.g., seconds to minutes). Data ownership and therefore usage are used by the DDMS to access the data as is proper (e.g., available to be viewed by a user), unencrypted, re-encrypted, then transferred to the user or users and re-encrypted with the respective user's key or keys embedded with the rights granted to them by the data owner and their roles and profiles. Also, in an embodiment, the list of legal users is fixed, secured in each blockchain, and cannot be changed while deployed; the list may only be updated between missions while in a secure area in preparation for a future deployment, for example. Data that is written and read use a pair of keys, one associated with each of the Users, to encrypt and decrypt the content stored in a block of the blockchains.

The Strategic Network 736 for area and theater level communications allows access to systems, such as Geographic Positioning System satellites, without allowing hacking from these outside networks to reach the tactical network 734 or critical networks 732. While the strategic network 736 allows outside access, it is entirely separate and unaware of the tactical network 734 and critical systems network 732. The data objects 736*a* of the strategic network 736 also provide enhanced security. Each of the data objects 736*a* may be encrypted separately, and rules may be set to prevent outside interference. For example, the data objects 736*a* for Global Positioning System local area maps and allowable satellites may be set to only allow updates while on a military base, and therefore locked and unchangeable anytime the exoskeleton 700*b* travels outside the boundaries of the military base.

Figure 12A:
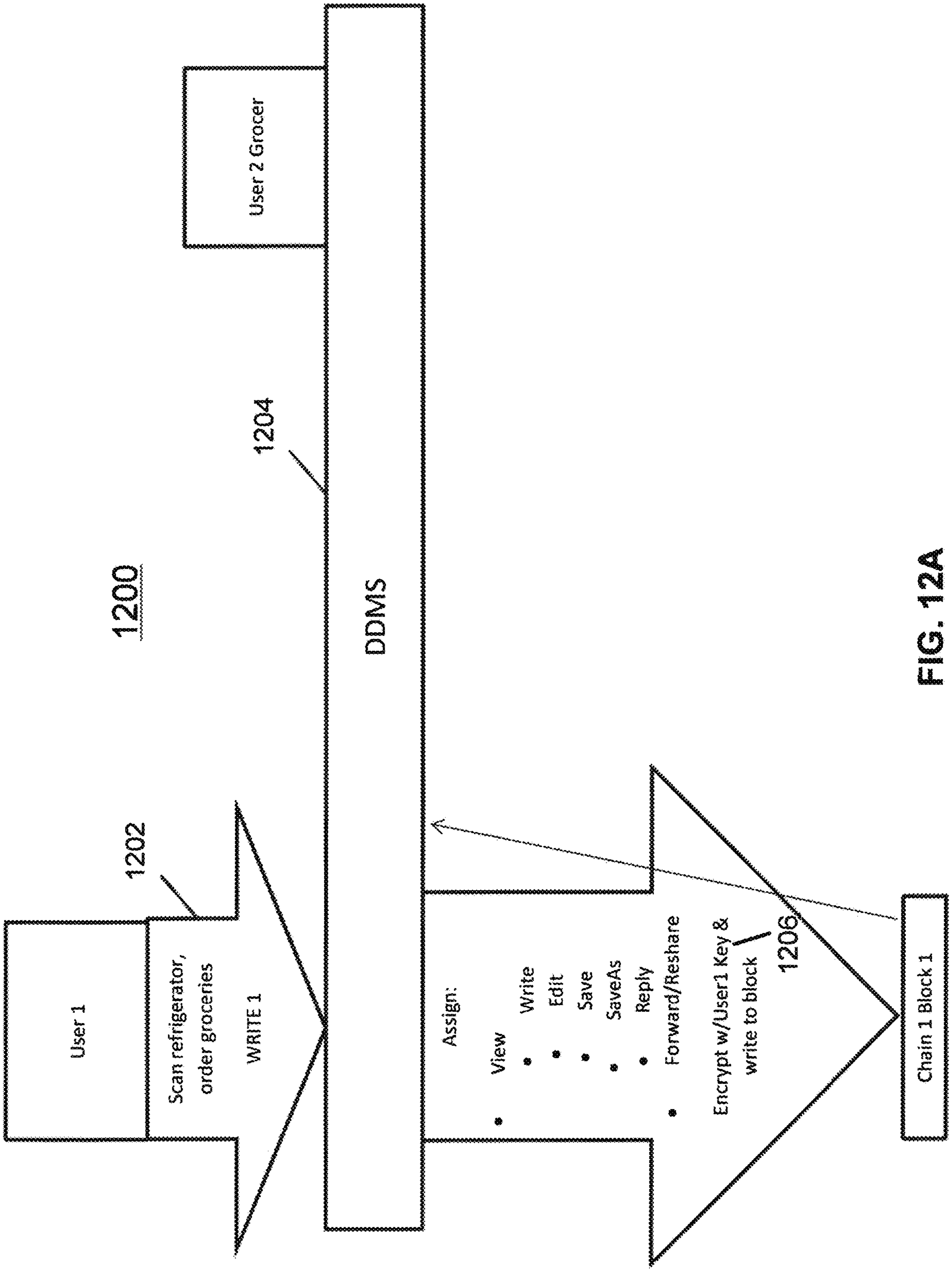
FIGS. 12A-12F are structural flow diagrams of the illustrative use case of FIGS. 7A-7C with detail structure and operation of an illustrative security protocol.
Figure 12B:
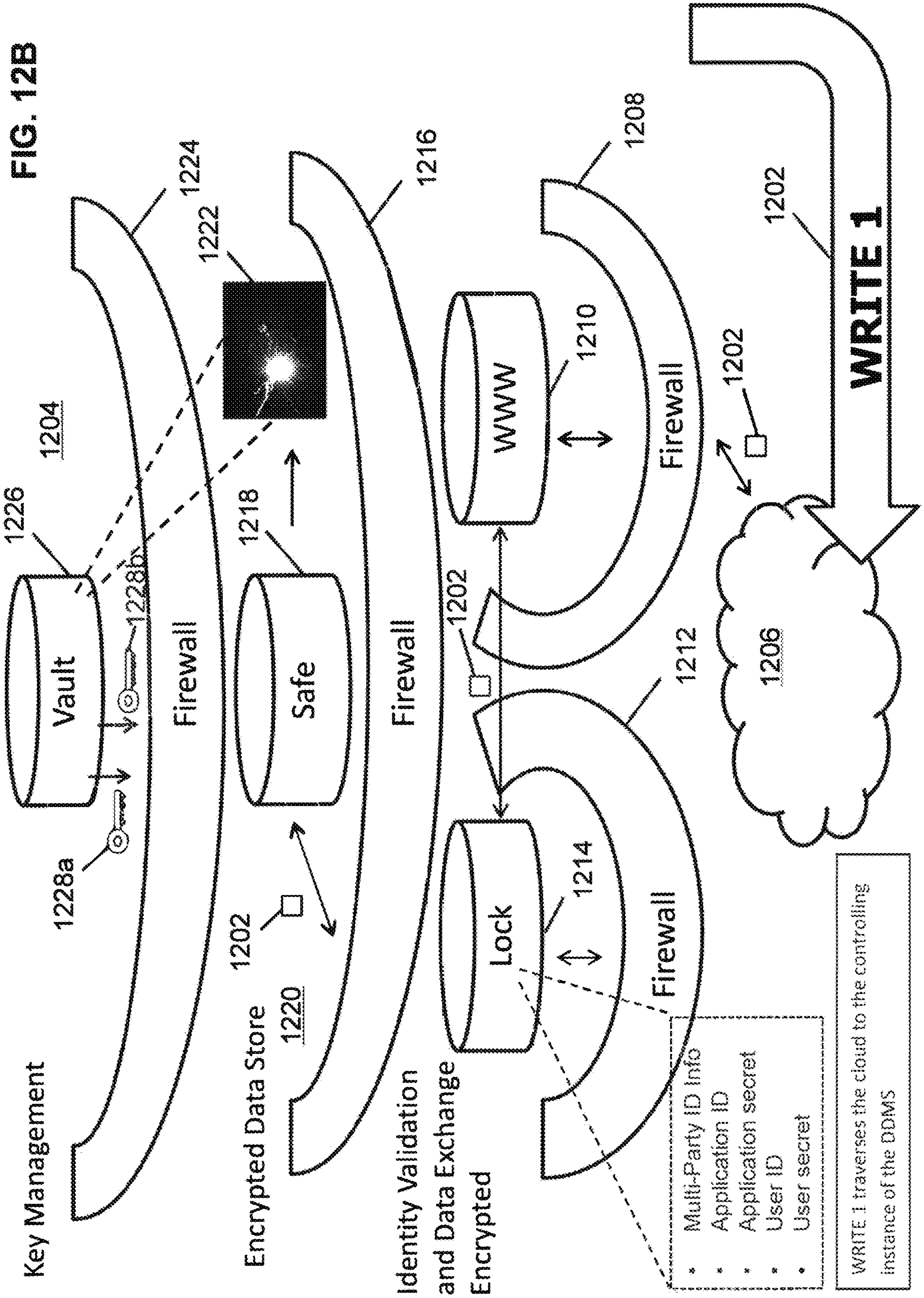

With a structure such as shown in FIG. 12B, in an embodiment, an illustrative use case for managing data for a communications P2P distributed application may be configured to support communications and/or operation of military equipment, such as the exoskeleton 700*b*. For example, a user of the exoskeleton 700*b* may receive data from Global Positioning System satellites. The data may be "sent" through a DDMS, checked to see if the data was received from a list of allowable satellites saved in a blockchain, and then written to a block and encrypted.

More particularly, mission updates for the user of the exoskeleton 700*b* are assigned functionality and rights written into blocks, which may then can be distributed to the rest of the unit via the tactical network 734 by adding the mission updates to the respective blockchains with keys of the respective other users (i.e., a key of User 1 written into a block "sent" by User 1 and written into a blockchain of User 2 and/or User 3). User 2 and User 3 may then access the Global Positioning System data of the strategic network 736 using their own respective keys.

Thereafter, and as further described herein, if User 1 is, for example, a unit commander and decides to delete or alter permissions and/or functionality of a block "sent" to any or all of the other users, in this case Users 2 and 3, then User 1 may use his or her key to access the block stored in each or both of the blockchains of Users 2 and 3 so as to delete (i.e., eliminate access to a block) or alter the permissions and/or functionality thereof.

For example, User 2 may command an "unsend" call to "unsend" one of the documents, such as the document that User 2 had just previously shared. In "unsending" the document, User 2 may remove the right of the other user(s) to unencrypt the document stored in the block. In effect, User 2 blocks that key from being capable of unlocking or unencrypting the block further. Therefore User 1 and User 3 may no longer see or access the shared file in respective Chain 1 Block 2 and Chain 3 Block 2 from User 2. In an alternative embodiment, rather than blocking the key, the message itself in each of the two blocks may be deleted by User 2. In addition to disabling the message, a variety of other permissions may be altered, such as disabling the ability to forward the message in the block. In an embodiment, initiating an "unsend" command causes the encryption key rights to be revoked from each of Users 1 and 3. For example, if User 2 "sends" data to User 1, the data is encrypted with the key for User 1, and User 1 is listed as an authorized user in a safe. If User 2 "unsends" Data 1 to User 1, User 1's authorization in a vault is removed. When User 1 asks to use Data 1, the safe determines that the request is an unauthorized request and refuses to unencrypt Data 1.

Comparison of Conventional Blockchains and DDMS-Implemented Blockchains

Figures 8A, 8B:
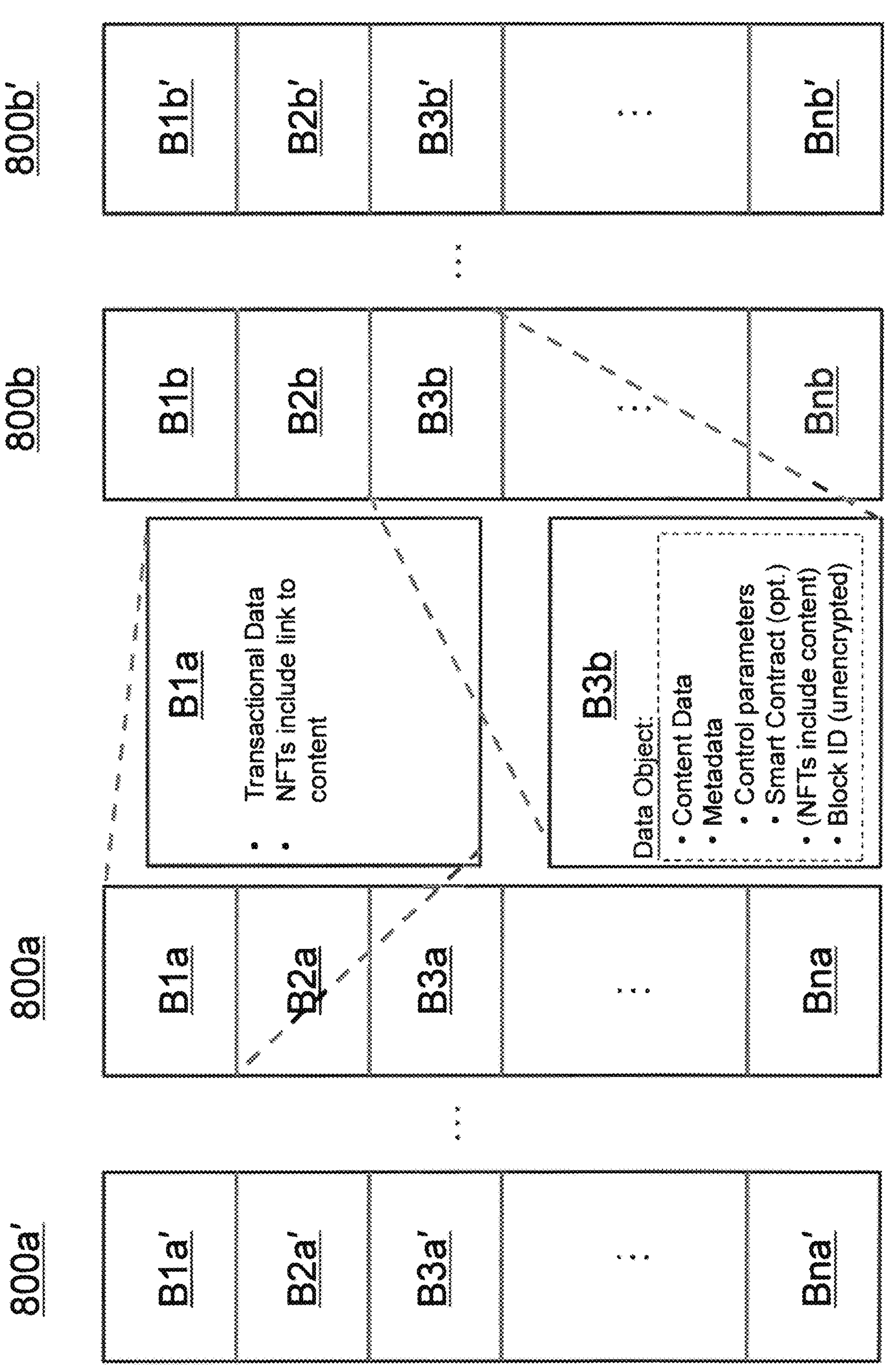
FIGS. 8A and 8B are illustrations that shows and differentiates traditional blockchains and new blockchains that support content and content management.

With regard to FIGS. 8A and 8B, illustrations that show and differentiate a traditional blockchain 800*a* and a new blockchain 802*b* according to the principles described herein data are shown. The traditional blockchain 800*a* includes multiple blocks (e.g., Ba1-Ban), and each of the blocks are write once, read many (WORM) data structures and only include transactional data. For each new transaction, a new block is created (e.g., blocks Ba2-Ban). Cryptocurrency is required to prove and encrypt each transaction. The traditional blockchain 800*a* may be cloned to form one or more cloned blockchains 800*a*' (e.g., as few as 4 or 5, but depending on the P2P distributed application, could be hundreds of cloned blockchains), and the cloned blockchains are synchronized and verified on multiple computing systems. As understood in the art, traditional NFTs stored on a blockchain include a linked network address to content, which is stored at the network address of the link. As such, the NFT content becomes accessible to others or may be lost altogether even in the event that the block/NFT is not hacked. Also, the traditional blockchain 800*a* includes various information, but the information is not considered to be encapsulated in a data object, as described hereinbelow with regard to FIG. 8B.

The new blockchain 800*b* that is DDMS-implemented also includes sequential blocks (e.g., B1*b*-Bnb) as with conventional blockchains. However, the contents of the blocks new blockchain 800*b* may include all data, including content, metadata, and control data. As with the conventional blockchain 800*a*, the new blockchain 800*b* may be cloned to form a blockchain 800*b*'. A smart contract (see below) may optionally be included in one or more blocks of the blockchain for use by a P2P distributed application in performing transactions. The content and metadata may be protected utilizing encryption. When new data is created (e.g., update to a word processing document), a new block may be created that includes the word processing document or changes thereto along with meta data. The block may record transactions, but does not prove the transactions, so any encryption may be utilized for the blockchain 802, as previously described. And, because immutability may not be utilized for the new blockchain 802, the cost of creating blocks is significantly lower. As with the traditional blockchain 800, the new blockchain 802 may be cloned, synchronized, and verified on multiple computing systems.

With further regard to the smart contract, each of the blocks B1*b* contains a data object (i.e., a logical construct) that may include an identifier of a content owner, control parameters governing use of the content data, and optionally a smart contract written thereto. As understood in the art, object-oriented methodology is a way of viewing software components and their relationships. Object-oriented methodology relies on three characteristics that define object-oriented languages: encapsulation, polymorphism, and inheritance. By using data objects, the DDMS (FIGS. 3, 4, and 12B, for example) may utilize data management processes that are not possible with conventional blockchains. Moreover, the integration of data objects within blockchains enables the DDMS to use processes that conventional relational database management systems cannot perform because conventional relational database management systems are centralized, thus not accommodating distributed data management capabilities.

For the purposes of the processes for the creation and use of blockchains, a data object may be considered an encapsulation of content data together with (i) control parameters that are used to manipulate the content data and (ii) control parameters that control information about the content data. Moreover, the data object has the ability to spawn child objects that inherit the data and control parameters of the parent data object. As a result of the encapsulation of the content data and control parameters (along with metadata), the data object is considered to be polymorphic, as further described hereinbelow.

Encapsulation refers to mechanisms that allow each object to have its own data and methods. Encapsulation for the blockchain in accordance with the principles means all of the information for performing functions commanded by a user are contained within the data object itself, and therefore the blocks of the blockchain support functions to be perform on the content as contained in the data object.

Polymorphism refers to the capability of having methods with the same names and parameter types that exhibit different behavior depending on the receiver. In other words, the same message may be "sent" to two different data objects and the two messages can respond in different ways.

Inheritance refers to the capability of defining a new data object that inherits from a parent data object (i.e., the content data and metadata inclusive of control parameters, ownership identifier(s), and so on). New content data and methods can be added to the new data object, but the content data and methods of the parent data object are available in the new data object without rewriting the contents of the data object (i.e., without rewriting the content data or metadata). In an embodiment, a data object that exhibits heredity may be spawned, where the spawned data object includes the content data and metadata of the parent data object. Hence, if a new block or blockchain is created (e.g., spawning or cloned), then the parent data object may be included in the new block or blockchain. Each blockchain has a common data object in each block of the blockchain, but the content data contained in each data object in respective blocks is typically different. For example, Block 0 may contain movie content and then each of the subsequent blocks (i.e., Block 1, Block 2, etc.) may include metadata with instructions for different releases of the movie in Block 0, such as theater movie version, home movie version, mobile device movie version, broadcast television movie version, cable television movie version, etc.

Each smart contract contains the rules governing the use of the data and metadata contained in the respective blocks B1*b*-Bnb of the blockchain 800*b*. The smart contract controls whether the data or content may be (i) copied, (ii) edited, and/or (iii) shared with others; (iv) a duration of use; (v) a number of times the data may be used; (vi) where and how it may be used, and/or otherwise. The smart contract may also contain fees for each type of use and may further be used to automatically collect the fees to enable access to a user. In particular, the smart contract may be a set of terms described in software code that, when executed, causes the DDMS to perform the contractual obligations stored in the respective blocks. The smart contract may also include parameters that a user establishes for the contract (e.g., $0.05 per play for one month). The DDMS may utilize the parameters when executing the code, as further described herein.

Each new blockchain can have multiple Smart Contracts that interact in chronological and/or sequential order. For example, a graphic artist designs a graphic that can be reused in online videos; the graphic is saved into a new blockchain with a Smart Contract that charges $0.10 per stream when used in an online video. A videographer then uses this graphic in an online video; this video is saved into a new blockchain with a Smart Contract that charges $1.00 per stream whenever it is viewed. Every time a user streams the video, a Smart Contract sequential processor automatically charges the users $1.00, then automatically performs a financial transaction in the Smart Contracts by crediting $0.90 to the videographer and $0.10 to the graphic artist.

TABLE II provides for a comparison between conventional and new blockchain offerings or functionality. As shown, conventional blockchains are based on cryptocurrency, while the new blockchains are encryption-protocol agnostic and not do not use cryptocurrencies, thereby avoiding a situation in which a cryptocurrency ceases to exist or mining for a cryptocurrency is disrupted due to technical failure or governmental restrictions. Conventional blockchains also consume vast amounts of energy due to cryptocurrency mining being required, while the new blockchain is "green" due to no cryptocurrency mining being utilized. Also, conventional cryptocurrency-based blockchains require the use of a digital wallet, while the new blockchains do not use digital wallets. As has been recognized to be problematic, if a user loses a password or the digital wallet is corrupted, the user is unable to access the digital wallet. Conventional blockchains include references to data, while the new blockchain embeds the data into the blocks of the blockchain, thereby providing users of the blockchain with permanent control and access to the data. Conventional blockchains do not provide data-level rights protection or piracy protection, which the new blockchain locks the data in its own digital safety deposit box and prevents unauthorized piracy. Conventional blockchains allow for a single smart contract per blockchain, while the new blockchain supports multiple, sequential smart contracts along with multiple forks per blockchain, where each fork may enable a different smart contract to be included thereon. As an example, content data (e.g., photograph or video) may be different in the blockchain than a fork extending from the blockchain. In particular, a video or movie may have a theatrical release version in the blockchain and a home or mobile device version in a forked blockchain.

TABLE II

| Conventional versus New Blockchains | |
|---|---|
| Conventional Blockchain Offerings | New Blockchain Offerings |
| Cryptocurrency based | Encryption agnostic; cryptocurrencies not required |
| Ecosystem damage through mining | Green-no mining required |
| Cryptocurrency based marketplaces and transactions | Marketplace agnostic, including credit card and currency-based purchasing |
| Digital Wallet required | No digital wallet required |
| Little long-term control over data due to data being stored remotely from the blockchain | Control and data permanently burned into blockchain |
| No data-level rights protection or piracy prevention | Each data element locked into its own Digital Safety Deposit Box; prevents unauthorized access and reduces piracy |
| Single smart contract per blockchain | Sequential smart contracts per blockchain |
| Linear blockchain structure | Forked blockchain structure enabled |

DDMS-Implemented P2P Distributed Application Operations Example

Figure 9:
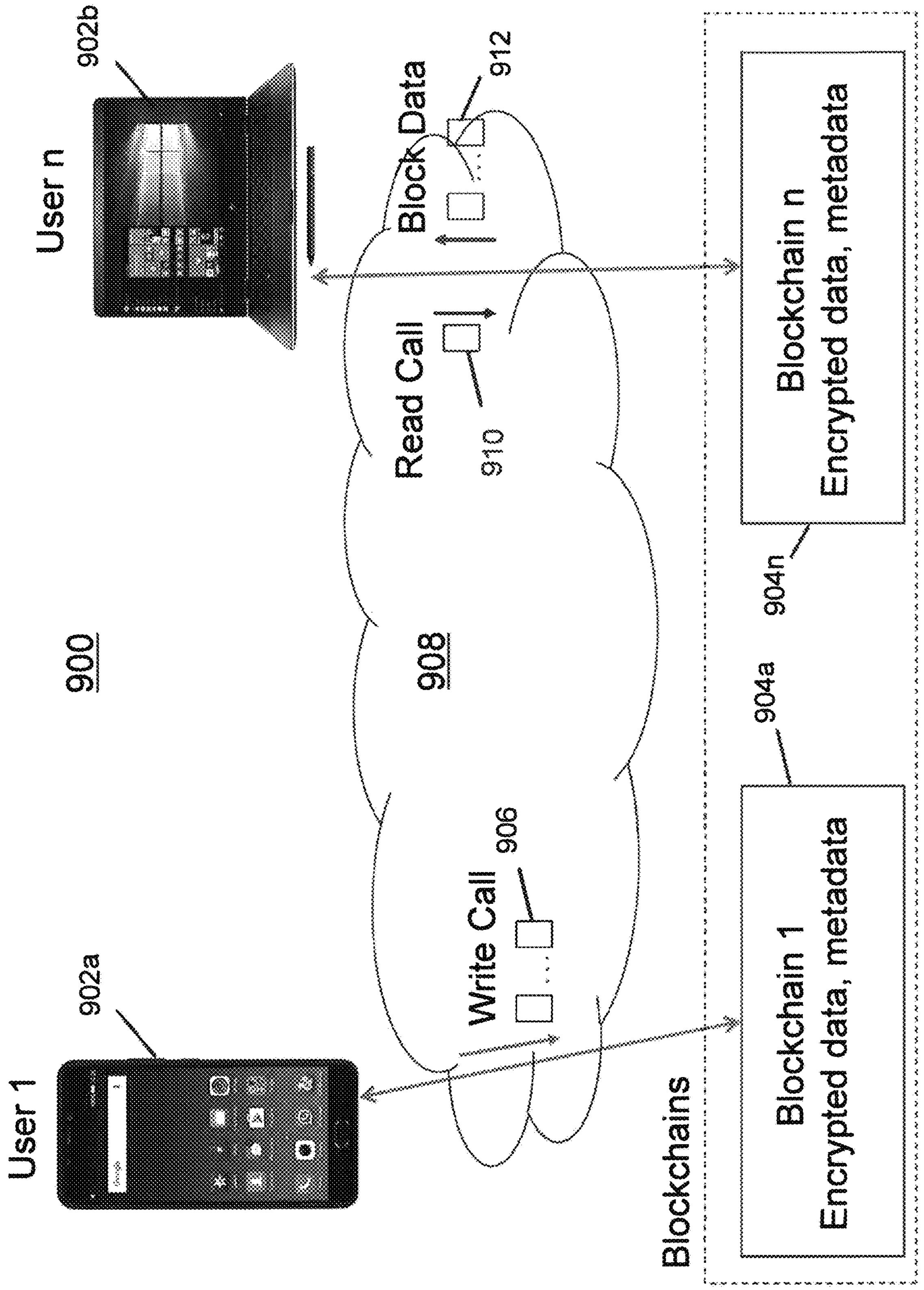
FIG. 9 is an illustration of an illustrative network environment in which a distributed database platform to support peer-to-peer communications between two users, User 1 and User n, along with data communications that are stored in respective blockchains, blockchain 1 and blockchain n, in a secured manner.

With regard to FIG. 9, an illustration of an illustrative network environment 900 in which a distributed database platform to support peer-to-peer communications between two devices 902*a* and 902*b* of users, respectively User 1 and User n, along with data communications that are stored in blockchains 904*a*-904*n* (collectively 904), in a secured manner is shown. In this scenario, the blockchains 904 are clones of one another such that data stored in one blockchain are available at any of the cloned blockchains such that the devices 902*a* and 902*b* may access the data within the blockchains 904 based on rules (e.g., closest storage location to the respective devices 902*a* and 902*b*). The cloned blockchains 904 may be updated in real-time (e.g., fractions of a second), semi-real-time (e.g., fraction of a second to several seconds), or non-real-time (e.g., seconds to minutes). Data ownership and therefore usage are used by the DDMS to access the data as is proper (e.g., available to be viewed by a user), unencrypted, re-encrypted, then transferred to the user or users and re-encrypted with the respective user's key or keys embedded with the rights granted to them by the data owner and their roles and profiles. Data that is written and read use a pair of keys, one associated with each of the Users, to encrypt and decrypt the content stored in a block of the blockchains 904. As shown, write calls 906 via a network 908 is used to write to the blockchain 904*a* and read call 910 is used to read data from the blockchain 904*n*.

DDMS Logic Flow Diagrams for Use Cases

Figure 10A:
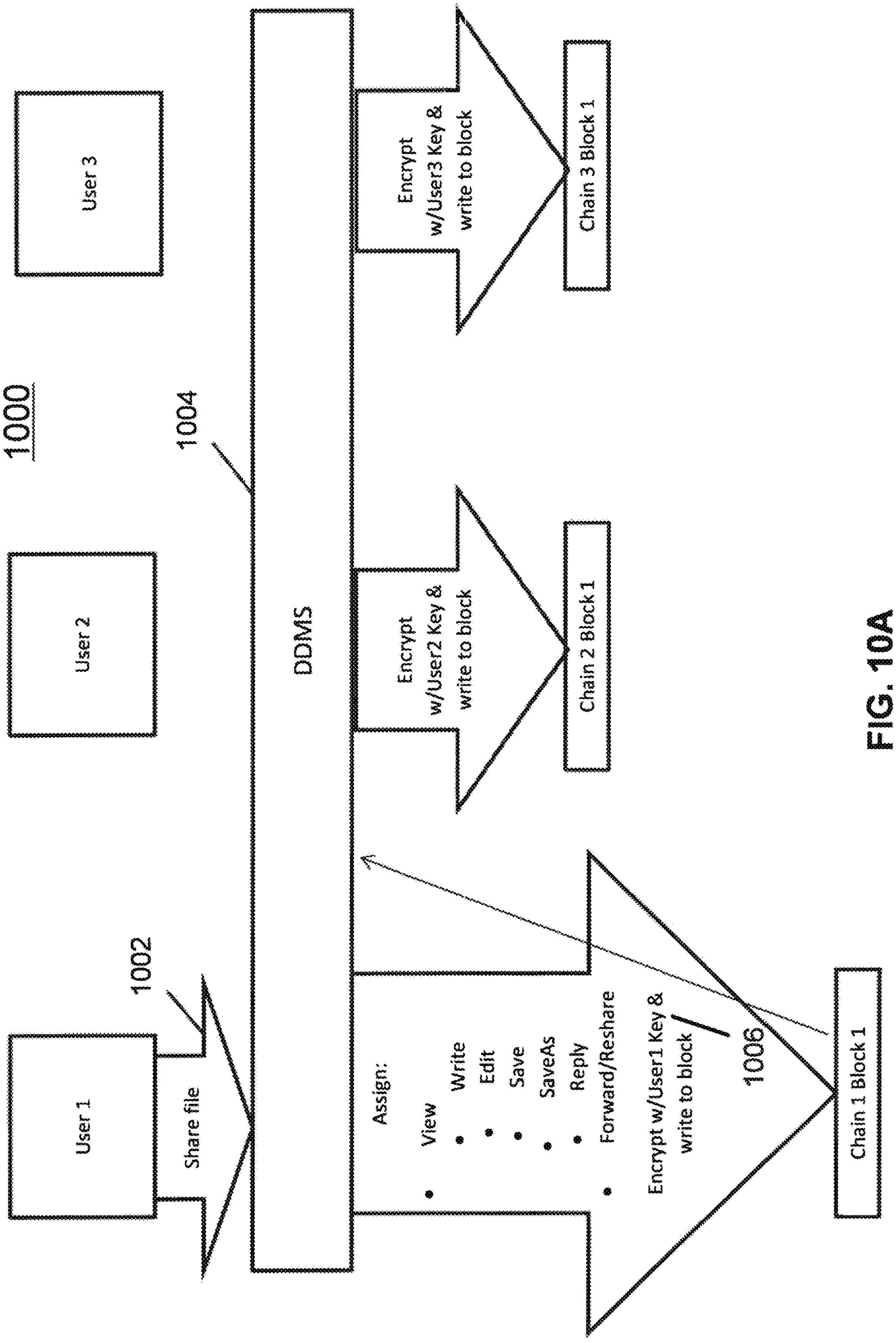
FIGS. 10A-10C are structural flow diagrams of an illustrative use case for managing data for a communications P2P distributed application.
Figure 10B:
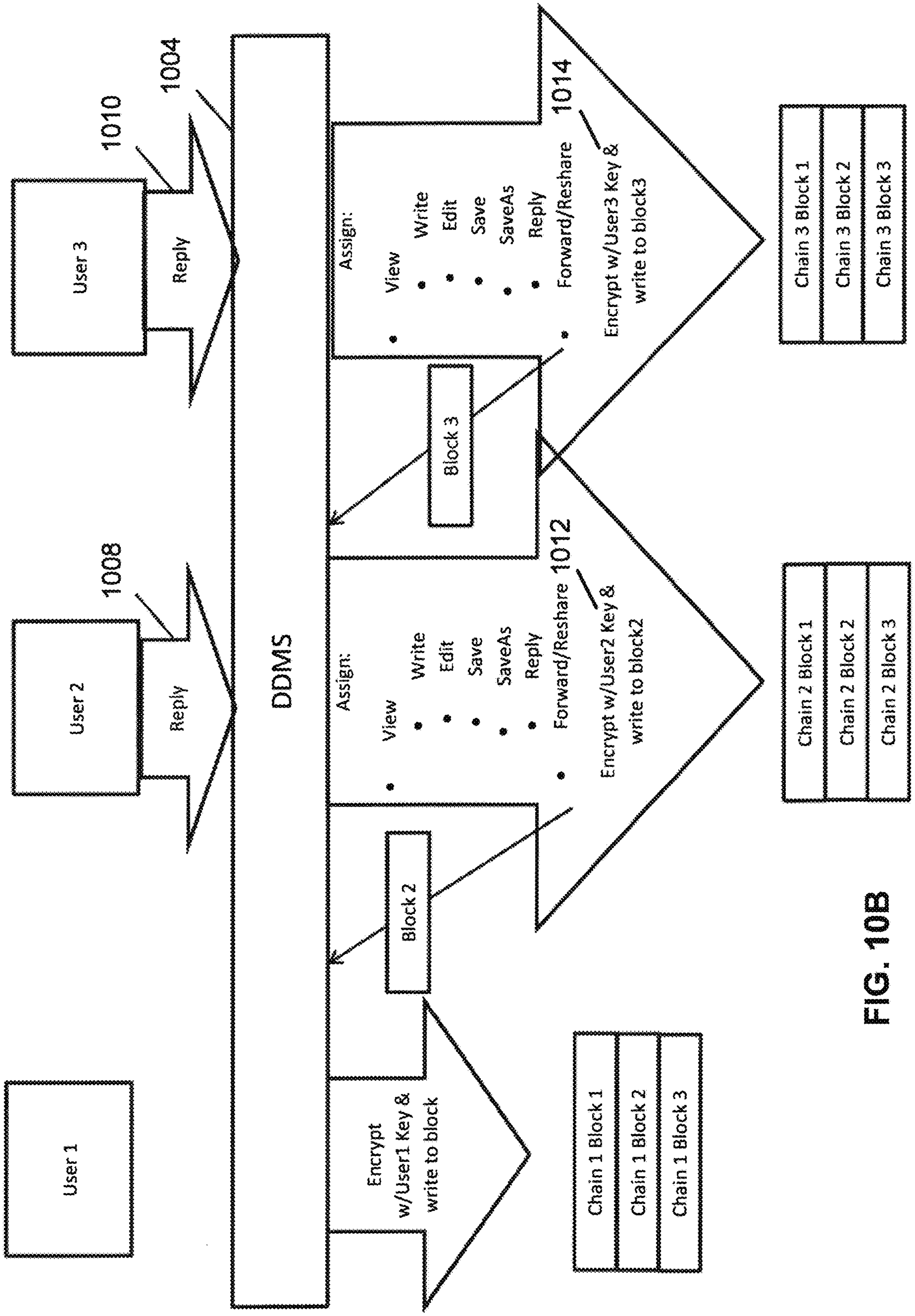
Figure 10C:
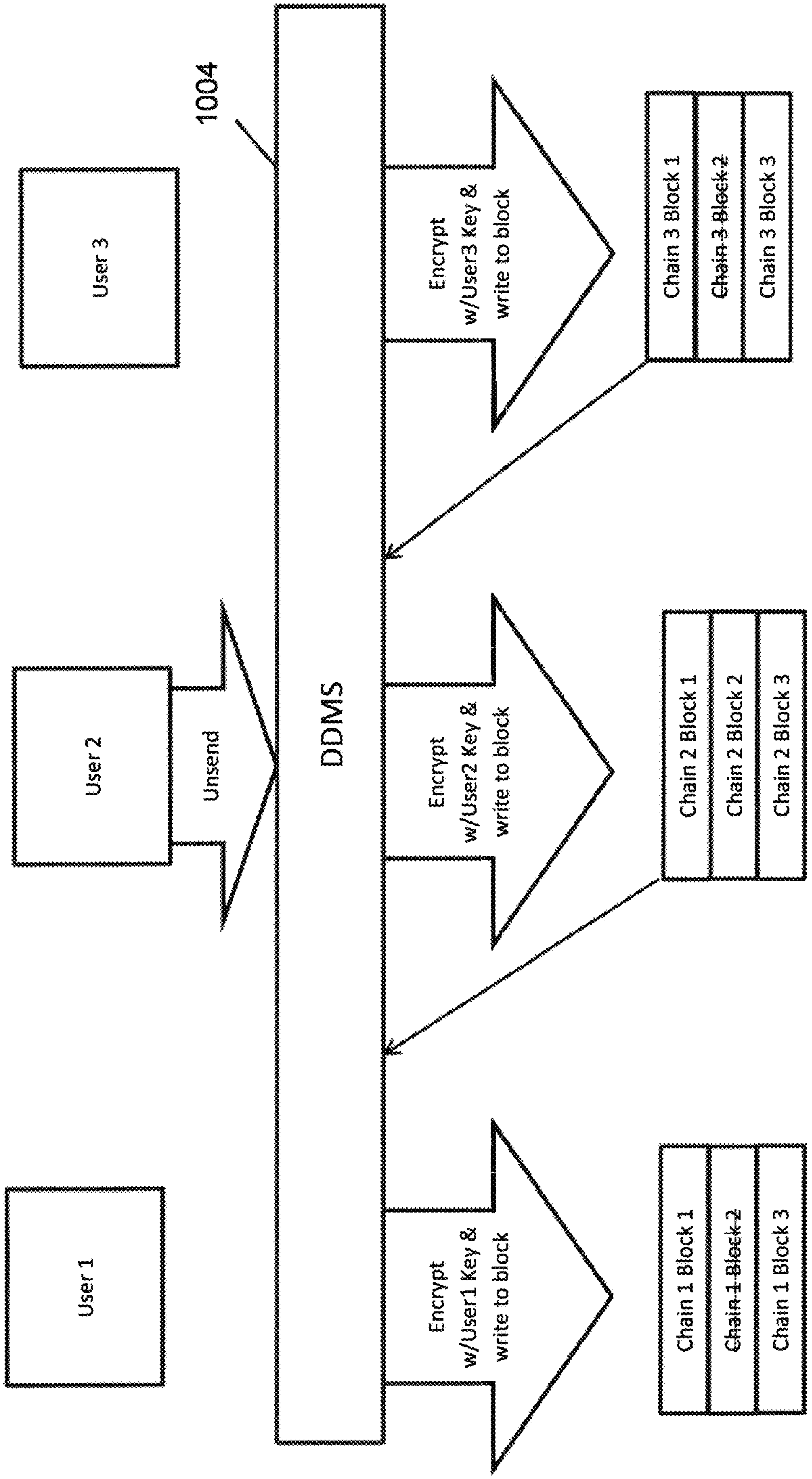

With regard to FIGS. 10A-10C (collectively FIG. 10), structural flow diagrams of an illustrative use case 1000 for managing data for a communications P2P distributed application are shown. As shown, user 1 may create and "send" an email 1002 to user 2 and user 3. It should be understood that the email could be any file, but the use of an email is for a communications P2P distributed application. The email is "sent" through a DDMS 1004, where the email 1002 is unencrypted with a User 1 key 1006, to enable the email 1006 to be processed and then written to a block with the keys separately of User 2 and User 3. Each block is written with a separate key for each user having access to that block of the respective blockchain. The DDMS 1004 then encrypts each reply 1008 and 1010 the same way. The reply 1008 of User 2 may be unencrypted with key 1012 of User 2 and then the reply 1008 stored in Block 2 of Chain 2 is "sent" to User 1 to be stored as Chain 1 Block 2 of User 1 using the keys 1006 and 1012 of Users 1 and 2. Similarly, the reply 1010 of User 3 may be stored as Chain 3 Block 3, and the Block 3 may be stored as Chain 2 Block 3 for User 3 and Chain 1 Block 3 for User 1, where the blocks are each stored and encrypted with a pair of keys with the two different users (i.e., Chain 1 Block 3 is stored and encrypted with Users 1 and 3 keys 1006 and 1014, Chain 2 Block 3 is stored and encrypted with keys 1012 and 1014 of Users 2 and 3). The three blockchains are automatically cloned and each of Users 1-3 have access to the content in the blocks of the different blockchains since each are part of the conversation. In being "sent," the email is actually unencrypted in a safe (see FIGS. 12B-12E) and then encrypted and written to a block and stored on a recipient's blockchain. From a user's perspective, however, an email P2P distributed application appears to function as conventional email P2P distributed applications (e.g., "send" email), but the communication process of the emails is handled using the blockchain process described herein.

In operation, as shown in FIGS. 10A and 10B, User 1 shares a file (e.g., email, document, etc.) with User 2 and User 3. Rights to the file are assigned during the process of creating a block, Block 1, and encrypted with a key 1006 associated with User 1. The file stored in the block is then unencrypted in the P2P distributed data management system and re-encrypted with respective keys of User 2 and User 3 so that each of the users can access (e.g., view, read, edit, save, etc.) the file stored in the block and added to the blockchain (e.g., Chain 1, Chain 2, and/or Chain 3).

More particularly, updates and replies of each of the users (e.g., any of Users 1-3) are assigned functionality and rights written into blocks and then added to the respective blockchains with the keys of the respective other users (i.e., a key of User 1 written into a block "sent" by User 1 and written into a blockchain of User 2 and/or User 3). Thereafter, and as further described herein, if User 1 decides to delete or alter permissions and/or functionality of the block "sent" to any or all of the other users, in this case Users 2 and 3, then User 1 uses his or her key to access the block stored in each or both of the blockchains of Users 2 and 3 so as to delete or alter the permissions and/or functionality thereof.

For example, as shown in FIG. 10C, User 2 may initiate an "unsend" call 1016 to "unsend" one of the documents, such as the document that User 2 had just previously shared. User 2 may remove the right to unencrypt the document stored in the block of the other user(s) in an embodiment. In effect, User 2 blocks that key from being capable of unlocking or unencrypting the block further. Therefore User 1 and User 3 can no longer see or access the shared file in respective Chain 1 Block 2 and Chain 3 Block 2 from User 2. In an alternative embodiment, rather than blocking the key, the message itself in each of the two blocks may be "deleted" by User 2. In addition to "deleting" the message, a variety of other permissions may be altered, such as disabling the ability to "forward" the message in the block. In an embodiment, initiating an "unsend" command causes the encryption key rights to be revoked from each of Users 1 and 3. For example, if User 2 "sends" data to User 1, the data is encrypted with the key for User 1, and User 1 is listed as an authorized user in the Safe. If User 2 "unsends" Data 1 to User 1, User 1's authorization in the safe is removed. When User 1 asks to use Data 1, the safe sees the request as an unauthorized request and refuses to unencrypt Data 1.

Figure 11A:
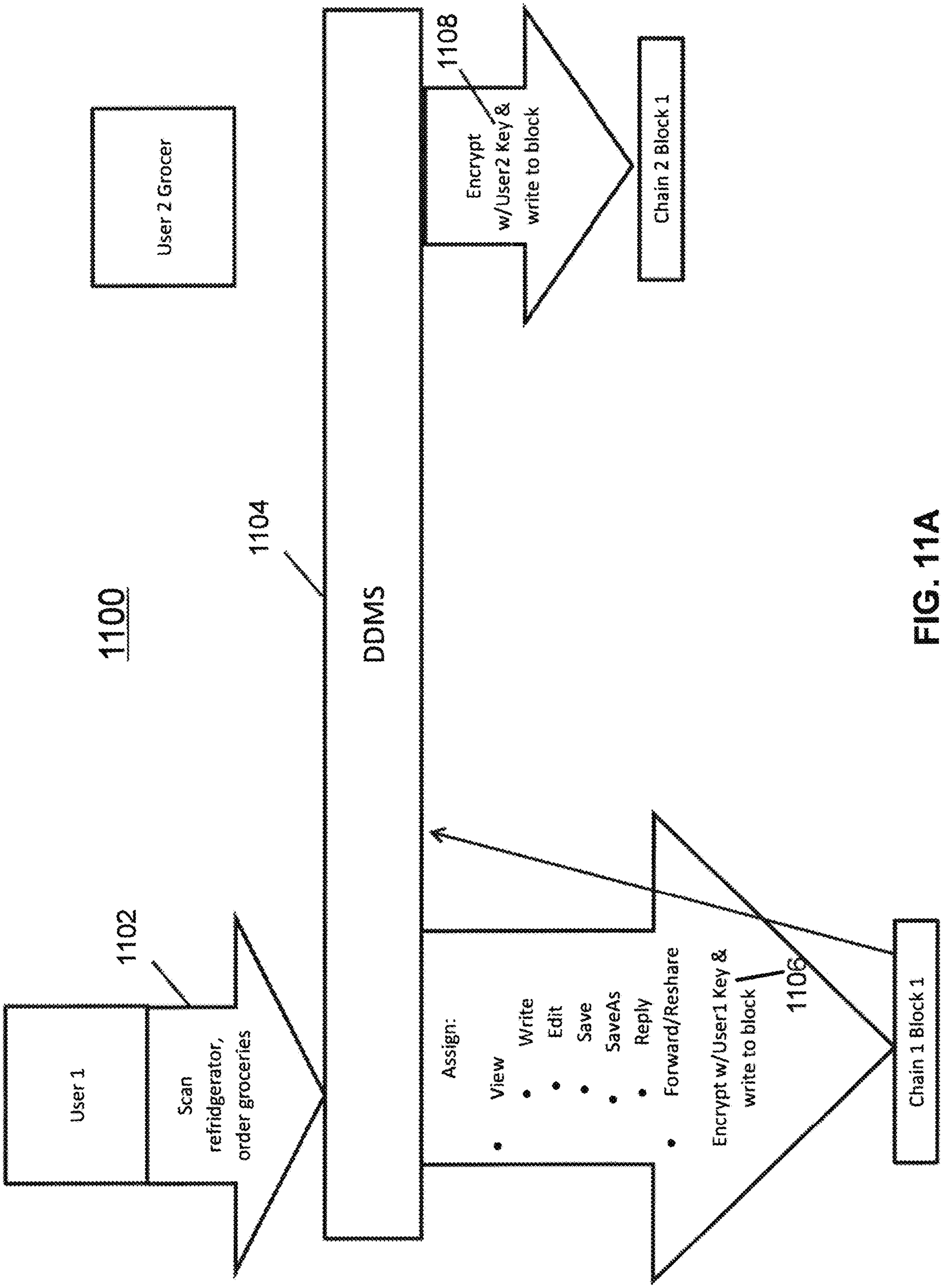
FIGS. 11A-11C are structural flow diagrams of a second illustrative use case for an Internet-of-Things file sharing by a first user to multiple other users.
Figure 11B:
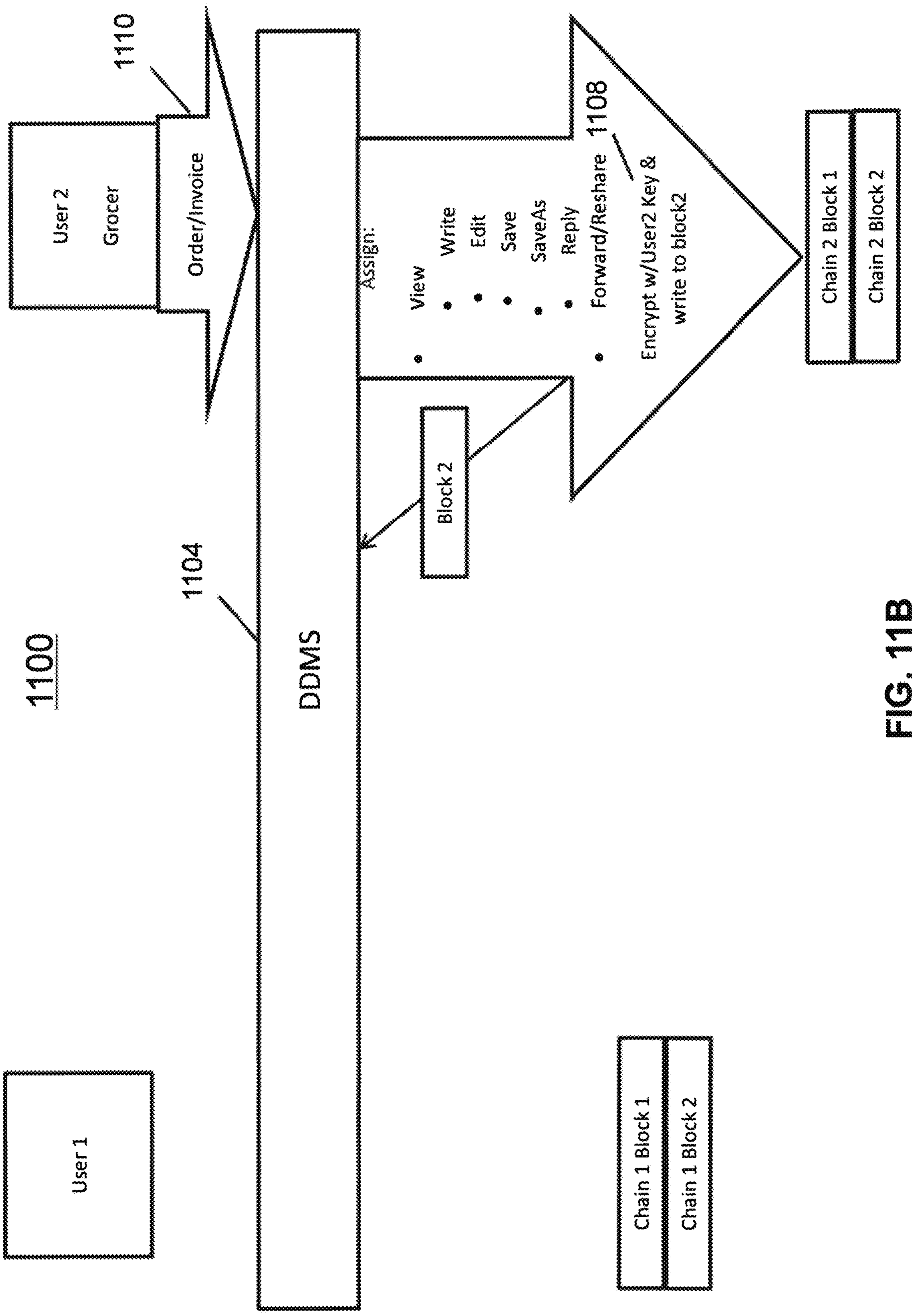
Figure 11C:
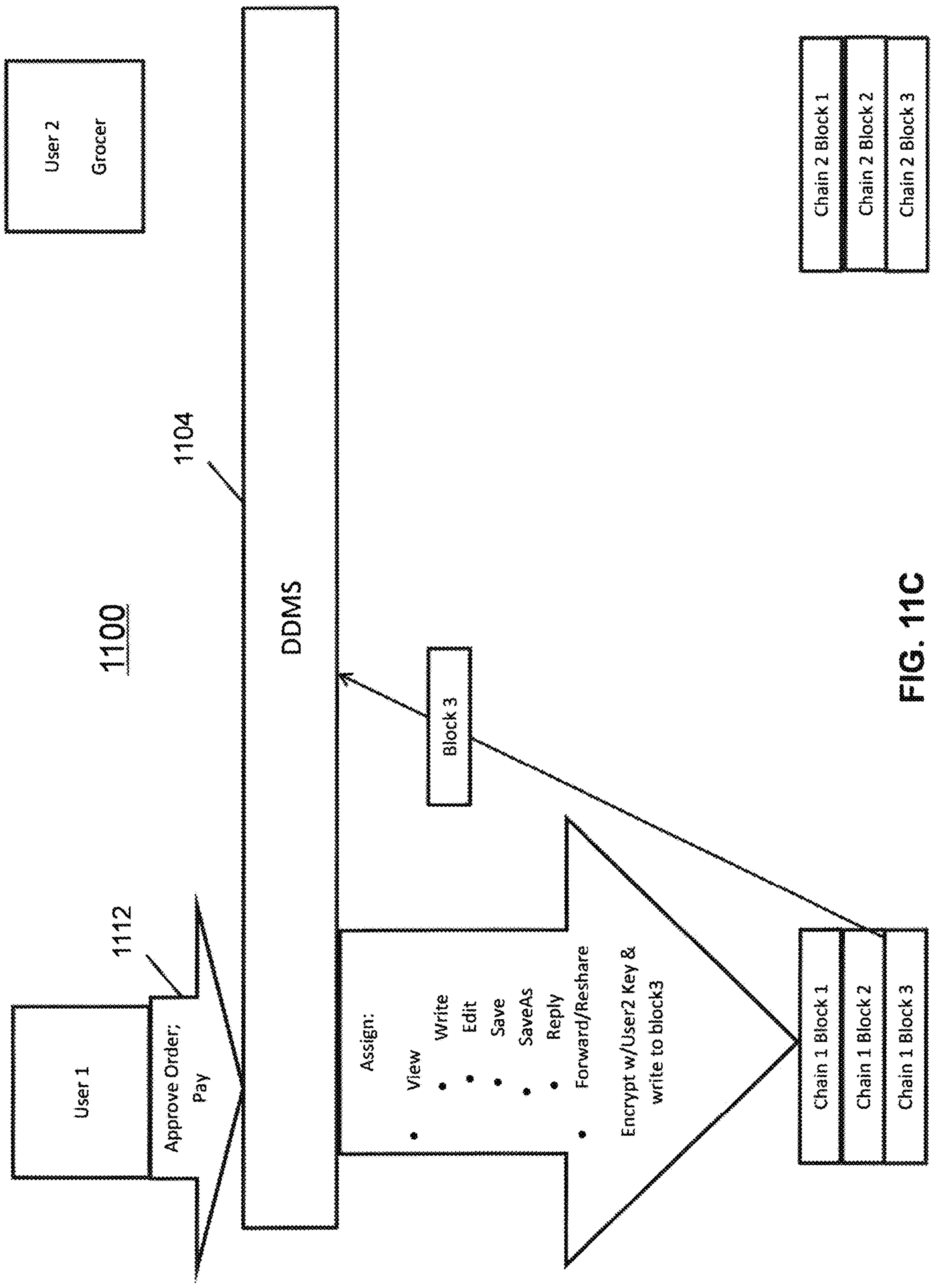

With regard to FIGS. 11A-11C (collectively FIG. 11), structural flow diagrams of a second illustrative use case 1100 for an Internet-of-Things (IoT) file sharing by a first user, User 1, to a second user, User 2 (e.g., grocer), are shown. The first user in this example may be a smart refrigerator (e.g., refrigerator with a code scanner) configured to scan contents placed therein, compare the scanned contents with previous inventory scan(s), and then reorder items that have been used from a grocery store or grocery delivery service. A grocery system at the grocery store may receive the order, check current inventory to determine current available stock, prepare an invoice, and "send" the invoice to the refrigerator for approval. As shown, an "order groceries" call 1102 may be communicated via a DDMS 1004, which may be used to enable the call to be executed without a programmer having to write low-level drivers for adding a block of information to the correct blockchain in the correct location.

More specifically, FIG. 11A shows a detailed process of writing to a block, Chain 1 Block 1. User 1 in this instance is an Internet-of-Things (IoT) at a smart refrigerator. User 1 (smart refrigerator) causes or schedules a scan of the refrigerator and then groceries are ordered by "sending" the message 1102 via the DDMS 1104. The DDMS 1104 uses parameters of the message 1102 to determine a location of a blockchain to write data (e.g., grocery order) and metadata (e.g., permissions, etc.) to a block, Chain 1 Block 1, for storage therein. That information is then written to Chain 1 Block 1 associated with User 1, and the block is assigned rights by User 1 that the grocer has the data that is stored in Chain 1 Block 1 that is "sent" via DDMS 1004. The rights, for example, may include whether User 2 can view the data in the block, write additional data to the blockchain, edit the data in the block, save the blockchain, save as, reply, forward, or re-share the data. User 1 may be set up with default rights to share with other users depending on the other types of users (e.g., maintenance technicians would be given different rights than a grocery store or grocery delivery service) and/or may be altered by an operator of User 1. Similar rights and functionality may be provided to data stored in Chain 2 Block 1, saved by User 2. A block, Chain 2 Block 1, of User 2 is then encrypted with the key 1106 of User 1 and User 2, assuming a 2-key protocol is being used, and written to the chain of User 1, Chain 1 Block 1. The DDMS 1004 may then unencrypt the data in either block, Chain 1 Block 1 or Chain 2 Block 1, and re-encrypt the data in either block with the key 1108 of User 2 for processing.

With regard to FIG. 11B, User 2 may respond to the message by creating an order/invoice 1110 in a reply stored in Chain 2 Block 2. In replying, a reply may include information with pricing and whether or not the items ordered in FIG. 11A are in stock may be written into Chain 2 Block 2 with the same constraints or same ability to apply constraints as in FIG. 11A. When writing the Chain 2 Block 2 as commanded by the reply, the information may be encrypted with the key 1108 of User 2, the grocers key, and then unencrypted and re-encrypted with the key 1106 of User 1. Again, the DDMS 1104 that supports the DDMS-enabled P2P distributed application (i.e., the IoT P2P distributed application).

With regard to FIG. 11C, User 1 may then approve the order, purchase the order, and make the payment in response to Chain 1 Block 2 being written. In performing the approval, purchase, and making the payment functions, information may be created and call 1112 may be communicated using the DDMS 1004. Again, the data is written in the block with the same constraints or same functionality and ability to apply constraints as in FIGS. 11A and 11B. The data or information is encrypted with the key 1106 of User 1, unencrypted, and then re-encrypted with the key 1108 of User 2 when adding the information to Chain 2 Block 3. It should be understood that a system key is used in conjunction with public key cryptography implementations (or any other encryption protocol) such that the system key and individual user key (e.g., User 2 key) are used to encrypt data written into a block.

DDMS Logic Flow and Architecture for Handling Calls or Queries

Figure 12C:
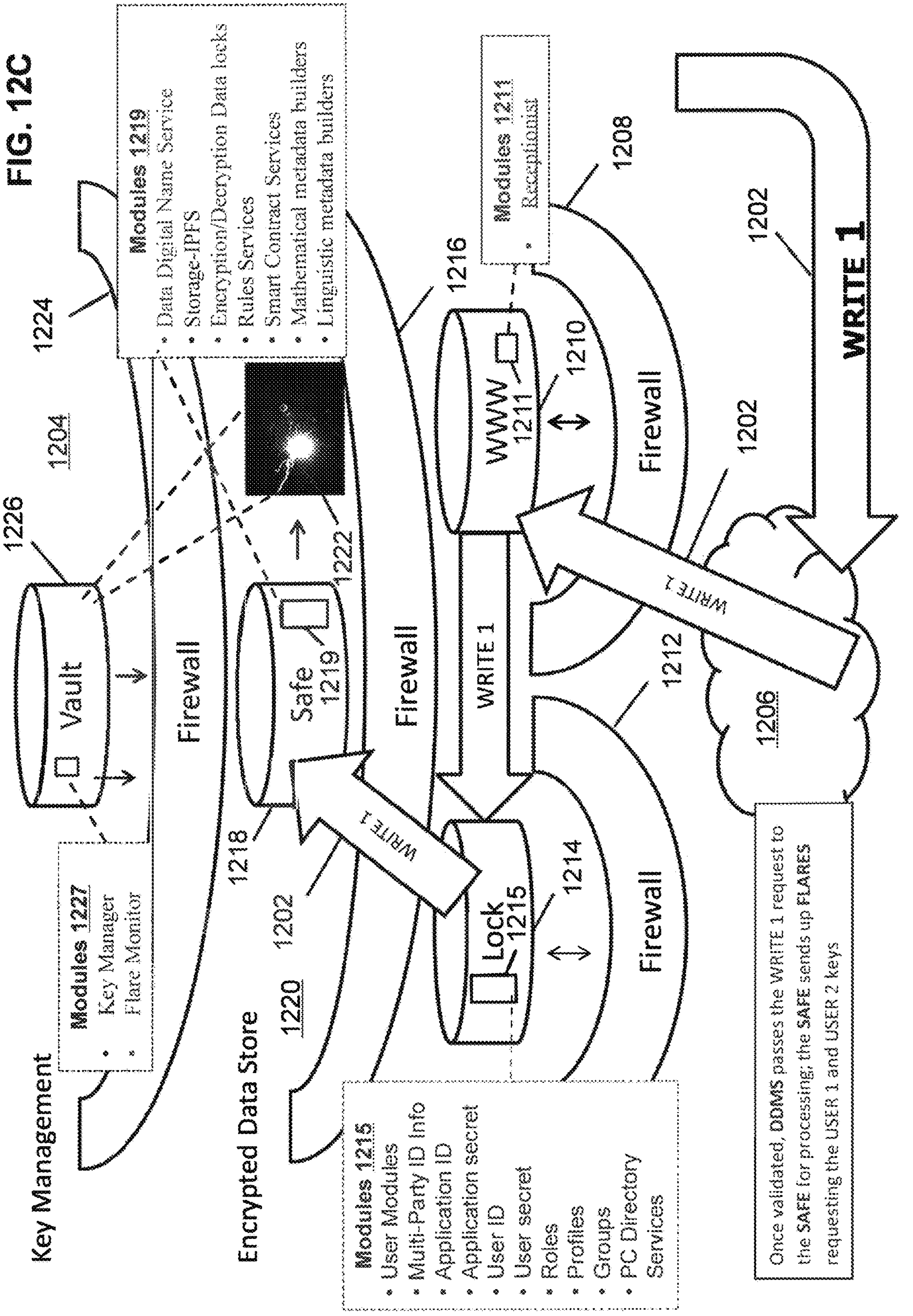
Figure 12D:
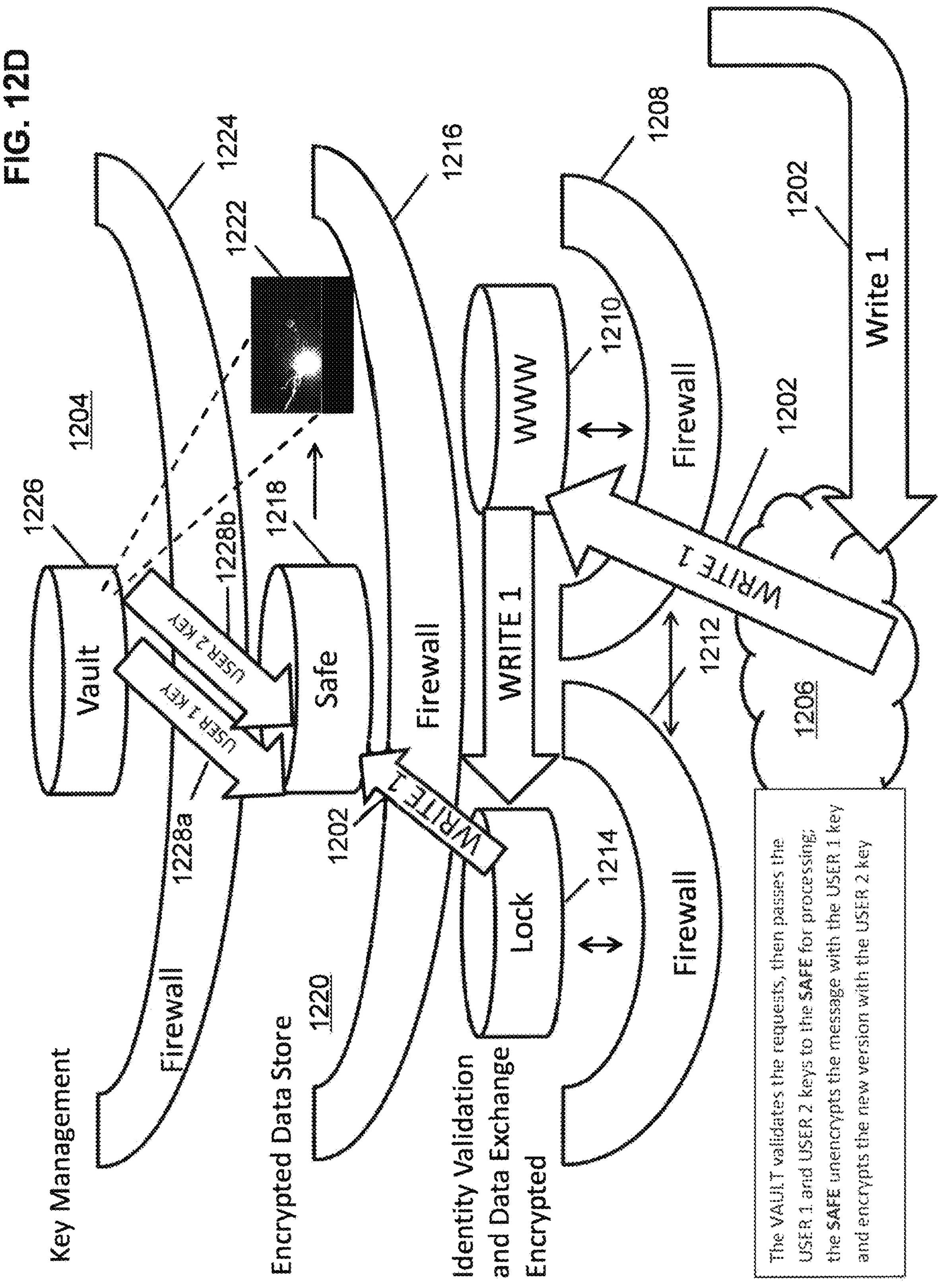
Figure 12E:
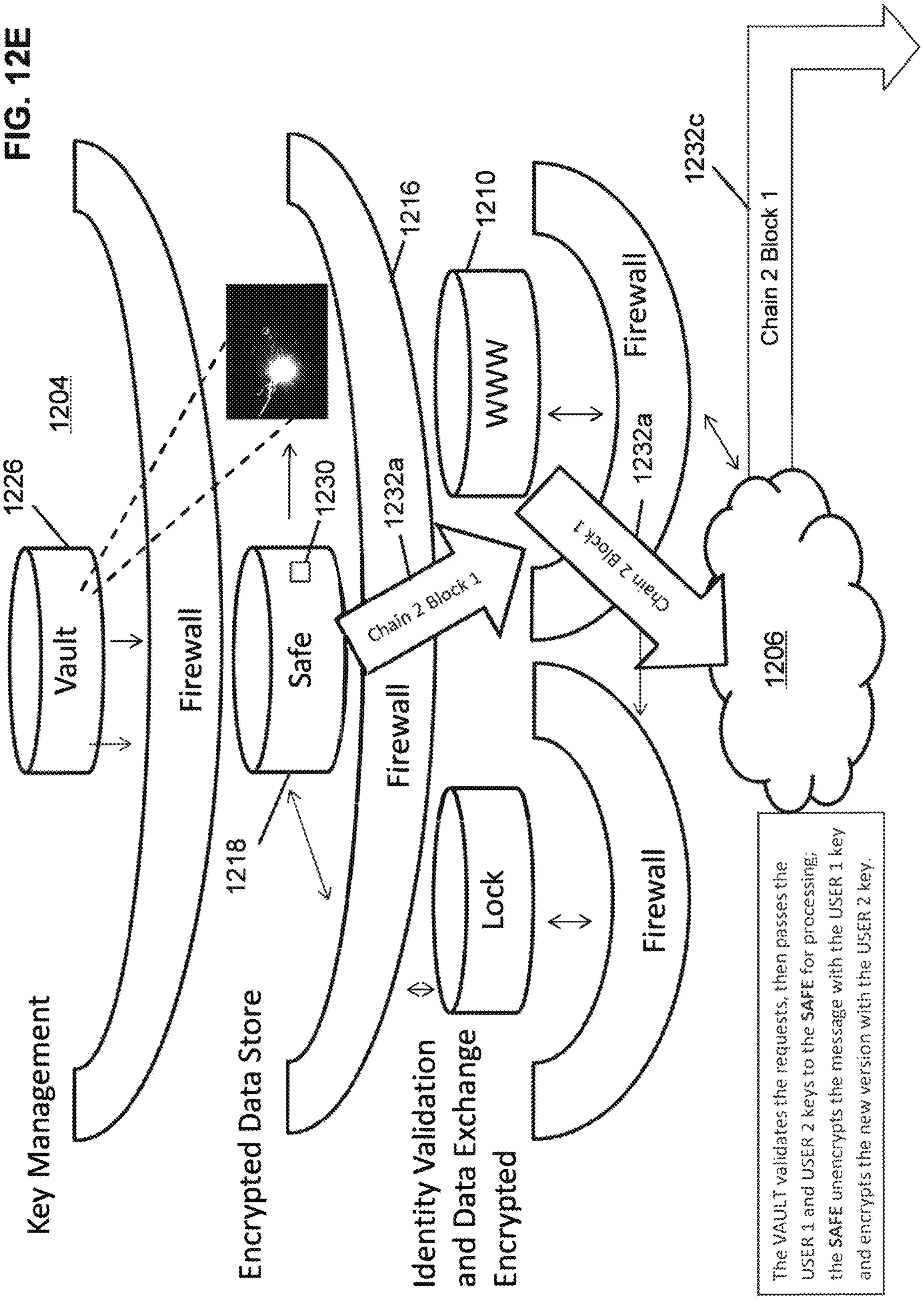
Figure 12F:
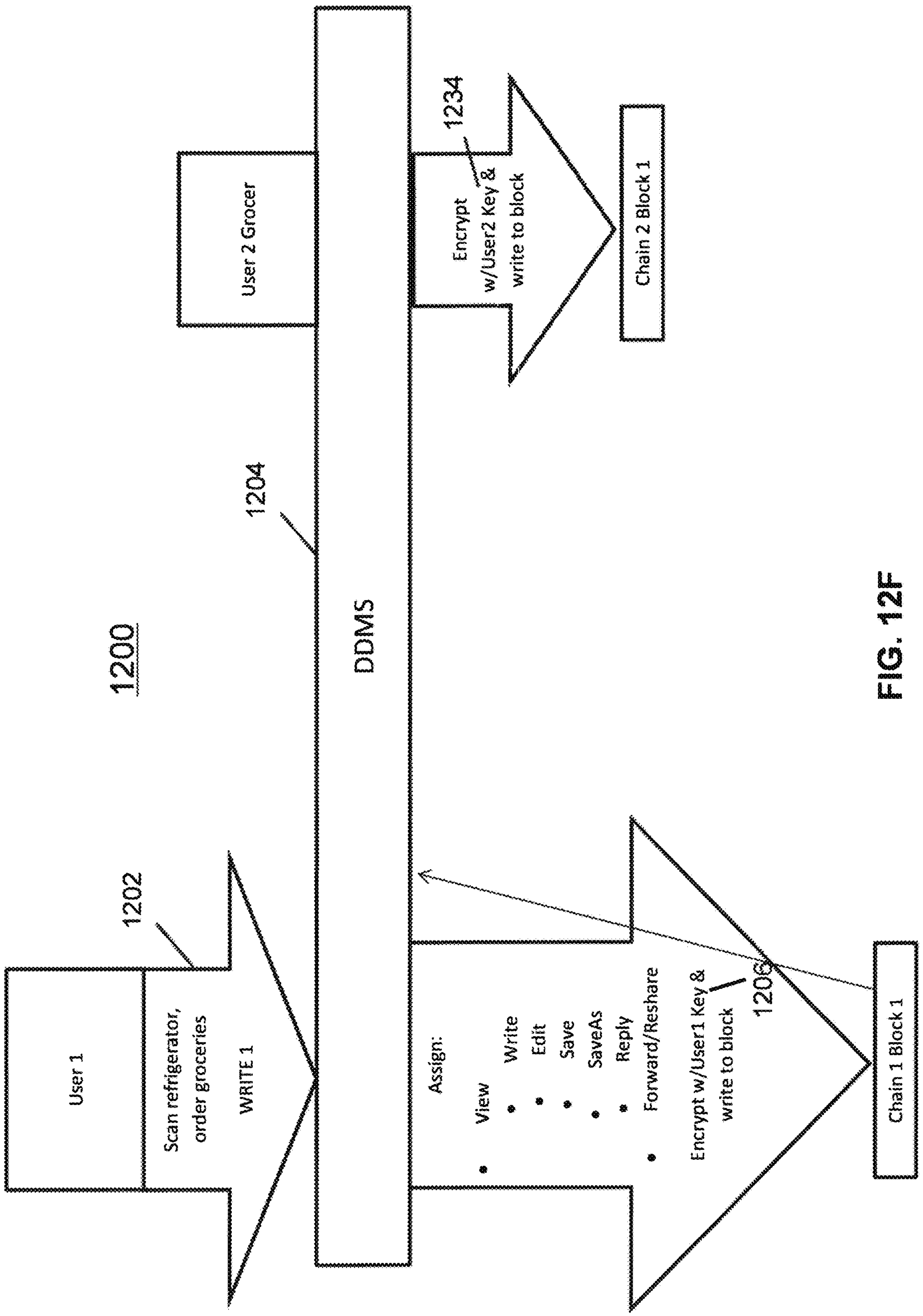

With regard to FIGS. 12A-12F, structural flow diagrams of an illustrative step-by-step process of building a block of a blockchain are shown. The diagram of FIG. 12A provides an illustrative process by which User 1, which may be an IoT device, such as a refrigerator, and User 2, which may be a grocer, as previously described in FIGS. 11A-11C communicate using a blockchain on the DDMS 1204. At a high level, the write 1 command 1202 causes the DDMS 1204 to initiate a block to be formed and be added to the proper blockchain based on the call parameters and encryption technique using a key 1205 of User 1. The technical details of the network infrastructure, functions, and processes performed thereby as shown and described with regard to FIGS. 12A-12E. FIG. 12F show an illustrative process by which User 2 creates a block to add to a blockchain of User 2 in response to the write process of FIG. 12A.

In FIG. 12B, a write command 1202 is generated and issued by User 1 via a DDMS system 1204 operating on a communications network, such as the cloud or Internet 1206. The write command 1202 includes an http request that is received from the cloud 1206, passed through a front-facing firewall 1208, to a worldwide web server 1210, which then passes the write command 1202 via a second firewall 1212 to a lock 1214 of the DDMS. The worldwide web server 1210 includes modules 1211, such as a receptionist module, that may be configured to look-up and direct the request to the appropriate network address (or module in the case of the DDMS being executed on a device, such as a smart phone). The worldwide web server 1210 The lock 1214 may be configured to perform identity validation and data exchange in an encrypted environment. As shown, the lock 1214 includes modules 1215 that perform the identity validation and data exchange, as described hereinbelow. The lock 1214, in performing identity validation, may verify multi-party ID information, application, application secret, user ID, and user secret.

The lock 1214, once a legitimate user has been verified with a legitimate request (e.g., write request), passes the request, in this case the write command 1202, via a third firewall 1216, to a safe 1218 that is part of an encrypted data store 1220 of the DDMS 1204. The safe 1218 may include a number of modules 1219 that are executed by the safe 1218, as further described hereinbelow. In an embodiment, the safe 1218 sends up a "flare" 1220 via a fourth firewall 1224 to a vault 1226 stores keys for users of a DDMS-enabled P2P distributed application. The "flare" 1222 is recognized and accessed by the vault 1226, and is not communicated to the vault 1226. The vault 1226 may include a number of modules 1227 that are executed by the vault 1226, as further described hereinbelow. That is, there is no direct communication from the safe 1218 to the vault 1226, thereby minimizing the ability for a bad actor to hack or otherwise access the vault 1226. The "flare" 1222 requests keys stored in the vault 1226 for the applicable operation(s), where the keys include a key 1228*a* for a sender (e.g., User 1) and a key 1228*b* for a receiver (e.g., User 2) of a document, such as an email, document, or otherwise. The keys 1228*a* and 1228*b* (collectively 1228) are configured to be utilized by an encryption protocol being utilized by the DDMS-enabled P2P distributed application.

More specifically, and as shown in FIGS. 12C and 12D, the DDMS performs an identity validation of the write 1 command or request 1202 from User 1. The validation includes passing through the firewall 1208 to a web server 1210, which in turn communicates the write 1 command 1202 to the lock 1214 for validation. Once validated, the DDMS communicates the write 1 command 1202 to the safe 1218. The safe 1218 may be utilized to decrypt and encrypt the content to be store or read from a block. In order to perform encryption and decryption, the safe 1218 generates the flare 1222.

As provided in FIG. 12D, in response to the vault 1226 noticing and accessing the flare 1222, the vault 1226 validates the request and determines user(s) identified by the flare 1222. The vault 1226, in response to validating the request of the flare 1222, communicates user keys 1228*a* and 1228*b* for User 1 and User 2 to the safe 1218 for use in encrypting and/or decrypting a block to be added, in this case, to a blockchain. In operation, the vault 1226 is able to notice and access the flare 1222, validate the request of the flare 1222, and communicate the user keys 1228*a* and 1228*b* in real-time, substantially real-time, or non-real-time depending on the application type. If the P2P distributed application is an email application, then real-time operation of the vault 1226 is not necessary, whereas if the P2P distributed application is a stock trading platform, then the vault 1226 would operate at a real-time speed in recognizing the flare 1222.

The flare 1222 may include a number of parameters associated with users, devices, physical location, logical location, and/or any other information associated with one or more users and/or devices (e.g., IoT communications) for which access to a block of a distributed ledger is being requested by the write 1 request 1202. The flare 1222 may also include a request, such as to create a new key. As previously provided, there is no way to access the vault 1226 directly via a communications channel. In other words, calls cannot be made directly to the vault 1226. The vault 1226 may be configured for a one-way communication to the safe 1218, as there is no direct access to the vault 1226. The vault 1226 is configured to validate the request in the flare 1222, and in response to validating the request, to communicate keys 1228*a* and 1228*b* of respective User 1 and User 2, for example, to the safe 1218 for processing the write 1 command 1202 or any other command. The safe 1218 decrypts the message with the key 1228*a* of User 1 and encrypts the new message with the key 1228*b* of User 2. It should be understood that there may be multiple safes and vaults in different embodiments.

As provided in FIG. 12E, after the safe 1218 creates a block 1230 for User 2, the safe 1218 communicates the block 1230 via the firewall 1216 at step 1232*a*, the web server 1210 on a network, such as the worldwide web, the firewall 1208 to the cloud 1206 at step 1232*b*, and ultimately back to a device (not shown) of User 2 at step 1232*c* to be added to a chain associated with User 2.

In performing the processes of FIGS. 12B-12E, each of the functions and processes shown may be disposed on each of the devices that supports the blockchain creation and management processes. In other words, once a user interfaces with the webserver 1210, the functions, including the lock 1214, safe 1218, and vault 1226, which may be on a device of a user performing a process (e.g., creating an NFT or block, for example), may be operate as described hereinabove. It should be understood that each of the functions may have all of the information for performing the functions or know the Data Name Services (DNS) object from which to obtain the information. For example, the vault may store the keys for the user(s) or know where to obtain the keys with the respective control parameters.

The functions may be incorporated in the following non-limiting software modules 1211, 1215, 1219, and 1227 of FIG. 12C:

Webserver 1210: the webserver 1210 is utilized to manage a user request to access a P2P distributed application and route the user to an appropriate lock associated with the user and/or P2P distributed application. The following module 1211 may be executed by the webserver 1210 to perform the functionality of the webserver 1210:

receptionist module: the receptionist module is a known technology for knowing that the user is requesting to perform a certain function and performs a routing of a request to the proper DNS for performing the function.

Lock 1214: The lock 1214 is configured with a number of modules 1215 that are executed to perform identity validation to ensure that a user is authorized to access a P2P distributed application that has access to distributed ledgers or blockchains associated with the user and P2P distributed application of which the user is seeking to utilize. The modules 1215 of the lock 1214 may include, but are not limited to:

User Modules: The user modules are used to identify the user to identify the user's rights, roles (e.g., user types, rights, restrictions, etc.), profiles (e.g., personal information, sign-on information), and/or any other identifying and access information to access and/or modify content of a blockchain.

Multi-Party ID Info Module: The multi-party info module may support any member of a group (e.g., company) and inherit the information for that group such that individual users (e.g., CEO, manager, employee) may have rights to access certain classification of information on a blockchain based on the rights, roles, and profiles of the group and individual member of the group. As an example, a general in the army may have access to certain level(s) of classified data (e.g., Top Secret) of a blockchain while a private in the army may not have access to the same level of classified data as the general.

Application ID Handler Module: The application ID module may be used to identify certain P2P distributed applications and rights and handle those P2P distributed applications through an application secret based on the user identifier, party identifier, etc.

Application Secret Module: the application secret module is software that manages information for a software P2P distributed application to have access to the DDMS. The application ID handler module challenges the application secret module before the P2P distributed application is able to access the data, thereby providing for safety that a P2P distributed application is actually authorized to access the DDMS software.

User ID Module: the user ID module operates to manage user ID's by verifying that a user is actually associated with a user ID prior to enabling the user to access the requested P2P distributed application.

User Secret Module: the user secret module operates to verify that a requesting user provide the correct secret in associated with the user's ID to ensure the user is verified.

Roles Module: the roles module is utilized to verify role(s) that users are assigned in order to ensure that the users have limited access to content and/or metadata stored on a blockchain available to the user using a P2P distributed application.

Profiles Module: the profiles module may be utilized to access and manage user profiles to ensure that each user seeking to access data stored on blockchains or distributed ledgers and P2P distributed applications is authorized based on his or her profile. The Profiles Module may provide for managing user rights and restrictions, as well.

Groups Module: the groups module is used to verify that a user is a member of a group (e.g., corporation) to which users are assigned. The system enables a system operator or module configured to perform a group assignment function to establish users to a group on a batch basis without having to individually assign members to a group. It should be understood that a user may be assigned to one or more groups.

Directory Services Module: a directory services module enables the DDMS platform to track data objects and their child objects for authorized access by users and P2P distributed applications.

Safe 1218: the safe 1218 includes modules 1219 that perform the functions of the safe 1218, including decrypting blocks, performing functions requested by a user, issuing flares when data access of a blockchain is requested, and so on. The modules 1219 of the safe 1218 may include, but are not limited to:

Data Digital Name Service (DNS) Module: a data DNS is used to enable the application and user access data located on blockchain(s) associated with the user. The data DNS points a P2P distributed application to a location of the blockchain with the data, which may be on the device of the user along with other devices on which the blockchain(s) have been cloned. Data identification, data mapping, and data categorization and abstraction may be supported by the data DDNS module. Simply put, the DDNS module in combination of the IPFS module (below) are configured to store and locate data where the data is created and processed such that the DDMS is efficient in communications and processing.

Storage-Interplanetary File system (IPFS) Module: the IPFS module is a standard that provides for storage of blockchains and data thereon to be managed in a known manner.

Encryption/Decryption Module: an encryption/decryption data locks module may be utilized to perform decryption when a user seeks access to data stored on a blockchain and encryption when the user is adding new or modified data to the blockchain. The module may support user handling and key handling. The encryption/decryption data locks module utilizes key(s), including a public key and user key, for decrypting and encrypting a block or data stored thereon.

Rules Services Module: a rules services module may be configured to apply rules for users and/or P2P distributed applications. Rules services manage rule objects, which may be a specialized data object limited to rules. For example, the rules services module may be configured to apply rules, such as how to write to a database, when to create a fork of a blockchain, types of metadata to include in a blockchain, business rules, and so on. The rules services module supports creation, management, and implementation for P2P distributed applications in supporting users in which profile parameters are set by and/or for a user.

Smart Contract Services Module: a smart contract services module may be configured to enforce contract terms based on control parameters of smart contracts that are stored on one or more blocks of a blockchain. The smart contract services module lines up each of the smart contracts in sequential order to perform the contractual terms of the smart contracts, thereby making the smart contract process a self-enforcing smart contract process on a blockchain and any forks extending therefrom. The smart contract services module may be performed, for example, when a user seeks to make a purchase such that the smart contract enforces the terms of the smart contract to establish purchasing terms, negotiations of the smart contract, compensation to content owners and sellers or distributors, etc., from an original block (e.g., Block 0) to a current block, as described with regard to FIG. 13, for example. The smart contract module may include or communicate with a number of other modules, such as (i) Payment Services-Receivables Module, (ii) Fee assemblage Module, (iii) Payment Processing Module, (iv) Payment Services-Payables, (v) Fee Assemblage Module, (vi) Fee Distribution Module, and (vii) Payment processing.

Moreover, the DDMS smart contract services module makes smart contracts self-enforcing by examining the various access conditions (e.g., geographic locking, CPU locking, network locking, biometric locking, and classification locking). Data access may be prevented from being accessed unless all the conditions are met. It should be understood that additional and/or alternative locking conditions are contemplated.

As an example, a fashion business may release a DDMS-based 3D printer design for a bracelet that licenses for $50 for five (5) 3D printings of the bracelet. Upon receiving a request to print, the smart contract services module determines if the user paid for the license and is therefore authorized, and whether there are available printings left on the license before allowing the design to be unencrypted and printed. For another example, a business may send a proposal that expires in 30 days to a potential client. Upon requests to open the proposal from the client, the smart contract services module checks the system date against the proposal date to determine if there are any available days left before allowing the proposal to be unencrypted and used. It should be understood that additional restrictive conditions are contemplated that the smart contract services module may enforce in a sequential manner, as previously described.

Mathematical Metadata Builders Module: a mathematical metadata builders module may be configured to perform mathematical functions on sensed information, such as biometrics (e.g., fingerprint, face recognition, etc.), temperature collected by a temperature probe, pressure collected by a pressure sensor, etc. In an embodiment, the mathematical metadata builders module may be configured to perform mathematical processing, including calculating a mean, median, mode, standard deviation, etc., as part of a data collection and processing operation. Such a module may be utilized with an IoT device, as described with regard to FIGS. 7A and 7B, for example.

Linguistic Metadata Builders Module: a linguistic metadata builders module may be utilized to enable a user to locate information associated with linguistics using certain search or approximation functions, such as Bayesian Sieves. For example, if a user searches for the term "Apollo," and is also looking for "lunar," the linguistic metadata builders module may be able to distinguish from the term "Apollo" used for the Apollo Theater or Greek Mythological character Apollo.

Vault 1226: The vault 1226 is configured with a number of modules 1227 that are meant to manage keys and service flare requests, as previously described. The modules 1227 of the vault 1226 may include, but are not limited to:

Key Manager: a key manager may be utilized to collect and store keys of users of P2P distributed applications. The key manager may be configured to store control parameters associated with each of the keys such that the safe may utilize the control parameters for managing access and contract rights. As an example, when a new user is created, a flare may be set up and request a new key for that user and that new key is stored in the vault with user information and control parameters associated with the user's rights for passing to the safe 1218 when requested via a flare 1222 thereafter (e.g., flare requesting access to content on a blockchain for use by a P2P distributed application).

Flare Monitor: a flare monitor in the vault may be utilized to monitor for flares by the safe 1218 when seeking access to data on a blockchain or when a user requests other functions (e.g., new user request). Because it is not possible to directly communicate with the vault 1226, the flare monitor is used to enable a user to indirectly communicate with the vault. The flare monitor may function in real-time such that real-time processes, such as stock trading, are capable of being perform in a real-time, semi-real-time, or non-real-time basis. In an embodiment, the flares 1222 may be designated with different levels of priority, such as real-time (e.g., substantially simultaneously, such as within a few microseconds), semi-real-time (e.g., within a few seconds), or non-real-time (e.g., within a few minutes). It should be understood that the timing for the semi-real-time and non-real-time may, in reality, operate as fast as real-time, but that depending on flare frequency at any given time, additional latency may be afforded. The priority may be set based on types of P2P distributed applications. For example, financial and equity trades may require real-time operations, voice and video communications may be real-time, text messaging may operate at semi-real-time or non-real-time, email communications may be non-real-time, NFT processing may be non-real-time, and so on based on need and user requests and/or requirements.

It should be understood that the modules for each of the functions may be different and/or perform additional or a combination of functions. For example, one module may be split into multiple modules or multiple modules may be combined into one module.

As shown in FIG. 12F, an illustration of an illustrative process by which User 2 creates a block to add to a blockchain of User 2 in response to the write process of FIG. 12A is shown. In this case, block 1 is written to chain 2 of User 2 using a key 1234 of User 2 that includes rights parameters, as further described herein.

DDMS Smart Contract Management

DDMS Smart Contract Commerce Example

Figure 13:
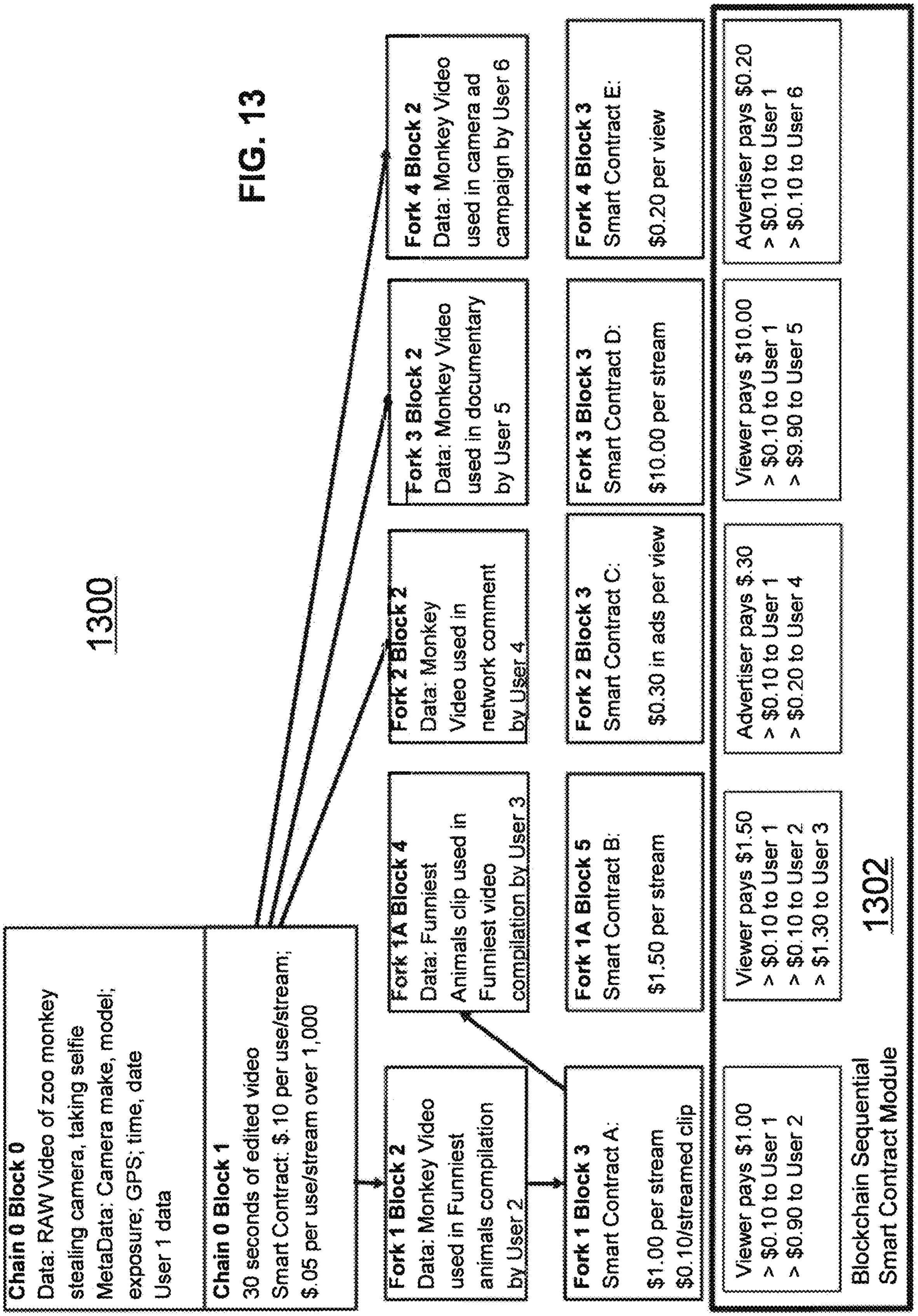
FIG. 13 is an illustration of an illustrative blockchain for use in a commercial P2P distributed application that enables financial remuneration as dictated by sequential smart contracts on a single blockchain with forked blockchains extending from a base blockchain.

With regard to FIG. 13, an illustration of an illustrative blockchain 1300 including four main forks, forks 1-4, and one sub-fork, fork 1A, is shown. In the blockchain 1300, smart contracts may be included to control permissions and revenue flow of data that is distributed to users via each of the different forks. In addition to data and metadata being stored in the blockchain 1300, each data object may contain a smart contract written to the blockchain. Each smart contract contains the rules governing the use of the data and metadata contained in the blockchain. The smart contract controls whether the data can be copied, edited, or shared with others; the duration of use; the number of times the data can be used; and where and how the data may be used. The smart contract may also contain fees for each type of use and may be used to collect the fees automatically to enable access.

Furthermore, each blockchain can have multiple smart contracts that interact in sequential order on a per-fork basis, where a fork is a branch extending from a blockchain. Multiple forks may extend from a blockchain, and each of those forks may have independent smart contracts that control that fork.

For example, a graphic artist designs a graphic, such as a video of a monkey at a zoo stealing a camera and taking a selfie, that can be reused in online videos. The graphic is saved into the blockchain 1300 with a smart contract that charges $0.10 per stream when used in an online video. A videographer may then use the graphic in an online video, where the online video is saved into a blockchain with a smart contract that charges $1.00 per stream whenever it is viewed. Every time a user streams a video, the blockchain DDMS-enabled P2P distributed application platform may include a blockchain sequential smart contract module 1302 that charges the user $1.00, and then automatically credits $0.90 to the videographer and $0.10 to the graphic artist. For each of the forks, the smart contracts are different, but the blockchain sequential smart contract module 1302 handles the revenue collection and distribution process in the same manner based on the terms of the smart contract. It should be understood that the terms may include non-monetary terms, such as provided in FIG. 14.

DDMS Smart Contract Military Security Example

Figure 14:
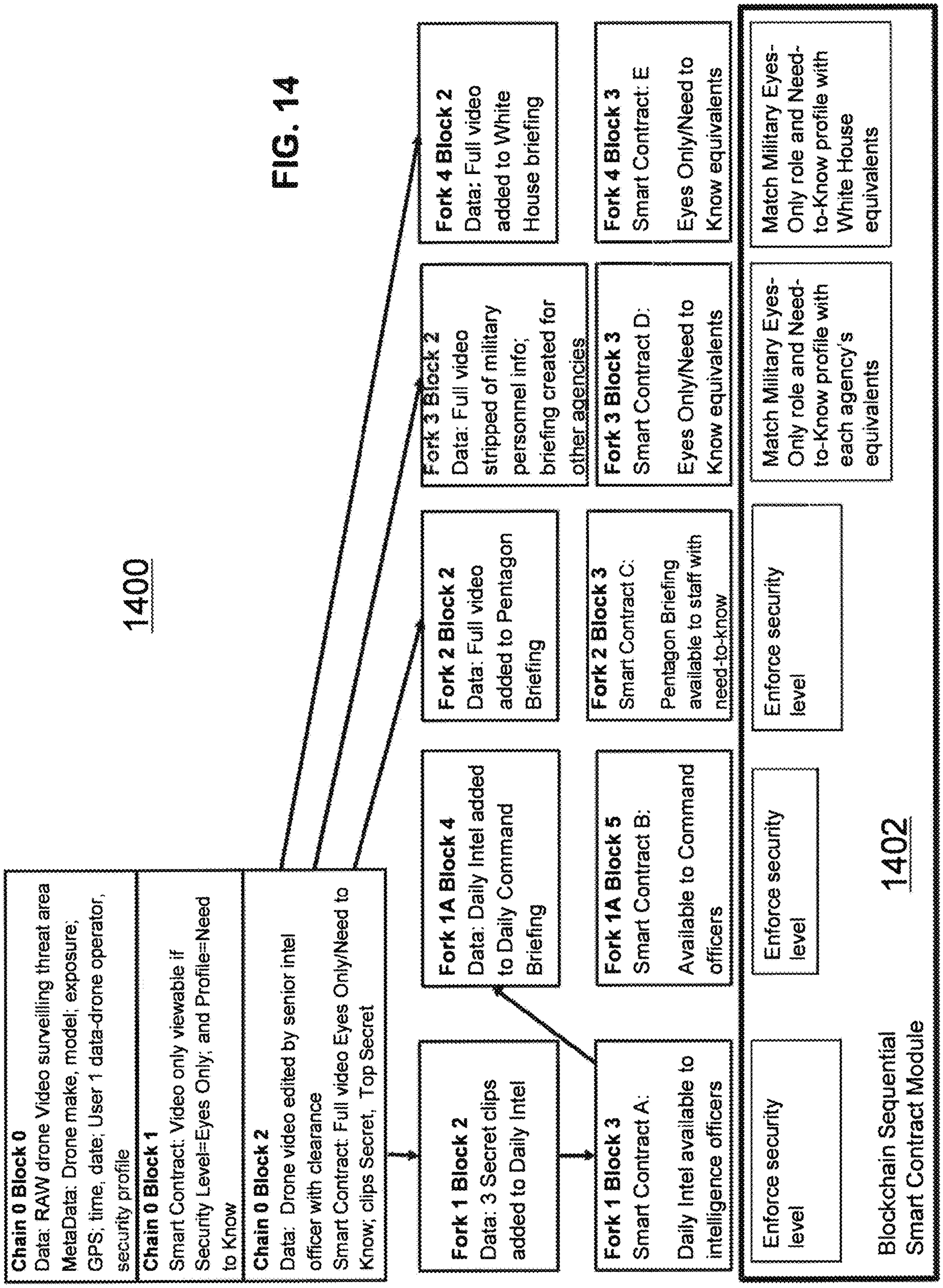
FIG. 14 is an illustration of an illustrative blockchain for use in a military P2P distributed application that enables military-security management as dictated by sequential smart contracts on a single blockchain with forked blockchains extending from a base blockchain.

With regard to FIG. 14, a non-revenue or non-commercial based blockchain 1400 that supports a military P2P distributed application is shown. Raw data (e.g., drone video surveillance of a threat area) may be collected and stored in block 0 of the blockchain 1400. A user who captured the raw video may establish a smart contract in which the video is only viewable if viewed by another user with a Security Level=Eyes Only and Profile=Need to Know. Thereafter, the data may be edited by a senior intel officer with proper clearance, and the senior intel officer may set another smart contract that complies with the previous smart contract (i.e., the same or more restrictive), such as full video eyes only, need to know; clips secret, top secret. From there, multiple uses of the video may be created and different forks and sub-forks of the blockchain may also be created with the same or different smart contracts. In some cases, a blockchain sequential smart contract module 1402 may enforce a security level, while in other cases, the blockchain sequential smart contract module 1402 may determine a corresponding security level for different agencies if an equivalent security level does not exist by the same name, for example.

DDMS-Implemented P2P Distributed Application User Interfaces

Figure 15B:
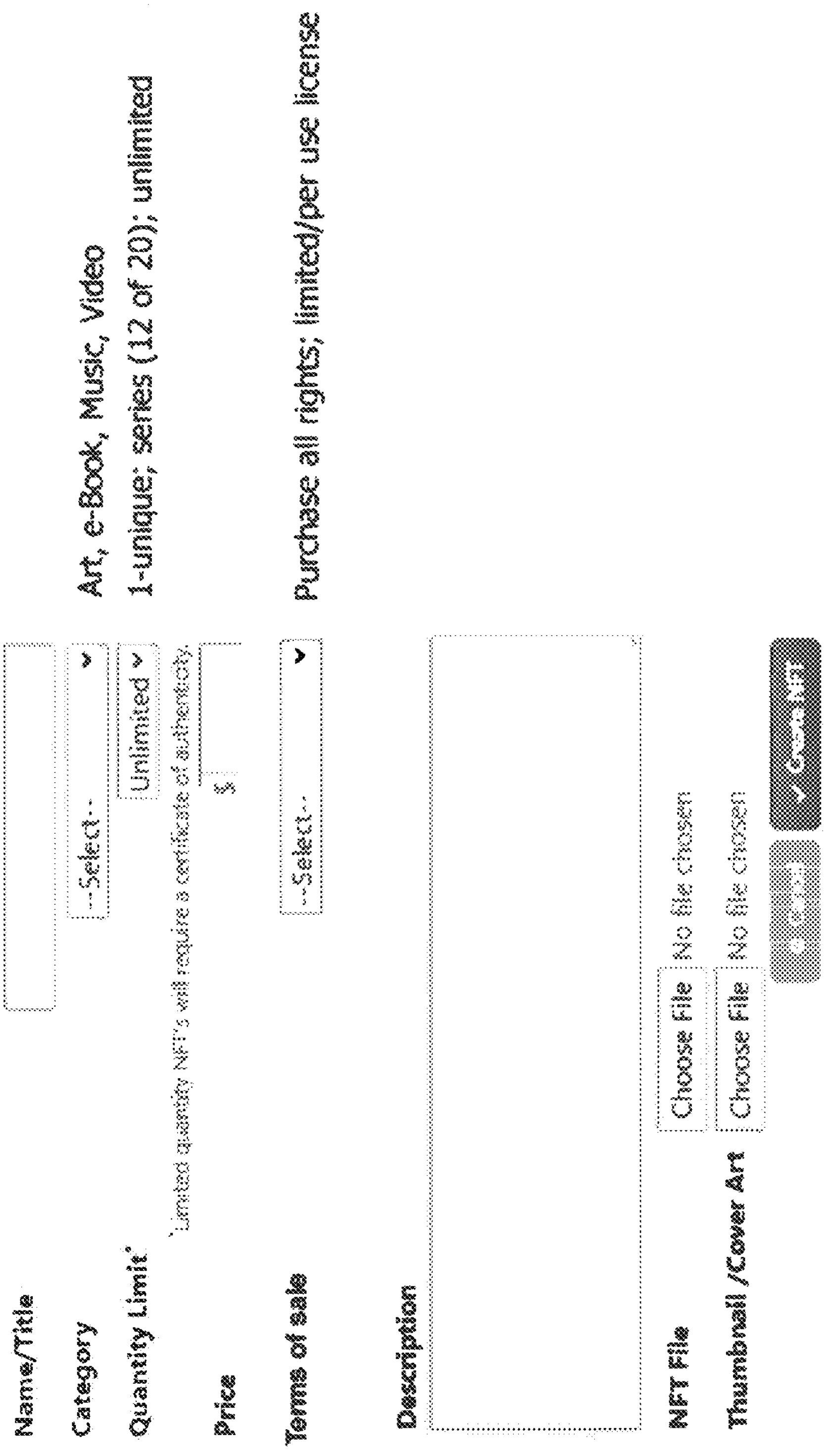

With regard to FIGS. 15A and 15B, illustrations of illustrative user interfaces for enabling a user to create a user profile and purchase an NFT to be associated with data or content are shown. As shown in FIG. 15A, a user interface 1500*a* may be utilized by a user to create his or her user profile by entering a name, valid email address, and mobile phone number. The user may select whether he or she is a content creator, buyer, or both. The user may also be provided with a number of categories of types of works in which the user has an interest, thereby enabling P2P distributed applications to provide more relevant information to the user. It should be understood that additional and/or alternative user profile information may be requested to further assist the user in managing his or her use of DDMS-enable P2P distributed applications that utilize blockchains or distributed ledgers, as provided herein. As an example, if a user is identified within a particular group, such as the military, certain profile information may be requested as related to military service. If the user is associated with another group, such as a corporation, other profile information may be requested. In an embodiment, some or all members of a group may have specific profile information automatically added when the user is performing functions within his or her group capacity.

As shown in FIG. 15B, a user interface 1500*b* may be used by a user with a user profile, as created via the user interface 1500*a* of FIG. 15A, to create an NFT to be associated with data. In making the NFT, the user may enter his or her name or title, category of the data (e.g., sports video clip), quantity limit (e.g., no limit, specific limit, single) so as to be sold in bulk, limited edition, or unique sale, respectively. A user may set a price of the content of the NFT, description of the content, ability to select content to be associated with the NFT, and thumbnail cover art.

Figure 15C:
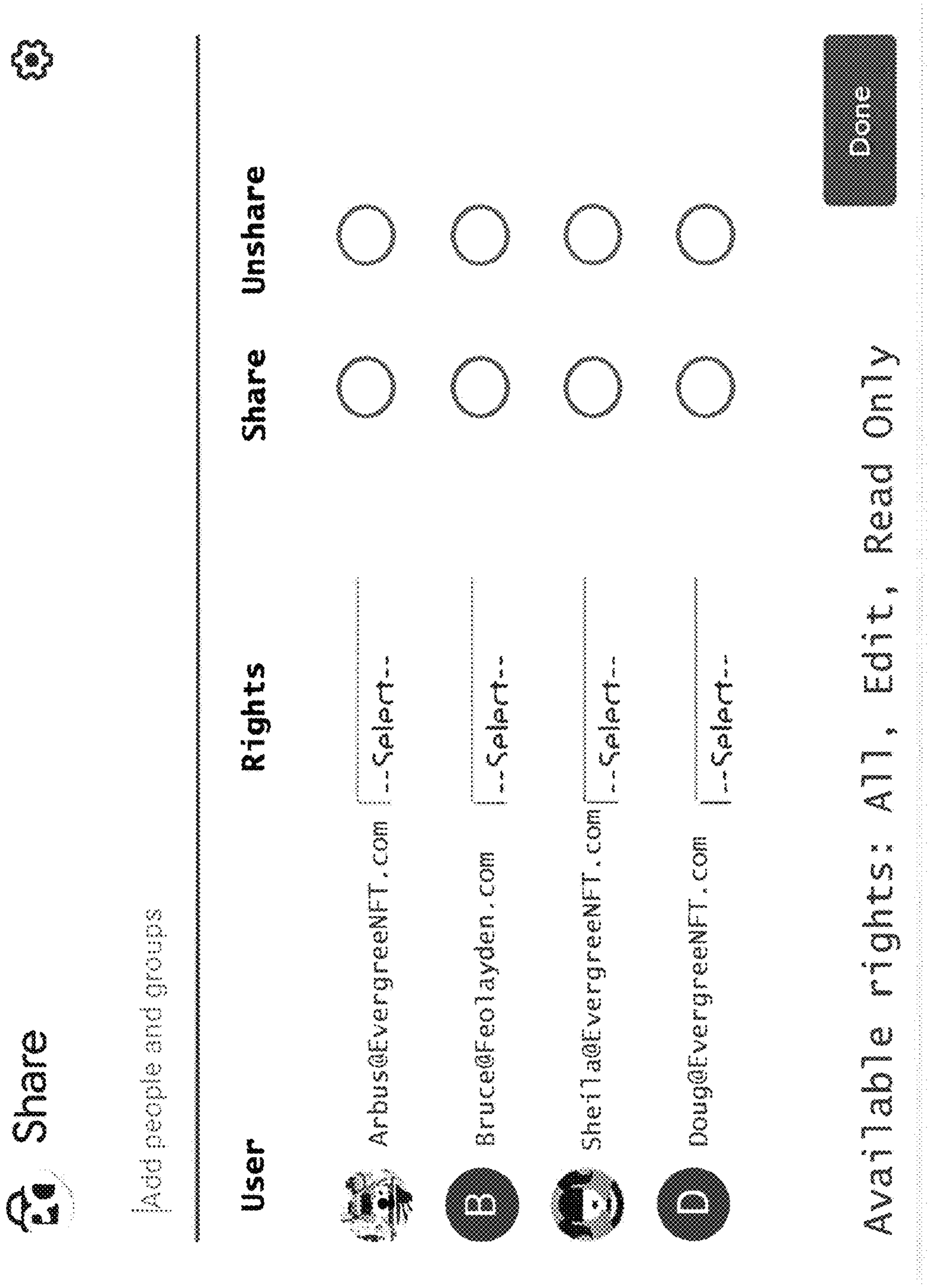
FIG. 15C is a screen shot of an illustrative user interface that enables a content owner or other rights owner (e.g., recipient of content data from a content owner) of content data to control functionality to other downstream users.

With regard to FIG. 15C, a screen shot of an illustrative user interface 1500*c* that enables a content owner or other rights owner (e.g., recipient of content data from a content owner) of content data to control functionality to other downstream users is shown. If, for example, an owner of content data shares the content with a recipient, the content owner sets rights for the recipient. The rights may include, but are not limited to, all, edit, read only, etc. Control parameters may be set and then the recipient may be able to access the data under those conditions as a result of the DDMS using the control parameters to enable the recipient to use the rights provided to the recipient. As shown, the content owner has set up four users (e.g., Arbus@EvergreeNFT.com), and may then select one or more rights to provide the users. As shown, rather than the content owner selecting individual users, the content owner may select groups to provide rights (see, for example, FIGS. 7B and 14). Once the rights are set up for the users and/or groups, the content owner may share the content data via a block using the DDMS with the recipient user(s) and/or group(s).

As further shown, the content owner may unshare the content at a later date, thereby changing the ability to access the content data for the user. As previously described, a change in the rights is controlled by the control parameters no longer including a key for the user in a list of valid keys, which, if the key is no longer in the list of valid keys, then the user will not be able to decrypt the block containing the content data. Also, if the content owner decides to change the rights of a recipient, then the rights may be re-selected and the user may press the "done" button to automatically change the rights by the DDMS by the sequential smart contract altering the rights of the recipient with the changed rights. As illustrated, each of the individual users may have different rights, and rights that are later changed for one user do not impact rights of the other users.

If all rights are conveyed to a user, then the user may have the ability to perform an unlimited set of functions with the content data (e.g., edit, share, etc.). The recipient with all rights may then share that content data or modified content data and establish rights for other downstream users up to and including the rights provided by the content owner, which in this case is all rights. If limited rights are provided to the recipient, then the recipient has limited functionality for that content data and for providing further downstream users.

The P2P distributed data management system as described herein provides for distributed databases that allows for P2P distributed applications to be constructed much faster and easier while having data be synchronized in a manner that is difficult with centralized databases. Encryption may be managed by ownership, such as by individuals, devices, and/or otherwise, thereby providing control of data that is distributed to others (e.g., a data owner may delete the data, such as images, emails, documents, etc., that are initially accessible to others in the event that the owner wishes to later remove the images). Moreover, the data owner may allow or not allow other users to edit, forward, or perform other function to the data, for example. P2P distributed applications may be configured to operate on top of the P2P distributed data management system, as provided herein. The P2P distributed applications may communicate via the DDMS to the distributed ledger so that developers of the P2P distributed applications may simply provide high-level commands for data to be stored, accessed, modified, user rights set, user rights changed, etc., and the DDMS handles the rest. The P2P distributed applications may operate on the data platform, as described herein.

Figure 15D:
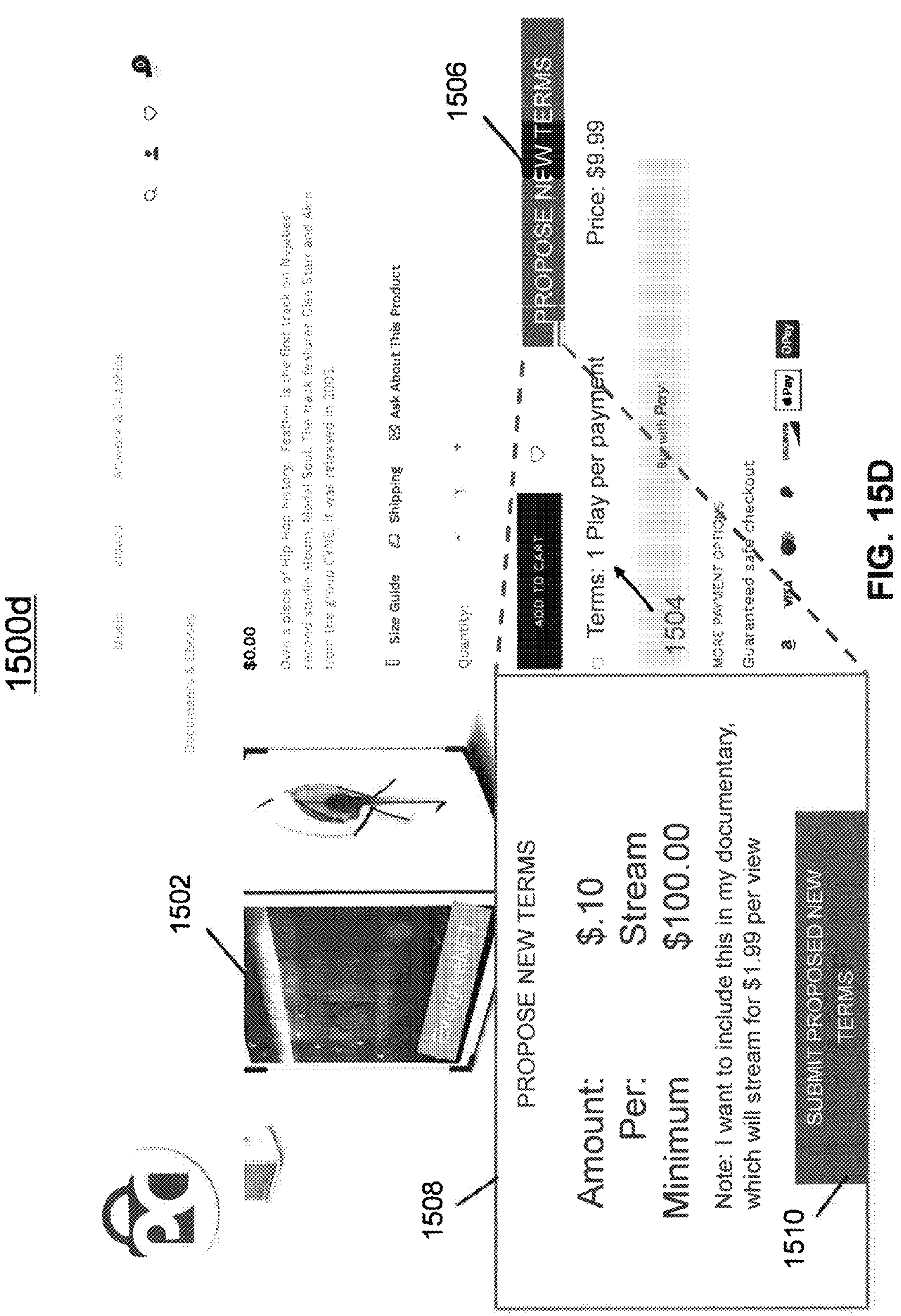
FIG. 15D is a screen shot of an illustrative user interface that enables a user of a DDMS-implemented P2P distributed application, such as "EvergreeNFT," to enable a user to negotiate a smart contract with a content owner or other content distributor.

With regard to FIG. 15D, a screen shot of an illustrative user interface 1500*d* that enables a user of a DDMS-implemented P2P distributed application 1502, such as "EvergreeNFT," to enable a user to negotiate a smart contract with a content owner or other content distributor is shown. As shown, the user interface 1500*d* may enable the user to purchase the P2P distributed application 1502. However, terms 1504, in this case "1 play per payment" for $9.99, may not be acceptable to a purchaser. As such, the user interface 1500*d* may provide the ability to negotiate the terms by selecting a "Propose New Terms" button 1506. In response to the user pressing the button 1506, a pop-up window 1508 may enable the user to enter new terms. As shown, the user may submit a counter-offer of terms for $0.10 per stream with a minimum 1000 plays or $100. Once complete, the user may submit the counter-offer by pressing a "Submit Proposed New Terms" button 1510, which may be communicated to a content owners for consideration and further virtual negotiations.

DDMS System

A P2P distributed data management system may include a set of command functions for P2P distributed applications to selectively use to access and control data stored in a distributed ledger, the command functions, in response to receiving a call from a P2P distributed application, being configured to cause a processor to perform a function on the distributed ledger, the command functions including storing, encrypting, decrypting, and accessing the data stored on the distributed ledger.

The set of command functions may be available within an application programming interface (API) that is configured to receive commands, data, and metadata from the P2P distributed application, the API including the set of command functions in the form of API calls.

The P2P distributed application, in communicating the commands that cause the P2P distributed data management system to enable data of the P2P distributed application to be stored on the distributed ledger, may further be configured to communicate commands to store the data of the P2P distributed application in blocks of the distributed ledger. The data of the P2P distributed application may be stored in the blocks in an encrypted format.

A first firewall may be configured to limit access to user devices based on first rules. A data lock may be configured to be opened by a digital key received from a user device. A second firewall may be configured to limit access to user devices based on second rules, where access to the distributed ledger is logically positioned behind the second firewall. In an embodiment, the P2P distributed data management system may be formed multiple first key repositories on which the distributed ledger and clones thereof are stored.

A third firewall may be configured to limit access to computer devices based on third rules, and wherein the computer devices are further configured to execute encryption key management software that operates to issue encryption keys stored by the second key repositories in response to receiving the encryption request parameters. The encryption key management software is further configured to (i) select a message including the encryption request parameters, (ii) determine if the encryption request parameters are valid, (iii) if the encryption request parameters are determined to be valid, (a) select an encryption key as a function of the encryption request parameters, and (b) use the selected encryption key for the requesting P2P distributed application to perform the action of the received command. Otherwise, if the encryption request parameters are determined to be invalid, an encryption key is not selected.

The encryption request parameters may include at least two of the following: (i) identifier of a user device requesting an encryption key, (ii) first key repository identifier, and (iii) user-defined permission data.

The encryption keys may be distributed amongst the second key repository such that not all of the encryption keys are stored in a single second key repository. The second key repositories may be configured to periodically or aperiodically move encryption keys amongst the second key repository via a communications network. The encryption key management software may further be configured to communicate a determined encryption key to a first key repository that "sent" the message to enable a user device or P2P distributed application to access data of the P2P distributed application.

A user may be provided access to the data stored on the distributed ledger as a function of one or more user permissions that a creator of the data sets for the user, the one or more permissions may be used to enable or disable the command function of the set of command functions. The one or more user permissions may include at least one of read only, read and write, print enabled, print disabled, maximum number of reads unlimited, maximum number of reads limited to a certain value, Internet access, virtual private network access only, unlimited network access, write, and access date range. One or more of the user permissions may be Boolean operators. The user permissions may be incorporated into establishing an encryption of the data.

The second key repositories may be configured to limit communications via the third firewall from the second key repositories to the first key repositories. The set of command functions may include at least one of write, find, get, encrypt, decrypt, reply, and history of block. In an embodiment, the P2P distributed application is an email application. Other P2P distributed applications, as described herein and as readily contemplated may be DDMS-implemented. The data stored in a block includes content data and metadata. Control parameters may also be stored in the block, and each of the content data, metadata, and control parameters may be stored in a data object that is stored in a block of the distributed ledger, as further described herein. The data stored in the distributed ledger may be encrypted collectively or individually. An owner of the data sets permission for other users to access the data using a command function via the P2P distributed application.

In an embodiment, the command functions of the DDMS are contained in one or more programming language libraries available to the P2P distributed applications. The command functions may support multiple programming languages, each set of command functions that support a different programming language may be stored in different programming language libraries. The programming languages may include at least one of PHP, Java, and JavaScript.

The distributed ledger may be a private distributed ledger. The distributed ledger includes smart contracts that are sequentially applied to perform security and access rights. Data objects that may be sold and included in the content data or a derivative thereof maintain financial remuneration as a function of the sequential smart contracts New blocks may be added to the distributed ledger as forks to form multiple chains extending from a single root block, and therefore a single root smart contract is inherited to the blocks on each fork. A mathematical metadata module may be configured to perform mathematical functions. A linguistic metadata module may be configured to utilize search or approximation functions to generate metadata. The DDMS may be configured as "light weight" so as to be configured to be executed on an Internet-of-things device.

DDMS Operating System-Like Process

An embodiment of a method of managing a distributed ledger including, in response to receiving, by a processor, a call from a P2P distributed application to write data to or access data stored on a distributed ledger, a location of the distributed ledger and operation to be performed on the distributed ledger may be identified from parameters of the call. The distributed ledger may be accessed at the location thereof. The operation may be performed with the data on the distributed ledger.

A call may be received from the electronic device that may include receiving a call with multiple parameters defined within a programming language library available to the P2P distributed application. Performing the operation may include creating a new block or accessing a block on a distributed ledger configured as a blockchain. A new block further includes writing data to the block in an encrypted format may be created. In determining whether the P2P distributed application is authorized to access the distributed ledger, the call from the P2P distributed application may be enabled to pass through a first level firewall. Otherwise, the call from the P2P distributed application may be prevented from passing through the first firewall. A key may be gathered in response to receiving the call. A determination may be made as to whether the key unlocks a lock positioned behind a second firewall is received. In response to receiving the call, a key that unlocks the lock may be requested, and then the lock may be unlocked using the key. Otherwise, the call may be prevented from being further processed.

DDMS Support of P2P Distributed Applications

A P2P distributed data management system may include a set of data locks in selective communication with a distributed ledger, and configured to provide command functions for P2P distributed applications to use to access and control data stored in the distributed ledger. The set of data locks, in receiving a command selected from the command functions from a P2P distributed application, may further be configured to enable data of the P2P distributed application to be stored on the distributed ledger and to be accessible to the P2P distributed application when stored on the distributed ledger.

In receiving the commands from the P2P distributed application that cause the P2P distributed data management system to store data of the P2P distributed application to be stored on the distributed ledger, the DDMS is further configured to receive commands to store the data of the P2P distributed application in blocks of the distributed ledger. The data of the P2P distributed application may be stored in an encrypted format in a block on the distributed ledger.

A first firewall may be configured to limit access to use the devices based on first rules. A data lock may be configured to be opened by a digital key received from a user device. A second firewall may be configured to limit access to user devices based on rules, where the P2P distributed data management system is logically positioned behind the second firewall.

The P2P distributed data management system may be formed of multiple first computing devices on which the distributed ledger is stored. Multiple second computing devices may further be include, and a third firewall may be configured to limit access to the second computer devices based on third rules. The second computers may be configured to execute encryption key management software that operates to issue encryption keys stored by the second computing devices in response to receiving the encryption request parameters. The encryption key management software may further be configured to select a message including the encryption request parameters, and determine an encryption key as a function of the encryption request parameters. The encryption request parameters may include at least two of the following: (i) identifier of a user device requesting an encryption key, (ii) first computing device identifier, and (iii) user-defined permission data.

The encryption keys may be distributed amongst the second computers such that not all of the encryption keys are stored in a single second computing device. The second computing devices may be configured to periodically or aperiodically move encryption keys amongst the second computing devices via a communications network.

The encryption key management software may be further configured to communicate a determined encryption key to a first computing device that "sent" the message to enable a user device or P2P distributed application to access data of the P2P distributed application. A user may be provided access to the data as a function of one or more permissions that a creator of the data sets for the user.

The permission(s) may include at least one of read only, read and write, print enabled, print disabled, maximum number of reads unlimited, maximum number of reads limited to a certain value, Internet access, virtual private network access only, unlimited network access, and access date range.

The second computing devices may be configured to limit communications via the third firewall from the second computers to the first computing devices. The command functions may include at least one of store, find, get, encrypt, decrypt, and history of block. The P2P distributed application may be an email application. In an embodiment, the data includes content data and metadata and may be encrypted, collectively or individually, in a data object and stored on a block.

An owner of the data may set permission for other users to access the data using a command function via the P2P distributed applications. The command functions may be contained in one or more program libraries available to the P2P distributed applications. The command functions may support multiple programming languages, where each set of command functions that support a different program and language being stored in different program libraries. The programming languages include at least one of PHP, Java, JavaScript. The distributed ledger may be a private distributed ledger.

DDMS Security

A process for managing security of a blockchain may include receiving a message from a P2P distributed application requesting access to a block on a blockchain for a user. In response to receiving the message, identity of the user requesting access to the block may be validated. In response to validating the identity of the user, the requested access to the block may be performed by (i) requesting a key associated with the identified user to be used to unlock the block, and (ii) in response to receiving a key associated with the user, unlocking the block to access content data stored in a data object contained in the block.

Validating identity of the user may include validating an identity of an Internet-of-things (IoT) device. Validating identity of the user may include comparing a secret associated with the user. Requesting a key may include sending a flare with metadata associated with the user, and waiting for a process to identify and respond to the flare by sending the key associated with the user.

Unlocking the block may include decrypting the block to access the content data stored in a data object in the block. In an embodiment, receiving the message, validating identity of the user, and performing the requested access are performed on a single device.

The content may be a data object, where the data object includes content data and metadata. The metadata may include a content owner identifier and control parameters governing use of the content data, where the data object is well-formed such that the data object is encapsulated, polymorphic, and exhibits heredity.

Receiving a message may include receiving a message that includes a function to be performed on the content data, and further includes performing the function on the content data after unlocking the block. The process may further include cloning the block prior to performing the function on the content data in a cloned block, and encrypting the cloned block with the content data on which the function was performed using a key of the user.

Receiving the message from the P2P distributed application may include receiving the message from the P2P distributed application via a first firewall. The message may further be passed through a second firewall prior to performing the requested access to the block. Requesting a key may include sending a flare with metadata associated with the user on a first side of a third firewall, and accessing the flare from a second side of the firewall in a manner that the flare is not communicated from the first side of the firewall to the second side of the firewall.

Smart Contracts

One embodiment of a method for enforcing one or more smart contracts on a blockchain, including, in response to a user request to perform a function to content data stored in a data object in a block on the blockchain, accessing a smart contract in the data object of the first block, the smart contract configured to control permissions for a user in performing functions to the content data. Available functions to which the user has access may be limited as controlled by the smart contract.

A second smart contract sequentially stored relative to the first smart contract on the blockchain may be accessed, where limiting available functions to which the user has access is controlled by terms in both the first and the second smart contracts. Making functions available by a P2P distributed application may include making functions available to a user to be performed. Limiting available functions may include causing a P2P distributed application to not present functions that are not available to the user.

The process may further include executing a smart contract services module that executes terms of the smart contract to establish available functions to be performed to the content data of the block. A financial transaction may automatically be performed based on terms of the smart contract, where the financial transaction is between the user and another user who created the smart contract.

A determination may be made if multiple smart contracts are to be sequentially executed for the user to perform the function, and if multiple smart contracts are to be sequentially executed and each of the smart contracts include financial transactions, then (i) a first financial transaction between the user and a second user who created the smart contract may automatically be performed, and (ii) a second financial transaction between the second user and the third user who created the sequentially previous smart contract may automatically be performed.

The process may further include, adding a new block to the blockchain that includes an indicator as to the function that was performed and alters a variable if the function performed has a numeric limitation in response to a user performing an available function to the content data. If the smart contract is determined to have a term with a numeric limitation, then blocks of the blockchain may be sequentially read to determine whether the numeric limit has been reached, and if the numeric limit has been reached, a function associated with the term from being available to the user may be prevented from being available. Otherwise, the user may be enabled to perform the function associated with the term.

A user who created a smart contract may be enabled to alter one or more terms of the contract that are available to be altered after the smart contract is created. The user may be enabled to negotiate the smart contract during creation thereof. The negotiation may be performed via a user interface via an DDMS-implemented P2P distributed application.

Internet-of-Things Controller

One embodiment of a controller may include a non-transitory memory configured to store data. An input/output (I/O) electronics may be configured to receive data into the controller and output data from the controller. A processor may be in communication with the memory and I/O electronics, where the memory stores instructions that, when executed by the processor, causes the processor to: store content data received from a device into a data object, create metadata associated with the data, and store the metadata into the data object with the content data. One or more control parameters may be stored in the data object, and the data object may include the content data, metadata, and one or more control parameters in a block. The block may be communicated via the I/O electronics via a network to be added to a blockchain.

The processor may further be configured to encrypt the block. An identifier of the controller may also be stored as metadata. The received data may be sensed by a sensor, where the data may be received from a biometric sensor, for example. The instructions may further cause the processor to perform mathematical operations on the received data. In an embodiment, the mathematical operations may be performed on the received data and previously received data (e.g., historical data sampling).

The processor may further be configured to add the block to a blockchain stored in the memory. The processor may further be configured to clone the blockchain on other devices remote from the controller. A control parameter including network address of the controller may be generated. The metadata may include a content owner identifier and control parameters that govern use of the content data. The data object may be well-formed such that the data object is encapsulated, polymorphic, and exhibits heredity.

Internet-of-Things Device

A device may include a non-transitory memory configured to store data, input/output (I/O) electronics configured to receive data into and output data from the device, and a processor in communication with the memory and I/O electronics. The processor may be configured to store content data received from a device into a data object, create metadata associated with the data, store the metadata into the data object with the content data, and store one or more control parameters in the data object. The data object including the content data, metadata, and one or more control parameters may be stored in a block. The block may be communicated via the I/O electronics via a network to be added to a blockchain.

The processor may further be configured to encrypt the block. An identifier of the device may be stored as metadata. A sensor may be configured to generate the received data, where the sensor may be a biometric sensor.

The processor may further be configured to perform mathematical operations on the received data. The instructions, when executed by the processor, may further be configured to perform the mathematical operations on the received data and previously received data. The block may be added to a blockchain stored in the memory. The blockchain may be cloned on other devices remote from the device.

The processor may further be configured to generate a control parameter including network address of the device. The metadata may include a content owner identifier and control parameters that govern use of the content data. The data object may be well-formed such that the data object is encapsulated, polymorphic, and exhibits heredity.

Managing Data by Ownership

A process may include storing content data created by a content owner into a block of a blockchain, and restricting access to the block as a function of ownership of the block. Access to the block may be shared with a recipient user by providing access rights to the block for that other user. The content owner may be enabled to alter access to the block of the recipient user.

A data object including the content data and metadata, the metadata including a content owner identifier and control parameters governing use of the content data, the data object being well-formed such that the data object is encapsulated, polymorphic, and exhibits heredity may be created. The content data may be stored by storing the data object with the content data and metadata into the block of the blockchain. The block including the data object using an encryption protocol may be encrypted, where the data object is encrypted with the block. Restricting access to the block may include enabling the content owner to assign rights to the recipient user. The content owner may be enabled to assign rights includes enabling the content owner to assign access rights, edit rights, and/or sharing rights. Enabling the recipient user to assign rights to a second recipient user from the recipient user may include limiting rights provided to the recipient user by the content owner.

The process may further include sharing access to the block with a second recipient user by providing access rights to a copy of the block for that second recipient user. Access rights for the second recipient user may be different than the access rights of the recipient user. A user interface may be provided to enable a user to create or modify the rights of the recipient or new recipient.

A smart contract that defines a relationship between the content owner and recipient user may be created. The smart contract may be applied when the recipient attempts to exercise rights with the content data. A financial transaction may be performed as defined by the smart contract when executing the smart contract. In response to accessing the block by the recipient user, the block may be cloned to create a new blockchain for the recipient user or adding a block to an existing blockchain of the recipient user with the access rights provided by the content owner.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular P2P distributed application and design constraints imposed on the overall system. Skilled artisans may implement the described functionality in varying ways for each particular P2P distributed application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A method for managing security of a blockchain, said method comprising:

receiving a message from a peer-to-peer (P2P) distributed application requesting access to a block on a blockchain for a user;

in response to receiving the message, validating identity of the user requesting access to the block;

in response to validating the identity of the user, performing the requested access to the block by:

requesting a key associated with the identified user to be used to unlock the block; and in response to receiving a key associated with the user, unlocking the block to access content data stored in a data object contained in the block, the data object being well-formed such that the data object is encapsulated, polymorphic, and exhibits heredity;

wherein receiving a message includes receiving a message that includes a function to be performed on the content data, and further including performing the function on the content data after unlocking the block;

cloning the block prior to performing the function on the content data in a cloned block; and encrypting the cloned block with the content data on which the function was performed using a key of the user.

2. The method according to claim 1, wherein validating identity of the user includes validating an identity of an Internet-of-things (IoT) device.

3. The method according to claim 2, wherein validating identity of the user includes comparing a secret associated with the user.

4. The method according to claim 1, wherein requesting a key includes:

sending a flare with metadata associated with the user; and waiting for a process to identify and respond to the flare by sending the key associated with the user.

5. The method according to claim 1, wherein unlocking the block includes decrypting the block to access the content data stored in the data object in the block.

6. The method according to claim 1, wherein receiving the message, validating identity of the user, and performing the requested access are performed on a single device.

7. The method according to claim 6, wherein receiving the message, validating identity of the user, and performing the requested access are performed on an Internet-of-Things (IoT) device.

8. The method according to claim 7, wherein performing receiving, validating, and performing on an IoT device includes performing receiving, validating, and performing on a drone.

9. The method according to claim 1, wherein receiving the message from the P2P distributed application includes receiving the message from the P2P distributed application via a first firewall;

further comprising passing the message through a second firewall prior to performing the requested access to the block;

wherein requesting a key includes sending a flare with metadata associated with the user on a first side of a third firewall; and further comprising accessing the flare from a second side of the firewall in a manner that the flare is not communicated from the first side of the firewall to the second side of the firewall.

10. A distributed data management system (DDMS) for managing security of a blockchain, said system comprising:
at least one processor configured to receive a message that includes a function to be performed on content data from a peer-to-peer (P2P) distributed application requesting access to a block on a blockchain for a user, the at least one processor configured to:
validate identity of the user requesting access to the block in response to receiving the message;
in response to validating the identity of the user, request a key associated with the identified user to be used to unlock the block; and
in response to receiving a key associated with the user, unlock the block to access content data stored in a data object contained in the block, the data object being well-formed such that the data object is encapsulated, polymorphic, and exhibits heredity;
perform the function on the content data after unlocking the block;
clone the block prior to performing the function on the content data in a cloned block; and
encrypt the cloned block with the content data on which the function was performed using a key of the user.

11. The system according to claim 10, wherein the at least one processor, in validating identity of the user, is configured to validate an identity of an Internet-of-things (IoT) device.

12. The system according to claim 11, wherein the at least one processor, in validating identity of the user, is configured to compare a secret associated with the user.

13. The system according to claim 10, wherein the at least one processor, in requesting a key, is further configured to:
send a flare with metadata associated with the user; and
wait for a process to identify and respond to the flare by sending the key associated with the user.

14. The system according to claim 10, wherein the at least one processor, in unlocking the block, is configured to decrypt the block to access the content data stored in the data object in the block.

15. The system according to claim 10, wherein the at least one processor operate on a single device.

16. The system according to claim 15, wherein the single device is an Internet-of-Things (IoT) device.

17. The system according to claim 16, wherein the Internet-of-Things device is a drone.

18. The system according to claim 10, wherein the at least one processor is further configured to:
receive the message from the P2P distributed application via a first firewall;
pass the message through a second firewall prior to performing the requested access to the block;
send a flare with metadata associated with the user on a first side of a third firewall to request a key; and
access the flare from a second side of the firewall in a manner that the flare is not communicated from the first side of the firewall to the second side of the firewall.

19. A method for managing security of a blockchain, said method comprising:
receiving a message from a peer-to-peer (P2P) distributed application requesting access to a block on a blockchain for a user;
in response to receiving the message, validating identity of the user requesting access to the block by validating an identity of an Internet-of-things (IoT) device and comparing a secret associated with the user;
in response to validating the identity of the user, performing the requested access to the block by:
requesting a key associated with the identified user to be used to unlock the block, by:
sending a flare with metadata associated with the user; and
waiting for a process to identify and respond to the flare by sending the key associated with the user; and
in response to receiving a key associated with the user, unlocking the block to access content data stored in a data object contained in the block.

20. The method according to claim 19, wherein receiving the message, validating identity of the user, and performing the requested access are performed on a single device.

21. The method according to claim 19, wherein unlocking the block to access content data stored in a data object includes unlocking the block to access content data stored in the data object that is well-formed such that the data object is encapsulated, polymorphic, and exhibits heredity.

22. The method according to claim 21, wherein receiving a message includes receiving a message that includes a function to be performed on the content data, and further comprising performing the function on the content data after unlocking the block.

23. The method according to claim 22, further comprising:
cloning the block prior to performing the function on the content data in a cloned block; and
encrypting the cloned block with the content data on which the function was performed using a key of the user.

24. A distributed data management system (DDMS) for managing security of a blockchain, said system comprising:
at least one processor configured to receive a message from a peer-to-peer (P2P) distributed application requesting access to a block on a blockchain for a user, the at least one processor configured to:
validate identity of the user requesting access to the block in response to receiving the message by validating an identity of an Internet-of-things (IoT) device and comparing a secret associated with the user;
in response to validating the identity of the user, request a key associated with the identified user to be used to unlock the block, the request causing the at least one processor to:
send a flare with metadata associated with the user; and
wait for a process to identify and respond to the flare by sending the key associated with the user; and
in response to receiving a key associated with the user, unlock the block to access content data stored in a data object contained in the block.

25. The system according to claim 24, wherein the at least one processor, in receiving the message, is further configured to validate identity of the user, and perform the requested access are performed on a single device.

26. The system according to claim 24, wherein the at least one processor, in unlocking the block to access content data stored in a data object, is further configured to unlock the block to access content data stored in the data object that is well-formed such that the data object is encapsulated, polymorphic, and exhibits heredity.

27. The system according to claim 26, wherein the at least one processor, in receiving a message, is further configured to receive a message that includes a function to be performed on the content data, and further perform the function on the content data after unlocking the block.

28. The system according to claim 27, wherein the at least one processor is further configured to:

clone the block prior to performing the function on the content data in a cloned block; and encrypt the cloned block with the content data on which the function was performed using a key of the user.

* * * * *